(12) United States Patent
Yamada et al.

(10) Patent No.: US 6,245,439 B1
(45) Date of Patent: *Jun. 12, 2001

(54) COMPOSITE MATERIAL AND METHOD FOR THE MANUFACTURE

(75) Inventors: Katsunori Yamada; Nobuo Kamiya; Mitsuru Asai; Hiroshi Hohjo, all of Aichi (JP)

(73) Assignee: Kabushiki Kaisha Toyoyta Chuo Kenkyusho, Aichi-gun (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/624,519
(22) PCT Filed: Aug. 7, 1995
(86) PCT No.: PCT/JP95/01572
§ 371 Date: Apr. 9, 1996
§ 102(e) Date: Apr. 9, 1996
(87) PCT Pub. No.: WO96/05151
PCT Pub. Date: Feb. 22, 1996

(30) Foreign Application Priority Data

Aug. 9, 1994 (JP) .................................... 6-209159
Mar. 31, 1995 (JP) .................................... 7-100213

(51) Int. Cl.⁷ .................................... B32B 3/12
(52) U.S. Cl. .................. 428/546; 428/116; 428/221; 428/323; 428/331; 264/109; 442/2; 442/50; 338/22 R
(58) Field of Search .................... 428/546, 540, 428/551, 552, 557, 558, 559, 564, 565, 570, 116, 221, 323, 331; 338/22 R; 264/109; 442/2, 50

(56) References Cited

U.S. PATENT DOCUMENTS 4,885,214 * 12/1989 Trenkler et al. ............... 428/570
4,954,171 * 9/1990 Takajo et al. .................. 428/570

(List continued on next page.)

FOREIGN PATENT DOCUMENTS 60-243245  12/1985 (JP) .

(List continued on next page.)

Primary Examiner—Elizabeth M. Cole
(74) Attorney, Agent, or Firm—Oblon, Spivak, McClelland, Maier & Neustadt, P.C.

(57) ABSTRACT

This invention concerns a composite material which is characterized by comprising a large number of composite material cells, as structural units of the composite material, each comprising a first phase composed of a base material and a second phase composed of a dispersion material surrounding the first phase discontinuously; and comprising a matrix comprising the base material and the dispersion material dispersed in the matrix, the dispersion material being dispersed discontinuously in the form of a three-dimensional network in the composite material; wherein the dispersion materials of the composite material cells are combined to form a composite material skeletal part, thereby exhibiting properties of the dispersion material without reducing the strength of the matrix owing to the skeletal part, and improving strength characteristics thereof owing to the skeletal part serving as a resistance to external stress. A preferred embodiment of the invention provides a composite material characterized in that it comprises a base material, a reinforcing layer comprising a material which resembles the base material and is dispersed continuously in the form of a three-dimensional network in the base material, and dispersion material which is dispersed discontinuously within the material of the reinforcing layer, so that the dispersion material is dispersed discontinuously in the form of a three-dimensional network in the base material, and provides a method for the manufacture of this composite material.

55 Claims, 19 Drawing Sheets

U.S. PATENT DOCUMENTS 4,999,256 * 3/1991 Prewo et al. ............................ 428/570
5,223,213 * 6/1993 Kamimura et al. ..................... 419/35

FOREIGN PATENT DOCUMENTS

| | | |
|---|---|---|
| 62-4750 | 1/1987 | (JP) . |
| H1-119688 | 5/1989 | (JP) . |
| H3-122066 | 5/1991 | (JP) . |
| H3-174358 | 7/1991 | (JP) . |
| H4-37667 | 2/1992 | (JP) . |

* cited by examiner

COMPOSITE MATERIAL AND METHOD FOR THE MANUFACTURE

TECHNICAL FIELD

This invention concerns a composite material in which a dispersion material is dispersed in a base material comprising ceramic, metal or polymer, for example, and a method for the manufacture.

BACKGROUND ART

Properties, such as wear resistance, oxidation resistance, corrosion resistance, heat resistance, electrical or thermal conductivity, mechanical strength, and the like, which are inadequate in a single material can be supplemented by combining two or more materials which have different properties. Furthermore, it is possible to impart new functions such as magnetic properties, self-lubricating properties, optical properties, piezoelectric properties, thermoelectric properties, insulating properties, thermal conductivity, thermal insulation properties, dielectric properties, expansion properties, free cutting properties, electrical conductivity, and the like, i.e. properties which cannot be realized with each single substance alone. Consequently, composite materials in which various materials are combined have been investigated for realizing prescribed properties.

Especially with composite materials in which particles, whiskers or fibers, for example, which are comprised of a different material are dispersed in a base material (matrix), the dispersion material fulfills the role of realizing mechanical and functional properties and so it is possible to design a wide range of materials which have conjoint properties which cannot be obtained with single materials (monolithic materials), as mentioned above.

The conventional composite materials in which dispersion materials are dispersed are generally materials in which the dispersion material is dispersed uniformly in a matrix. The composite material can provide increased performance and functionality as a result of the addition of the dispersion material, but there is a problem in that the properties of the dispersion material cannot be exhibited satisfactorily because it is dispersed independently and randomly.

Dispersion of the dispersion material in the form of a continuous three-dimensional network has been proposed for resolving these problems. (Japanese Patent Kokai 60-243245, Japanese Patent Kokai 62-4750, Japanese Patent Kokai H1-119688, Japanese Patent Kokai H3-122066, Japanese Patent Kokai H3-174358, Japanese Patent Kokai H4-37667). It is described that these composite materials can exhibit satisfactorily the properties of the dispersion material since the dispersion material is distributed continuously.

The Japanese Patent Kokai 60-243245 discloses a "ceramic particle-reinforced metal composite material" comprising a porous ceramic skeleton formed by sintering a mixture of ceramic and whiskers comprising ceramic, and metal which has been impregnated into the gaps of said ceramic skeleton. It is described that the composite material has a dispersion material comprising a mixture of ceramic and ceramic whiskers dispersed in the form of a continuous skeletal structure in a metal matrix and so it is possible to make composite materials which have high fracture strength and high quality and which are strong against thermal shock.

The Japanese Patent Kokai 62-4750 discloses a "positive temperature coefficient composition and a method for its manufacture" wherein the composition comprises crystalline polymer and short carbon fibers of average length from 0.05 mm to 1 mm and of diameter from 3 $\mu$m to 20 $\mu$m. It is described that this composition has chains of a three-dimensional micro-network structure of short carbon fibers in a polymer matrix and so it is possible to reduce the amount of short carbon fibers which is used and to form polymer compositions which are cheap and which have excellent PTC characteristics.

The Japanese Patent Kokai H1-119688 discloses a "resin molded electrode and a method for its manufacture" wherein the resin molded electrode has particles of an electrically conductive metal such as lead dispersed continuously in a network form in a substrate comprising thermoplastic resin. It is described that this electrode has excellent corrosion resistance and mechanical strength, and it can be made cheaply.

The Japanese Patent Kokai H3-122066 discloses an "aluminum impregnated type silicon carbide composite material and a method for its manufacture" wherein the composite material has a skeleton which is formed of a porous body of low density silicon carbide and in which aluminum is retained in the pores of this skeleton. It is described that this composite material has aluminum impregnated into the continuous pores of a silicon carbide porous body which has continuous pores and so it is possible to form a composite material which is light, and which has excellent strength, heat resistance and wear resistance.

The Japanese Patent Kokai H3-174358 discloses a "composite material comprising a continuous phase of silicon carbide and carbon" which has a structure comprising from 90 to 30 mol % carbon and from 10 to 70 mol % silicon carbide and which together form a continuous phase. It is described that two components form a continuous phase in this composite material and so, even if the carbon component disappears as a result of oxidation, for example, it has a high bending strength and so it can retain its form.

The Japanese Patent Kokai H4-37667 discloses a "light weight high rigidity ceramic and its application" wherein the ceramic has a three-dimensional continuous network structure formed in a reactively sintered matrix. It is described that this light weight high rigidity ceramic is a composite ceramic structure which is of light weight and high rigidity, i.e. which has a high specific elastic modulus.

Problems to be Resolved by the Invention

However, the above-mentioned composite materials disclosed in Japanese Patent Kokai 60-243245, Japanese Patent Kokai 62-4750, Japanese Patent Kokai H1-119688, Japanese Patent Kokai H3-122066, Japanese Patent Kokai H3-174358 and Japanese Patent Kokai H4-37667 are such that in all cases the strength of the composite is determined by the strength of either the base material or the dispersion material whichever is lower and the degree of density, and so it is difficult to achieve increased strength by simply dispersing the dispersion material in the form of a continuous three-dimensional network. Furthermore, internal stresses are generated continuously by the different thermal expansions between the base material and the dispersion material and so the mechanical and thermal shock resistances, for example, are reduced. Moreover, when preparing the composite material, a special process for the impregnation of the other material is required after forming the porous body which has a network structure of the dispersion material or the matrix. Consequently, long time is required for production, and this is not good for mass production and, moreover, there is a problem in that increasing the density is difficult.

Furthermore, for the light weight and high rigidity ceramics disclosed in Japanese Patent Kokai H4-37667, there is disclosed a method in which the dispersion material is made into a network using a powder comprised of a ceramic powder attached to a crushed metal powder or atomized powder, but since the dispersion material is dispersed continuously, the sinterability is poor and there is a problem in that, as a result of this, the strength is low.

Disclosure of the Invention

Object of the Invention

An object of this invention is to provide a composite material in which the properties of the dispersion material and the base material can be exhibited satisfactorily without any worsening of the mechanical properties, and a method for the manufacture.

Constitution of the Invention

A composite material of this invention comprises: a large number of composite material cells, as structural units of the composite material, each comprising a first phase composed of a base material and a second phase composed of a dispersion material surrounding said first phase discontinuously; and comprising a matrix comprising the base material and the dispersion material dispersed in the matrix, the dispersion material being dispersed discontinuously in the form of a three-dimensional network in the composite material; the dispersion materials of the composite material cells being combined to form a composite material skeletal part, thereby exhibiting properties of the dispersion material without reducing the strength of the matrix owing to the skeletal part, and improving strength characteristics of the composite material owing to the slekeltal part serving as a resistance to external stress.

Function of the Invention

The mechanism by which a composite material of this invention realizes these excellent effects is as yet unclear, but it is thought to be as indicated below.

A composite material of this invention has, as structural units, composite material cells each omprising a first phase comprising the material of the base material and a second phase comprising the dispersion material which is formed in such a way as to surround said first phase discontinuously. By making the composite material cells into structural units, the aforementioned second phase forms a strong skeleton or path around the aforementioned first phase and the matrix is reinforced by this, and it is possible to inhibit softening of the material at high temperatures and dislocation or element diffusion movement. Furthermore, it is thought that in those cases where a material for increasing thermal or electrical conductivity is selected for the dispersion material, the thermal or electrical conductivity is also imparted by the formation of paths by the second phase.

Furthermore, because the composite materials of this invention have the aforementioned composite material cells as structural units and the aforementioned dispersion material is dispersed discontinuously in the form of a three-dimensional network in the composite material, which is to say because it is dispersed discontinuously in the form of a three-dimensional network in the composite material, it can be concluded that, as indicated below, a synergistic effect due to the two effects, namely the effect of reinforcement due to the dispersion material (dispersed phase), such as particles or whiskers or fibers for example, itself, and the reinforcing effect due to the skeletal structure of the dispersion material is obtained.

At room temperature, high stress handled by the strong base material rather than the dispersion material and, at the same time, the movement of dislocations is prevented by the dispersion material which has been dispersed in the form of a three-dimensional network in the composite material, and crack growth can be suppressed. Furthermore, at high temperatures, softening and deformation of the composite material is suppressed by the three-dimensional network-like dispersion structure skeleton of the dispersion material, and grain boundary sliding between crystal grains and the movement of dislocations is prevented by the dispersion material, and the fracture strength and creep properties can be improved. In particular, since the dispersion material is dispersed discontinuously, even if cracks are formed in the dispersion material or along the boundaries between the dispersion material and the base material, propagation is more difficult than in a case where the dispersion material is dispersed continuously in the form of a three-dimensional network. Furthermore, thermal or mechanical shocks are relieved. Moreover, because of the high degree of density, pores which become sources of failure are less liable to form in the composite material and so decreasing in strength due to pore formation is not liable to occur. Effective reinforcement at room temperature and at high temperature is possible in this way.

That is to say, when a dispersion material has been used for reinforcement purposes, said dispersion agent reinforces the composite material by means of the dispersion material such as particles or whiskers for example in the base material and also forms a skeletal structure in which it is dispersed discontinuously in the form of a three-dimensional network in the composite material, and pores, for example, which are the main cause of a lowering of strength are not formed as a result of the formation of said structure. Such a skeletal structure can suppress the crack extension and the movement of dislocations between adjoining network meshes by means of the dispersion material itself when a high stress is applied. By this means it is possible to increase strength and toughness. Furthermore, a skeletal structure which has a high heat resistance can be formed when a dispersion material which is highly heat resistant is used, and this skeleton can suppress softening and deformation of the base material. Moreover, the movement of dislocations and grain boundary sliding due to softening of the crystal grain boundaries can be suppressed by the dispersion material itself and so it is possible to improve the instantaneous fracture strength and creep resistance at high temperature. In particular, even if cracks extend in the dispersion material or along the boundary between the dispersion material and the base material, because the dispersion material is dispersed discontinuously, there is no path along which the crack can generally extend and grow as they would in a continuous phase, and propagation is difficult.

When a dispersion material which imparts functionality is used as described above, higher density of the composite material is attained as compared with the dispersion in a continuous network form, and pores which become fracture origins are less liable to be formed, and thus it is possible to impart functionality without reducing the strength.

Furthermore, since the dispersion material is arranged in the form of a network mesh, it is possible to exhibit the properties of the dispersion material more strongly than with a uniformly dispersed system. Moreover, the amount of the dispersion material added can be reduced when compared with that of a continuous network structure.

Moreover, a change in the spacing of the dispersion material produced by a difference in the thermal expansion between the base material and the dispersion material can also be used for measuring temperature.

As has been outlined above, the composite materials of this invention can be considered to be materials made as composite materials in which the properties of the dispersion material are exhibited satisfactorily without adversely affecting the mechanical properties of the base material.

Effect of the Invention

The composite materials of this invention enable the properties of the dispersion material to be exhibited satisfactorily without adversely affecting the mechanical properties of the base material.

Figure 1:
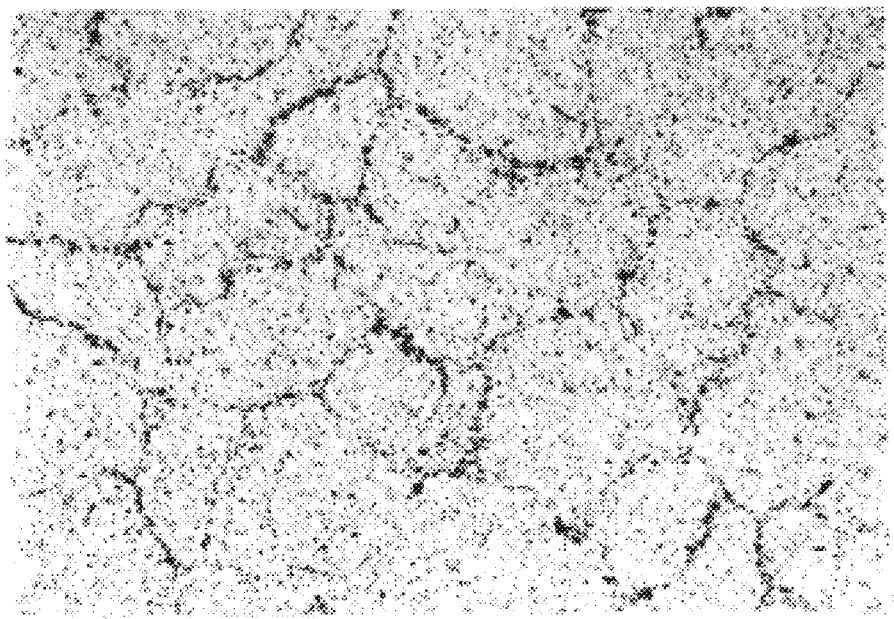
FIG. 1

This is an optical microscope photograph (magnification 100 times) which shows the metal structure of a cross section of the composite material obtained in Example 1 of the invention.

FIG. 2

This is an explanatory drawing for explaining conceptually an actual example of the structure of the composite material cells of a composite material of the first aspect and the third aspect of the invention.

FIG. 3

This is an explanatory drawing for explaining conceptually another actual example of the structure of the composite material cells of a composite material of the first aspect and the third aspect of the invention.

FIG. 4

This is an explanatory drawing for explaining conceptually another actual example of the structure of the composite material cells of a composite material of the first aspect and the third aspect of the invention.

FIG. 5

This is an explanatory drawing for explaining conceptually another actual example of the structure of the composite material cells of a composite material of the first aspect and the third aspect of the invention.

FIG. 6

This is an explanatory drawing for explaining the metal structure in the cross section of an actual example of a composite material of the first aspect and the third aspect of the invention.

FIG. 7

This is an explanatory drawing for explaining conceptually an actual example of a network mesh which forms a composite material of the first aspect of the invention.

FIG. 8

This is an explanatory drawing for explaining conceptually an actual example of the cross section of a composite material which has a bonding reinforcing layer of the first aspect of the invention.

FIG. 9

This is an explanatory drawing for explaining conceptually the structure of an ideal actual example of a composite material of the first aspect of the invention.

FIG. 10

This is a drawing for explaining conceptually the structure of an ideal actual example of a composite material of the first aspect of the invention, showing a graph which shows the relationship between the distance and selection order of the dispersion material.

FIG. 11

This is a drawing for explaining conceptually the structure of an ideal actual example of a composite material of the first aspect of the invention, showing a graph which shows the relationship between the distance and selection order of the dispersion material.

FIG. 12

This is a drawing for explaining conceptually the structure of an ideal actual example of a composite material of the first aspect of the invention, showing a graph which shows the relationship between the distance and selection order of the dispersion material.

FIG. 13

This is an explanatory drawing for explaining conceptually an example of the ideal dispersion structure of the dispersion material in a composite material of the first aspect of the invention.

FIG. 14

This is an explanatory drawing for explaining conceptually another example of the ideal dispersion structure of the dispersion material in a composite material of the first aspect of the invention.

FIG. 15

This is an explanatory drawing which shows conceptually an actual example of the state of existence of the reinforcing layer of a composite material of the second aspect and the third aspect of the invention.

FIG. 16

This is an explanatory drawing which shows conceptually another actual example of the-state of existence of the reinforcing layer of a composite material of the second aspect and the third aspect of the invention.

FIG. 17

This is an explanatory drawing which shows conceptually another actual example of the state of existence of the reinforcing layer of a composite material of the second aspect and the third aspect of the invention.

FIG. 18

This is an explanatory drawing which shows conceptually an actual example of the state of dispersion of the dispersion material of a composite material of the second aspect and the third aspect of the invention.

FIG. 19

This is an explanatory drawing which shows conceptually another actual example of the state of dispersion of the dispersion material of a composite material of the second aspect and the third aspect of the invention.

FIG. 20

This is an explanatory drawing which shows conceptually another actual example of the state of dispersion of the dispersion material of a composite material of the second aspect and the third aspect of the invention.

FIG. 21

This is an explanatory drawing which shows conceptually another actual example of the state of dispersion of the dispersion material of a composite material of the second aspect and the third aspect of the invention.

FIG. 22

This is an explanatory drawing which shows conceptually another actual example of the state of dispersion of the dispersion material of a composite material of the second aspect and the third aspect of the invention.

FIG. 23

This is an explanatory drawing which shows conceptually another actual example of the state of dispersion of the dispersion material of a composite material of the second aspect and the third aspect of the invention.

FIG. 24

This is a drawing which shows the state of dispersion of an actual example of a dispersion material of a composite material of the second aspect and third aspect of the invention, illustrating conceptually the state of "discontinuous dispersion in the form of a three-dimensional network".

FIG. 25

This is an explanatory drawing for explaining an actual example of the network mesh which forms a composite material of the second aspect and third aspect of the invention.

FIG. 26

This is an explanatory drawing for explaining an actual example of the method of manufacture of a composite material of the second aspect of the invention.

FIG. 27

This is an explanatory drawing for explaining another actual example of the method of manufacture of a composite material of the second aspect of the invention.

FIG. 28

This is an optical microscope photograph (magnification 100 times) which shows the metal structure of the cross section of the composite material for comparative purposes obtained in Comparative Example 1.

FIG. 29

This is an optical microscope photograph (magnification 100 times) which shows the grain structure in the cross section of the composite material obtained in Example 5 of the invention.

FIG. 30

These are graphs which show the temperature-resistance value characteristics of the composite materials obtained in Example 6 and Example 7 of the invention and the sinters obtained in Comparative Example 10, Comparative Example 13 and Comparative Example 14.

FIG. 31

This is a graph which shows the temperature-resistance value characteristics of the sinter for comparative purposes obtained in Comparative Example 11.

PREFERRED EMBODIMENTS FOR PRACTICING THE INVENTION

The First Aspect

A composite material of the first aspect of the invention is characterized in that it is a composite material in which composite material cells each comprising a first phase comprising a base material and a second phase comprising a dispersion material surrounding discontinuously said first phase form the structural units and in which a large number of said composite material cells are combined, in that said composite material comprises a matrix comprising the base material and the dispersion material dispersed in said matrix, and said dispersion material is dispersed discontinuously in the form of a three-dimensional network in the composite material, and in that the dispersion materials of the aforementioned composite material cells are combined to form a composite material skeletal part, whereby the properties of the dispersion material are exhibited without reducing the strength of the matrix owing to said composite material skeletal part, and the strength characteristics are improved owing to the aforementioned skeletal part serving as a resistance to external stress or the like.

The Base Material

The base material (matrix) is the basic material of the composite material, and it is formed as the first phase. Materials such as ceramics, metals, resins and intermetallic compounds, for example, can be used for the base material, and it may be crystalline or amorphous.

The First Phase

The first phase is comprised of the material of the base material. Said first phase forms composite material cells as structural units of the composite material. The form of said first phase may be spherical, prismatic or a combination of these forms, or a form which is a deformed form of these forms. Moreover, the form of the transverse cross section (the cross section in the direction perpendicular to the length direction in those cases where the first phase is prismatic) may be polygonal, circular, elliptical or irregular. The size of the above-mentioned first phase is preferably such that the average diameter in the aforementioned transverse cross section is from 1 $\mu$m to 10 mm. In those cases where the size of the first phase is less than 1 $\mu$m the density of the network which is formed in the matrix is high and so the sinterability is reduced and, as a result there is a danger that adequate strength will not be obtained. Furthermore, if it exceeds 10 mm then it becomes difficult to realize an improvement due to the dispersion material in the mechanical properties and/or the physical properties. Moreover, in those cases where the size of the first phase is within the range from 1 $\mu$m to 500 $\mu$m a lowering of strength due to peeling around the outside of the composite material cells is not liable to occur and the properties of the second phase can be exhibited satisfactorily, and this is most desirable.

Moreover, the form of said first phase may be any form such as spherical or a deformed spherical form, or a prismatic or deformed prismatic form. In those cases where the form of said first phase is spherical or deformed spherical it can be constructed so that the mechanical and functional properties can be exhibited isotropically, and this is ideal. Furthermore, in those cases where the form of said first phase is prismatic or deformed prismatic, the structure is such that the functional and mechanical properties can be exhibited in a certain direction, and by arranging the prisms in the length direction it is possible to form a structure which has increased function in the thin sheet, and this is ideal.

The Dispersion Material

The dispersion material is the material which is dispersed in the matrix with a view to improving the mechanical properties and improving the functional properties of the matrix, and it forms a second phase. Materials which have mechanical properties, such as heat resistance and fusion resistance, resistance to chemical attack, high hardness, high elasticity, free-cutting properties or oxidation resistance for example, and functional properties, such as thermal conductivity, thermal insulation properties, electrical conductivity, insulating properties, magnetic properties, piezoelectric properties or optical properties for example, can be used for said dispersion material. In terms of the nature of the dispersion material, materials such as ceramics, metals, resins and intermetallic compounds, for example, can be used, and the material may be crystalline or amorphous. The form may be, for example, that of particles, whiskers or fibers.

The size of the dispersion material, in the case of particles, is an average value for the diameter of from 0.01 $\mu$m to 1 mm, and it is preferably not more than one quarter of the size (the size in the aforementioned cross section) of the aforementioned first phase. In those cases where said diameter is less than 0.01 $\mu$m the proportion of the discontinuities of the second phases around the outside of the composite material cells is reduced and there is a danger that the mechanical properties of the first phase are liable to be adversely affected. Furthermore, if said diameter exceeds 1 mm then the dispersion density of the second phase on the outer parts of the composite material cells becomes coarse and there is a danger that it will become difficult to exhibit the properties of the second phase. Furthermore, in those cases where the aforementioned diameter is more than one quarter of the size (the size in the aforementioned cross section) of the aforementioned first phase it becomes difficult to form a skeletal structure and paths with the second phase, and there is a danger that it will not be possible to exhibit the properties of the second phase satisfactorily. Moreover, in this case, by setting the size of the dispersion material is within the range from 0.05 $\mu$m to 100 $\mu$m, the spacing of the discontinuities of the dispersion material is easily controlled to a suitable degree and the properties of the second phase can be exhibited satisfactorily without adversely affecting the mechanical properties, such as the strength and impact resistance for example, of the first phase and so this is preferred.

Furthermore, the size of the dispersion material, in the case of whiskers and fibers, is preferably such that the average value of the short diameter is not more than 300 $\mu$m. In this case, the formation of a discontinuous network-like structure is facilitated by controlling the size of the dispersion material to not more than 200 $\mu$m. If the size exceeds this range, then the dispersion density of the dispersion material is reduced and so there is a danger that it will be difficult to realize the effects of the network.

The Second Phase

The second phase comprises the dispersed material which has been formed in such a way as to surround discontinuously the aforementioned first phase. The dispersion material which forms this second phase may exist as individual dispersion materials (for example, particles) which are independent each other, or it may exist as aggregates of a plurality of dispersion materials with the respective aggregates being formed discontinuously each other, or it may be a combination of these forms. Aggregates of one dispersion material or/and a plurality of dispersion materials can be formed respectively in such a way as to surround the aforementioned first phase discontinuously. Moreover, at this time, the abovementioned dispersion material may be of one type, or it may be of a plurality of types of which the functionality and/or reinforcing properties which are imparted are different.

The Composite Material

The composite materials of this first aspect have composite material cells each comprising the aforementioned first phase and the aforementioned second phase which is formed in such a way as to surround discontinuously said first phase as structural units, and the aforementioned dispersion material is dispersed discontinuously in the form of a three-dimensional network in the base material. That is to say, it is dispersed discontinuously in the form of a three-dimensional network in the composite material.

FIGS. 2 to 5 are explanatory drawings which show conceptually actual examples of the structure of the aforementioned composite material cells.

Figure 2:
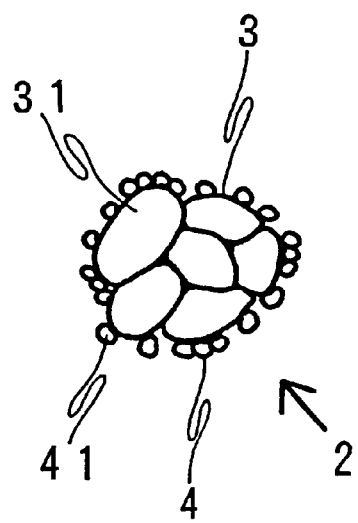
Figure 3:
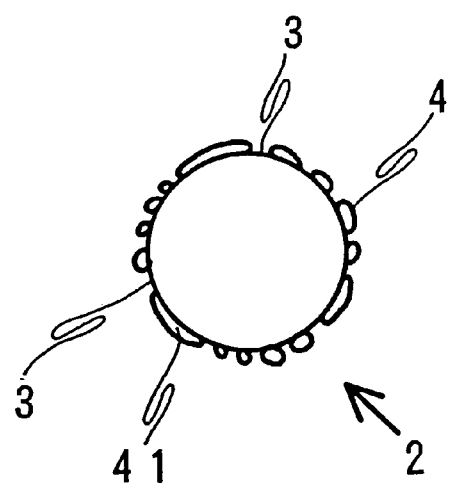

FIG. 2 and FIG. 3 show diagrammatic explanatory drawings of actual examples of the aforementioned transverse cross sections of composite material cells, and FIG. 2 is an example in which the first phase 3 is a polycrystalline material, and the composite material cell 2 is a construction in which first phase 3 is constructed with the plurality of crystal grains 31 as a single block and the second phase 4 is formed with the dispersion material 41 surrounding the outside of this discontinuously. FIG. 3 is an example of a material in which the first phase 3 comprises amorphous or single crystal material such as a resin, and the construction is such that a disk or deformed disk-like lump of the prescribed size forms a single block and the dispersion material 41 forms the second phase 4 surrounding the outside of this block discontinuously.

Figure 4:
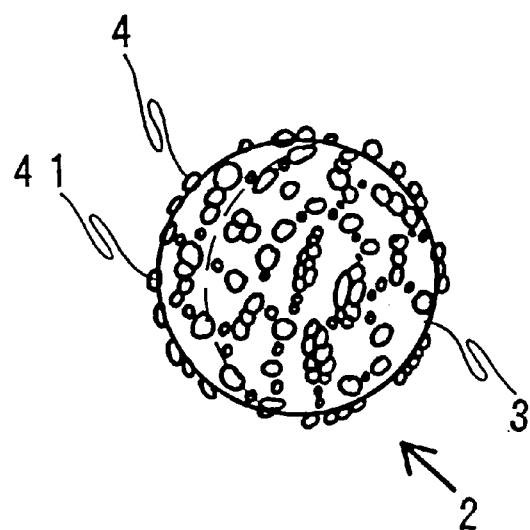
Figure 5:
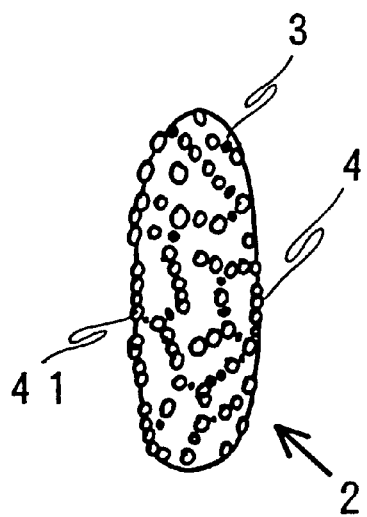

FIG. 4 and FIG. 5 are explanatory drawings which show conceptually actual examples of composite material cells, and FIG. 4 is a structure such that dispersion material 41 surrounds discontinuously the whole of the first phase 3 block which is of spherical or elliptical form so as to form the second phase 4. FIG. 5 is a structure such that the dispersion material 41 is dispersed discontinuously on the whole of the first phase 3 which is of a prismatic or elongated elliptical form so as to form the second phase 4.

Figure 6:
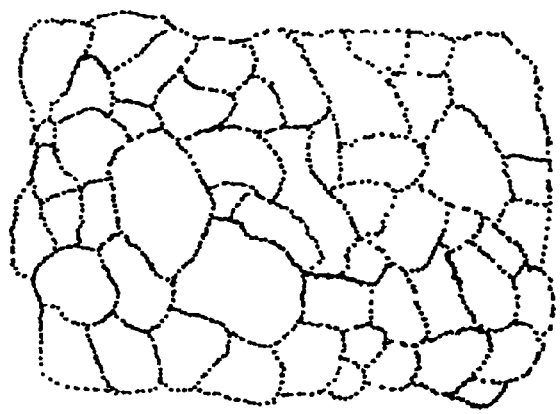
Figure 7:
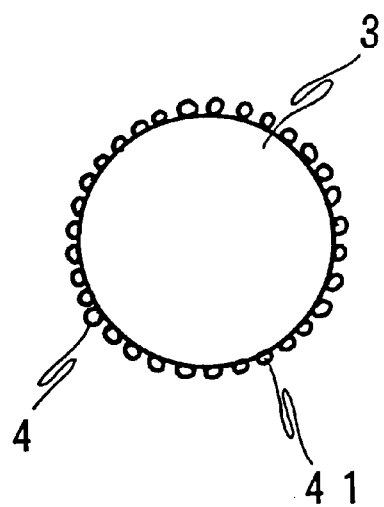

Furthermore, a "dispersed discontinuously in the form of a three-dimensional network" state is a state, as shown in the examples in FIG. 1 and FIG. 6, in which the dispersion material, in the state of individual units and/or aggregates of individual units (including partially connected states and touching states) is arranged in the base material, which is to say in the composite material, in the form of a three-dimensional network. Furthermore, in those cases where the matrix is comprised of crystal grains, a number of matrix crystal grains are taken as a single unit and a single network mesh is formed surrounding this unit. Preferably it is a state, as shown in FIG. 7, in which there are few continuously connected particles such that the discontinuous phase comprising the dispersion material is dispersed with very fine spacing. Most desirably, it is a state such that the dispersed particles are connected via a grain boundary phase of not more than a few am.

Moreover, the dispersed state of the aforementioned dispersion material should form a network structure in an essentially discontinuous state, as indicated above and, furthermore, the form of a single network mesh may be polyhedral or spherical for example, and the cross-sectional form may be polygonal, circular, elliptical or irregular. Furthermore, with the dispersion material, some of the particles may be dispersed continuously, to form a continuous body, within the range where the action and effect of the invention are not lost.

The proportion of the dispersion material in the matrix is preferably within the range from 0.01 to 70 percent by volume. In cases where said proportion is less than 0.01 percent by volume, the spacing of the dispersion material increases and there is a danger that it will become difficult to realize the functionality and effects of the skeletal structure. Furthermore, if it exceeds 70 percent by volume then the density of the dispersion material in the dispersed phase network becomes high and so sinterability is reduced and there is a danger that the strength will decrease. Moreover, those cases where said proportion is within the range of from 1% to 30% are preferred since this allows the effects of the invention to be realized more effectively.

Various materials such as ceramic materials, metal materials, polymer materials and the like can be combined as the composition of matrix and dispersion material.

In those cases where the matrix is a ceramic material, examples of matrix-dispersion material combinations include silicon nitride-silicon carbide, silicon nitride-silica, silicon nitride-boron nitride, silicon nitride-titanium nitride, silicon nitride-titanium carbide, silicon nitride-ferrite magnet, silicon carbide-alumina, silicon carbide-aluminum nitride, silicon carbide-titanium nitride, titanium carbide-silicon carbide, alumina-titanium carbide, alumina-zirconia, alumina-zircon, alumina-silicon nitride, alumina-diamond, alumina-aluminum nitride, mullite-alumina, mullite-zirconia, sialon-silicon carbide, zirconia-alumina, glass-silicon carbide, glass-alumina, lead titanate zirconate-silicon carbide, lead titanate zirconate-barium titanate, lead titanate-strontium titanate, cordierite-mullite, zirconia-a nickel-chromium alloy, and the like. Moreover, the above-mentioned combinations of matrix and dispersion materials may be reversed when a ceramic is used as a dispersion material.

When a ceramic is used for the matrix and a material having a low electrical resistance, such as silicon carbide, titanium carbide, titanium oxide or the like, or a nickel-chromium alloy is added to the ceramic matrix as a dispersion material, it is possible to impart electrical conductivity or thermal conductivity to the ceramic as a matrix by dispersing the materials in such a way that the spacing of these dispersion materials does not impede sinterability. This enables electrical discharge machining of the ceramic. In particular, with materials which have a high thermal conductivity such as silicon carbide, carbides, borides, nitrides and metals it is possible, by adjusting the spacing of the dispersion material, to impart a high thermal conductivity while preserving electrical insulating properties, and suitability as a substrate material, for example, is increased. Furthermore, it is possible to improve workability without any loss in strength by using a material which has free cutting properties as an additive.

When a metallic material is used for the matrix, examples of the above-mentioned combinations include nickel-thoria, a nickel-chromium alloy-thoria, a nickel-chromium alloy-yttria, an iron-chromium alloy-yttria, an iron-chromium alloy-zirconia, an iron-chromium alloy-alumina, aluminum-tungsten, aluminum-stainless steel, aluminum-carbon, aluminum-boron, aluminum-alumina, aluminum-silicon carbide, aluminum yttria, magnesium (or magnesium alloy)-alumina, aluminum alloy-alumina, nickel (or nickel alloy)-alumina, molybdenum (or molybdenum alloy)-alumina, magnesium-silicon carbide, copper-alumina, copper-tungsten, copper-yttria, a nickel-chromium alloy-zirconia, a nickel-chromium alloy-calcia, a nickel-chromium alloy-silica, silver-tungsten and-the like. Moreover, the above-mentioned combinations of matrix and dispersion materials may be reversed when the dispersion material comprises a metallic material.

When a metallic material is used for the matrix, a metallic material which has thermal insulating properties can be obtained, without adverse effect on the mechanical properties, by adding a ceramic such as zirconia which has a low thermal conductivity, or by adjusting the spacing of a metallic dispersion material.

When a polymer material is used for the matrix, examples of the above-mentioned combinations include polyvinyl chloride-lead (or lead alloy), polyvinyl chloride-manganese dioxide, polypropylene-talc, polypropylene-calcium carbonate, polypropylene-magnesium carbonate, epoxy resin-silicon carbide, epoxy resin-silica, epoxy resin-glass, silicon resin-silicon carbide, polyethylene-carbon, thermoset resin-silica, rubber-carbon black, resin-graphite, resin-nickel, carbon-silicon carbide, and the like.

A composite material of this first aspect enables the characteristics of the dispersion material, such as reinforcement of properties and improvement of function, to be realized satisfactorily without adversely affecting the mechanical properties of the matrix material.

Furthermore, it is possible to disperse dispersion materials which have excellent functionality, such as electrical conductivity, thermal conductivity or magnetic properties or the like, in the form of a network with very short spacing and so, by optimizing the spacing of the dispersion material, it is possible to realize both characteristics similar to those obtained when said dispersion medium is formed as a continuous phase, and further improved mechanical properties.

Furthermore, in those cases where the matrix comprises crystal grains, the size of the network mesh is increased so as to go along the periphery outlining a plurality of crystal grains, but not a single crystal grain as in the conventional way, and so it is possible to exhibit the properties satisfactorily with the addition of a smaller amount.

Furthermore, in those cases where the dispersion material is of high rigidity, it is possible to achieve increased rigidity of the base material by forming a composite without invoking any loss of properties such as strength, toughness and impact resistance due to the dispersion material by dispersing the dispersion material discontinuously.

Furthermore, if a whisker-like dispersion material is formed into a three-dimensional network structure in a direction perpendicular to the orientation direction, it is possible not only to increase the strength in the orientation direction by a pinning effect but also to provide reinforcement three-dimensionally.

Here, a preferred composite material of the composite materials of this first aspect is characterized in that an additive for reinforcing properties and improving function is dispersed uniformly in the aforementioned first phase. By this means it is possible to suppress the movement of dislocations and the sliding of crystal grains within the first phase, to increase hardness and to increase elasticity for example, and to improve mechanical properties such as heat resistance, oxidation resistance, strength and high rigidity, and functional properties such as thermal conductivity. Examples of additives include materials having heat resistance, fusion resistance, resistance to chemical attack, mechanical properties such as high rigidity, high hardness, free-cutting properties and impact resistance, and functionality such as optical properties, low expansion properties, low dielectric conductivity, high resistance, high expansion properties, thermal conductivity, thermal insulating properties, electrical conductivity, insulating properties, magnetic properties, piezoelectric properties and the like. At this time, a material such as a ceramic, a metal, a resin or an intermetallic compound can be used for the dispersion material, and this material may be crystalline or amorphous. It may have any form, such as particles, whiskers or fibers. Moreover, in those cases where a material which has mechanical properties is used for the additive and a material which has functionality is used for the dispersion material which forms the second phase, it is possible to produce functional composite materials which also have heat resistance, corrosion resistance, resistance to chemical attack and mechanical properties such as high hardness, free cutting properties and the like.

Moreover, in those cases where the base material is amorphous, it is desirable that the above-mentioned added materials (reinforcing particles) should be dispersed uniformly in the first phase.

Furthermore, in those cases where the base material is crystalline, the above-mentioned reinforcing particles are preferably dispersed uniformly within the grains or/and at the grain boundaries of the crystal grains which are included in the first phase. In this case, the dispersion material may be either within the grains or at the grain boundaries when improving the mechanical properties.

Preferred Composite Material of the First Aspect

A preferred-composite material of the first aspect of the invention is characterized in that it is a composite material in which composite material cells each comprising a first phase comprising the material of the base material and a second phase comprising the dispersion material which has been formed so as to surround discontinuously said first phase form the structural units, the aforementioned dispersed material is dispersed discontinuously in the form of a three-dimensional network in the composite material, and in that the second phase of each of the aforementioned composite material cells has at least four sites of discontinuity, and said discontinuity sites respectively have at least one of a bonding reinforcing phase which bonds the aforementioned first phase and other first phase adjoining said phase, a bonding reinforcing phase which bonds the aforementioned first phase and the aforementioned second phase, and a bonding reinforcing phase which bonds the aforementioned second phase with other second phase adjoining said phase, and that, by means of the bonding reinforcing phase, the first phase is strengthened and the second phase is fixed and retained strongly in the composite material.

This composite material of the first aspect has effects such as those indicated below in addition to the aforementioned effects of a composite material of this invention.

This composite material is such that the second phase of the aforementioned composite material cell has at least 4 sites of discontinuity. By this means it is possible to strengthen the bonding between the first phases and to bond the second phase with the first phase or fix and retain the second phase more strongly.

Furthermore, this composite material has at least one bonding reinforcing phase among those which bonds the first phase and other first phase adjoining said phase, which bonds the first phase and the second phase, and which bonds the second phase with other second phase adjoining said phase. By this means, it is possible to reduce the boundary surface peeling due to tension, twisting or shear forces between adjoining first phases and, by bonding and reinforcing the first phase and the second phase and/or the second phases, it is possible to strengthen further the bonding between the first phases. Furthermore, there is strong bonding between the first phase and the second phase and/or between the second phases due to the reinforcing phase and so it is possible to suppress peeling at these boundary surfaces, and so the aforementioned second phase can be fixed and retained strongly in the composite material.

By means of the above, the preferred composite material of the first aspect, when compared with the aforementioned composite materials, is thought to be a composite material with which the properties of the dispersion material are exhibited more satisfactorily without adversely affecting the mechanical properties of the base material. Furthermore, it is thought that it is possible to realize superior composite materials which have superior functional properties and mechanical properties, such as heat resistance, wear resistance, impact resistance, fatigue resistance and the like.

This composite material enables the properties of the dispersion material to be exhibited more satisfactorily without adversely affecting the mechanical properties of the base material.

The Bonding Reinforcing Phases

Figure 8:
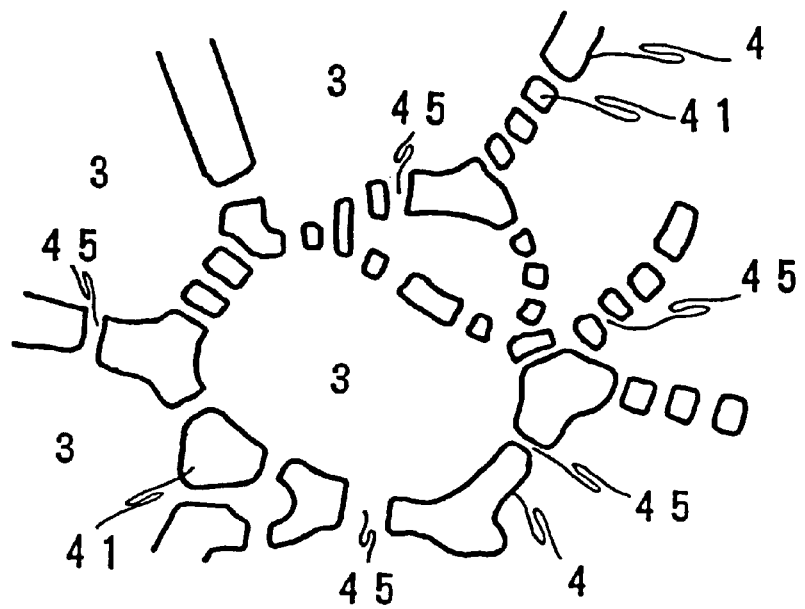

An explanatory drawing for explaining conceptually an actual example of a bonding reinforcing phase is shown in FIG. 8. In FIG. 8, in the second phase 4 in which the dispersion material 41 is distributed in such a way as to form a three-dimensional network skeleton, said second phase 4 is formed with local discontinuities, and the structure is such that the adjoining first phase 3 parts are strongly bonded together via the bonding reinforcing phase 45 which is formed in the discontinuities.

As for a preferred structure of the bonding reinforcing phase, a better reinforcing bonding phase effect is realized with a thin bonding reinforcing phase and the smaller spacing of the bonding reinforcing phases and with a higher number density. Furthermore, the interface between the bonding reinforcing phase and the second phase should preferably be complex so that the contact area between said phases is increased, the retaining force is increased and an anchoring effect can be expected. By this means, the adjoining first phases can be bonded strongly, and the second phase can be fixed and retained strongly in the first phase.

Another preferred structure of the bonding reinforcing phase is that in which a three-dimensional network is formed with the first phase and the second phase and the first phase and the second phase are bonded strongly via a discontinuous phase of the second phase. By this means, it is possible to exhibit the properties of the first phase satisfactorily and to exhibit the properties of the second phase without adversely affecting the mechanical properties, such as the strength and impact resistance.

The bonding reinforcing phase is a phase which fulfills the function of alleviating or preventing the decreasing in strength which is liable to arise when a dispersion material is dispersed in the form of a three-dimensional network. With particle dispersion reinforcement, reinforcement is facilitated as the reinforcing material is dispersed as uniformly as possible in the matrix on a large scale. On the other hand, dispersion at as high a density as possible so as to form paths such as three-dimensional networks of the dispersion material is more effective for exhibiting effectively functional properties with the addition of a dispersion material which has properties such as electrical or thermal conductivity or magnetic properties for example. However, when continuous paths of dispersion material are formed in the composite material, there is a danger of a low strength phase being formed because of the local poor sinterability in the path parts, and cracks are liable to extend along the paths, for example, and there is a danger that the mechanical properties, such as the fracture strength and the fatigue strength, will inevitably fall.

Thus, a preferred composite material of this invention with which these problems are resolved is characterized in that it is a composite material in which: composite material cells are formed as the structural units, each comprising a first phase comprising a plurality of matrix crystal grains as the base material and a second phase in which a bonding reinforcing phase is dispersed in the form of a three-dimensional network as a single cell so as to surround said plurality of matrix crystal grains and the dispersion material is dispersed therein; the dispersion material of the aforementioned second phase is dispersed discontinuously in the form of a three-dimensional network in the composite material; and the bonding reinforcing phase of the second phase is dispersed continuously or/and discontinuously in the form of a three-dimensional network in the composite material. By this means, it is possible to realize the effects of the invention satisfactorily and to suppress satisfactorily loss of strength of the high density three-dimensional network-like dispersion phase.

Preferred materials for the bonding reinforcing phase include inorganic materials such as the readily sintered oxides, nitrides and boride systems, e.g. $SiO_2$, $Si$, $Al_2O_3$, $ZrO_2$, $MgO$, $AlN$, $La_2O_3$, $CeO_2$, $Yb_2O_3$, $Ta_2O_5$, $TiO_2$, $BaO$, $TiN$, $Sc_2O_3$, $BeO$, $Al_2O_3$—$BeSiO_4$, $YN$, $Y_2O_3$, $ZrSi_2$, $CrB_2$, $ZnO$, $PbO$, $Bi_2O_3$, $CuO$ and $Fe_2O_3$, and/or fine particles of inorganic materials. Furthermore, metals and polymers with aforementioned properties will do. The bonding reinforcing phase should have good wetting properties with the matrix and, moreover, it should contain at least one type of material which has good sinterability when compared with the matrix, and it may be constructed with two or more materials including the matrix and materials with poorer sintering properties than the matrix. Furthermore, it may be amorphous, crystalline, a single crystal or an amorphous and crystalline mixed phase. Moreover, only crystalline materials or materials including a high proportion of crystalline material are preferred in cases where the composite material is to be used as a material for use at elevated temperatures.

The structure of this bonding reinforcing phase where the material thereof is elongate, is preferably a uniform structure with few large grains and with long and thin needle-like or platelike forms which have a large aspect ratio. When the material of the bonding reinforcing phase is equiaxial, a uniform structure with a small grain diameter and few large coarse grains is preferred. Furthermore, a material with no foreign material or pores of more than a fixed size is preferred. Furthermore, the reinforcing phase may be reinforced further with whiskers, fibers, or the like within the range which does not impede sintering.

Furthermore, the material for the bonding reinforcing phase should preferably be a material of which the thermal expansion coefficient and the elastic modulus are the same as, or similar to those of the matrix, or a material of which the thermal expansion coefficient and the elastic modulus are between those of the matrix and the dispersion material and close to those of the matrix. By using this material, it is possible to suppress satisfactorily the reduction of the strength caused by path formation of dispersion material since the internal stress (thermal stress) which is generated between the matrix and the dispersion material can be reduced. Furthermore, the above material is preferable since the wetting properties with the matrix are good, that is, the material is readily compatible.

Another Preferred Composite Material of the First Aspect

Another preferred composite material of the first aspect is characterized in that it is a composite material in which: composite material cells are formed as structural units, each comprising a first phase comprising a base material and a second phase comprising a dispersion material which surrounds said first phase discontinuously; the aforementioned dispersed material is dispersed discontinuously in the form of a three-dimensional network in the composite material; and the dispersion material dispersed in the matrix has a dispersion structure such that, when any single unit of dispersion material $P_o$ is taken as the origin, the dispersion material closest to said $P_o$ (the first selected discontinuity) is taken as $P_1$, the dispersion material which is closest to the aforementioned $P_1$ and has not yet been selected (the second selected discontinuity) is taken as $P_2$, the selection is carried out sequentially to $P_n$ (the $n^{th}$ selected discontinuity), and the linear distance from the aforementioned dispersion material $P_o$ as the origin to the respective dispersion material $P_i$ (i=1, 2, ..., n) is taken to be $Ls_i$, said distance $Ls_i$ varies periodically within a specified range.

This composite material provides effects such as those indicated below in addition to the aforementioned effects of the composite materials of this invention.

With this composite material, the dispersion material in the base material has a dispersion structure in which, when any single unit of dispersion material $P_o$ is taken as the origin, the dispersion material closest to said $P_o$ is taken as $P_1$, the dispersion material closest to the $P_1$ and has not yet been selected is taken as $P_2$, the selection is carried out sequentially to $P_n$, and the linear distance from the dispersion material $P_o$ as the origin to the respective dispersion material $P_i$ (i=1, 2, ..., n) is taken to be $Ls_i$, said distance $Ls_i$ varies periodically within a specified range. Since the dispersion material dispersed in the base material, i.e., in the composite material, has such a dispersion structure, the dispersion material of the second phase has a structure in the base material such that a plurality of closed loops with common contact parts of a prescribed size are formed. This serves as a kind of a skeletal structure for reinforcing the matrix and suppressing softening and dislocation at high temperature and the movements of element diffusion. Furthermore, in those cases where a material for improving thermal or electrical conductivity has been selected for the dispersion material, thermal or electrical conduction will be possible as a result of the formation of pathways by way of these closed loops.

This composite material, in comparison with the aforementioned composite materials, will have higher functional properties without adversely affecting the mechanical properties, such as the strength and impact resistance of the first phase and the matrix.

Namely, this composite material exhibits the characteristics of the dispersion material and the base material more satisfactorily without adversely affecting the mechanical properties of the matrix.

The Dispersion Structure which Varies Periodically

Another preferred composite material of this first aspect is described with reference to FIG. 9 and FIG. 10.

Figure 9:
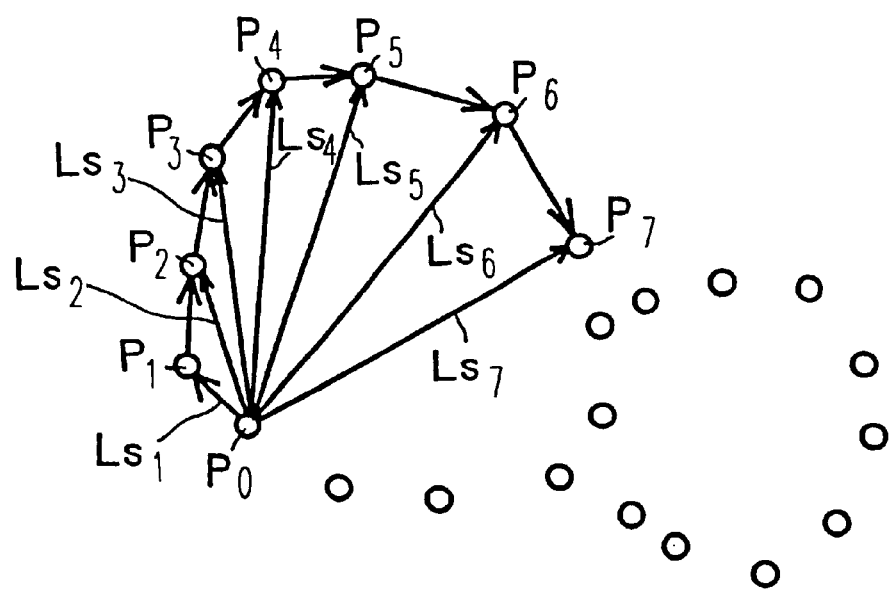

As shown in FIG. 9, any one unit of the dispersion material is selected first of all in the aforementioned dispersion material which has been dispersed in the base material and this is taken as $P_o$.

Next, taking this $P_o$ as the origin, the dispersion material which is closest to $P_o$ (and which is not continuous with $P_o$) is selected first and taken as $P_1$. Then the dispersion material which is closest to $P_1$ but has not yet been selected (and which is not continuous with $P_o$ and $P_1$) is selected second and taken as $P_2$.

Next, selections are made sequentially in the same way up to $P_n$ (the $n^{th}$ selected discontinuity).

Then the linear distance between the aforementioned dispersion material $P_o$ which is the origin and the respective dispersion materials $P_i$ (i=1, 2, ..., n) is taken as $Ls_i/\Sigma Ls_i$.

Figure 10:
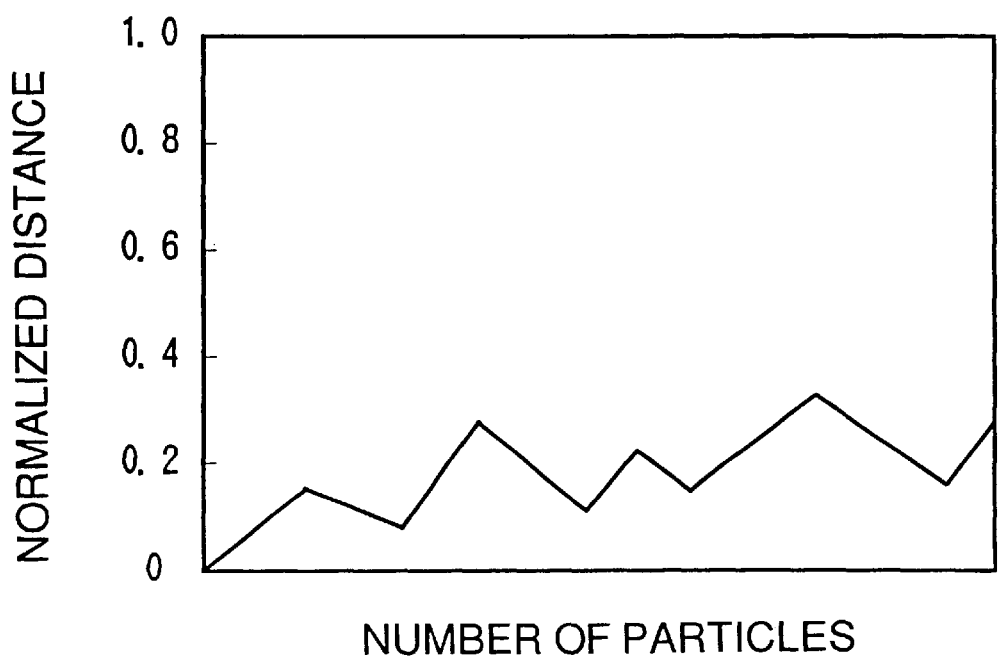

Next, the number of particles is plotted as abscissa and the normalized distance $Ls_i$ as ordinate, as shown in FIG. 10.

A preferred composite material of this invention is a composite material which has a dispersion structure such that there is a periodic variation within a specified range, as shown in FIG. 10.

Here, a dispersion structure which varies periodically is a structure in which the dispersion material forms a large number of closed loops throughout the whole of the base material, and the period also differs according to the form of the closed loop, but the variation is within the range of the diameter when it is circular or nearly circular, while within the range of the long axis diameter when it is elliptical or prismatic.

Figure 11:
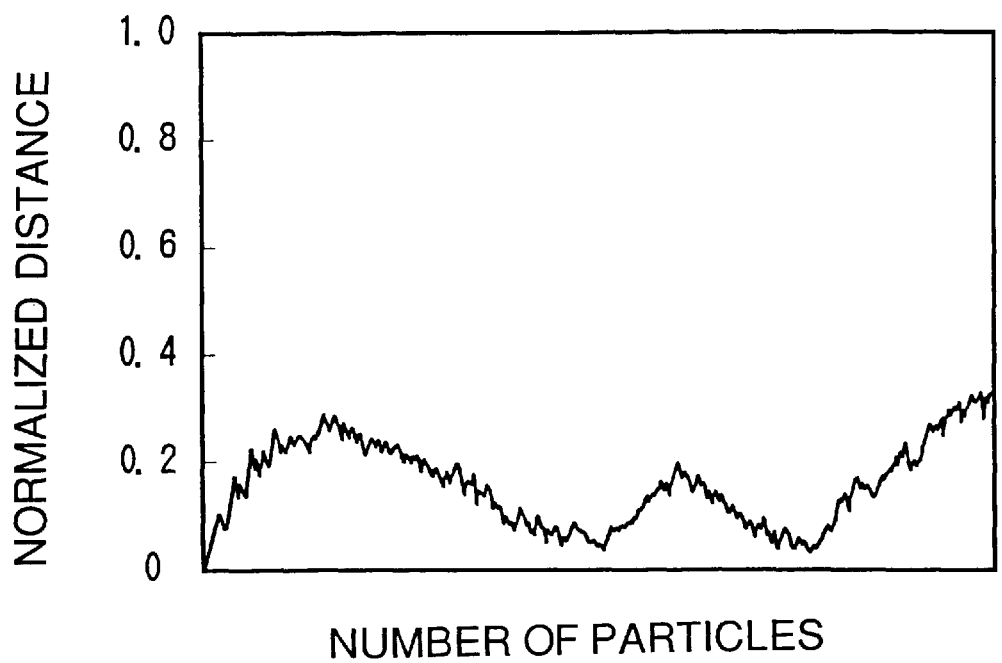
Figure 12:
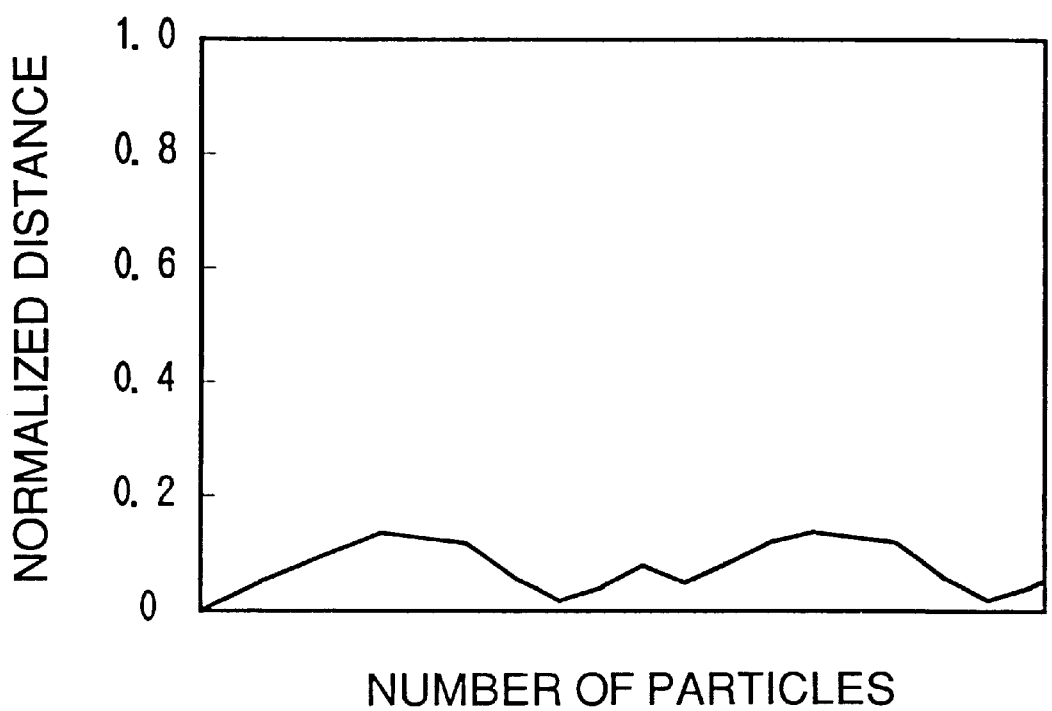

Furthermore, other preferred examples of dispersion structures of composite materials of this invention which vary periodically are shown in FIG. 11 and FIG. 12.

Figure 13:
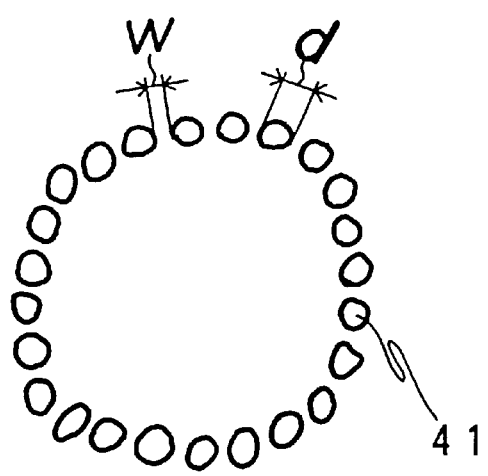

Furthermore, a preferred dispersion structure is a structure in which the dispersion material is dispersed in a form such that the spacing W of the dispersion medium is not more than (½)d, as shown in FIG. 13.

Figure 14:
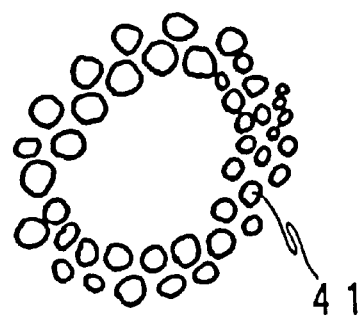

Furthermore, another preferred dispersion structure is the one in which the dispersion material forms multilayer closed loops, as shown in FIG. 14.

Furthermore, the period may be constant or it may vary, but there must be at least 4 particles per period, and at least 8 particles is preferred. Furthermore, the distance $Ls_i$ is preferably within the range $0.01 \mu m \leq Ls_i \leq 20$ mm, and most desirably within the range $0.1 \mu m \leq Ls_i \leq 1$ mm.

Furthermore, the dispersion structure may be such that the dispersion material varies up and down periodically within a specified range and increases as a whole.

Method for the Manufacture of Composite Materials of the First Aspect

An example of a method for the manufacture of a composite material of this first aspect will be described in simple terms.

First of all, a composite powder is coordinated in a composite powder fabricating process in such a way that a dispersion material of prescribed form is present discontinuously on the surface of a granules of a prescribed form as the main raw material of the base material. That is to say, the composite powder is fabricated in such a way that the dispersion material is present on granules of the matrix powder which has been granulated into at least the prescribed size. That is to say, the dispersion material is scattered discontinuously on the surface of said granules, or the surface of the granules is partially covered with the film of dispersion material by the CVD method, the PVD method or by means of a chemical method such as the alkoxide method, the sol-gel method, the surface decorating method or the like.

Next, in a molding process, the composite powder which has been obtained in the aforementioned composite powder fabricating process is molded to the prescribed form and formed into a molding. By this means, the molding before sintering has the dispersion material present discontinuously in the gaps between the granules or on at least the surface of adjoining granules which form the main raw material of the base material, for example, and the dispersion material can be present discontinuously in the whole of the molding. Moreover, CIP (Cold Isostatic Pressing) can be carried out as required.

Then, in a composite material forming process, the molding obtained in the aforementioned molding process is heated, whereupon the sintered body is made denser as a whole by sintering or melting of the adjoining granulated powder together via the surfaces of the granules where no dispersion material is present. Moreover, a denser sintered body can be obtained by carrying out an HIP (Hot Isostatic Pressing) treatment after sintering.

Thus, a composite material is provided, in which composite material cells, each comprising a first phase comprising the material of the base material and a second phase comprising dispersed material which surrounds discontinuously said first phase, are formed as the structural units, and the dispersed material is dispersed discontinuously in the form of a three-dimensional network in the base material, i.e. in the composite material.

When a dispersion material for reinforcement is used, a discontinuous skeletal structure with a three-dimensional network structure which is particle-reinforced by dispersion material such as particles or whiskers is formed in the base material by the whole of the second phase, and thus pores which are the main cause of the decrease in strength are not produced in the forming process by this method. The skeletal structure resists a high stress and the dispersion material itself suppresses the movement of dislocations and crack extension between facing first phases in contact with the second phase. It is possible in this way to increase the strength and toughness. Moreover, decline of the mechanical and thermal shock properties can be suppressed by the formation of the three-dimensional network structure.

Furthermore, when a highly heat resistant dispersion material is used, it is possible to form a skeletal structure which is highly heat resistant by means of the whole of the second phase, and it is possible to suppress softening deformation of the composite material by means of this skeletal part. Moreover, the movement of dislocations and grain boundary sliding due to softening of the crystal grains can be prevented by the dispersion material itself which forms the second phase and so it is possible to increase fracture strength and the creep resistance at high temperature. In particular, because the dispersed material which forms the second phase is dispersed discontinuously, even if cracks extend in the dispersion material or along the boundary surface between the dispersion material and the base material, there are no paths along which the cracks can extend as they would in a continuous phase, and they are unlikely to propagate.

Furthermore, when a dispersion material which imparts functionality is used, it is possible to achieve a higher degree of density than the dispersion material takes a continuous network form, and pores which become fracture origins are unlikely to form, and it is possible to impart the functionality without reducing the strength.

Thus, by the method of manufacture described above, it is possible to manufacture easily composite materials which exhibits the properties of the dispersion material of the second phase satisfactorily without adversely affecting the mechanical properties of the base material.

The grain diameter (dm) of the granulated powder obtained by granulating the matrix powder as the main raw material is not more than 5.0 mm; the average primary particle diameter or average diameter (dp) of the dispersion material such as particles or whiskers is not more than 500 $\mu$m; and dp/dm is preferably in the range from 0.50 to $1 \times 10^{-8}$. Within this range, it is possible to form easily a three-dimensional network structure with the dispersion material for exhibiting satisfactorily the properties of the dispersion material. The dp/dm is preferably from 0.1 to $1 \times 10^{-5}$ to facilitate the formation of the discontinuous network structure. Furthermore, the formation of the discontinuous network structure is facilitated by regulating the size of the dispersion material to not more than 180 $\mu$m in this case.

The matrix powder for the base material is preferably formed into granules of grain size within the range from 2 $\mu$m to 2 mm. The range from 5 $\mu$m to 2 mm is most desirable.

The methods for the manufacture of composite materials of this invention with the different matrix materials are described below.

When the matrix is a ceramic material, the matrix material and a sintering aid are mixed either in dry or in wet state and then pulverized to a fixed grain diameter or adjusted by a spray-drying method to obtain granules. Then, the dispersion material is scattered discontinuously over the surface of granules. The powder is then molded in a mold and subjected to CIP. The resultant material is then subjected to hot pressureless sintering, hot pressing, hot isostatic pressing (HIP) or the like to obtain a composite material of this present invention.

When the matrix is a metal material, the dispersion material is scattered discontinuously, or formed into localized films, on the surface of a matrix material powder which has been pulverized, granulated or atomized to a fixed grain diameter. Subsequently, a composite material of the present invention can be manufactured by molding and sintering this powder.

When the matrix is a polymer material, the matrix material and additives, such as fillers and surface treatment materials, are mixed with the matrix material and formed into spherical or columnar pellets and the dispersion material is scattered on the pellets. It is possible to manufacture a composite material of this present invention by packing these into a mold and heating and pressing.

As has been described above, in manufacturing a composite material of the first aspect, the addition of the dispersion material is carried out in a single process and so with good productivity.

Preferred Method of Manufacture

In a preferred method for the manufacture of a composite material of the first aspect, a composite powder is fabricated in such a way that a dispersion material of the prescribed form is present in a discontinuous state on the surface of granules of the prescribed form which are obtained by mixing additives for reinforcing the base material or imparting function thereto with a main raw material powder as a main material of a base material, and then said composite powder is molded into the prescribed form and subjected to heating to form a composite material. A composite material in which the dispersion material is dispersed discontinuously in the form of a network and in which the additive is dispersed uniformly in the first phase can be obtained by means of this procedure.

Another Preferred Method of Manufacture

In another preferred method of the first aspect, a composite powder is fabricated in such a state that dispersion material of the prescribed form and a sinter-improving agent which is the same material as the matrix and which is of the same size as the dispersion material or of a smaller size than that of the dispersion agent are present discontinuously on the surface of granules of the prescribed form as the main raw material of the base material, and then said composite powder is molded into the prescribed form and heated and a composite material is formed. By doing this, the dispersion material is readily dispersed discontinuously in the form of a three-dimensional network, and the sintering properties can also be improved.

The same material as the base material, or those materials generally used as sintering materials of the dispersion material, can be used for the additive. In a silicon nitride-silicon carbide system, silicon nitride, or a material used as a sintering aid for said silicon nitride, such as yttria, alumina, ytterbium, spinel, magnesium oxide, or a material used as a sintering aid for silicon carbide, such as carbon, arsenic, alumina, aluminum nitride and the like can be used for the additive. Examples of other additives include oxides, borides, suicides, and nitrides, such as lanthanum oxide, niobium, zirconia, nickel, copper, chromium, iron, bismuth oxide, iron oxide, aluminum, niobium oxide, titanium nitride, titanium boride, calcium oxide, scandium oxide hafnium oxide and the like. Furthermore, it is possible to improve sinterability further by using particles which are denser than dispersion material or the matrix as an additive.

A composite material of the first aspect can be used as a structural material or as a functional material, for example, since the function of the dispersion material is realized satisfactorily.

For example, if silicon carbide which is stable at high temperature is added to silicon nitride which has a high strength at room temperature and a three-dimensional network structure of silicon carbide is formed within the silicon nitride, then it is possible to improve the room temperature strength and the high temperature strength, and the creep resistance and the oxidation resistance all at the same time.

Moreover, the mechanical and electrical properties such as the provision of high elasticity or electrical conductivity can be greatly improved when compared with those of the conventional composite materials.

Furthermore, as for resins for IC sealing purposes, it is possible to improve further the thermal conductivity without reducing the electrical insulation by forming a discontinuous three-dimensional network structure of silicon carbide, aluminum nitride or boron nitride which has a high thermal conductivity in said resin.

Furthermore, as for metals, it is possible to increase the friction and wear resistance and the rigidity and oxidation resistance without causing reduction of strength by dispersing zirconia, alumina or yttria which is highly rigid and of high hardness in the form of discontinuous three-dimensional network in a stainless steel. Moreover, it is possible to obtain composite material with good thermal insulating properties by adding a material of low thermal conductivity such as zirconia, alumina, silica or hafnia.

The Second Aspect

Constitution of the Second Aspect

A composite material of this second aspect of this invention is characterized in that: it is a composite material comprising a base material, a reinforcing layer comprising material which resembles the aforementioned base material and is dispersed continuously in the form of a three-dimensional network in said base material, and a dispersion material which is dispersed discontinuously in said reinforcing layer; the reinforcing layer bonds the base material together strongly and retains the dispersion material strongly; and the dispersion material is dispersed discontinuously in the form of a three-dimensional network in the composite material.

Effect of the Second Aspect

A composite material of the second aspect can exhibit satisfactorily the properties of the dispersion material without adversely affecting the mechanical properties of the base material.

Function of the Second Aspect

The mechanism by which a composite material of this second aspect realized this excellent effect is as yet unclear, but it is thought to be as indicated below.

First of all, a composite material of the second aspect has a reinforcing layer comprising material which resembles the base material, i.e. the same material as the base material or a substance which has properties resembling those of the base material, and is dispersed continuously in the form of a three-dimensional network in the aforementioned base material. Since the reinforcing layer comprises the same material as the base material or a material which has properties resembling those of the base material and is dispersed continuously in the base material, the adjoining base material which sandwiches the reinforcing layer can bond strongly with the reinforcing layer and so the desired properties can be exhibited without losing the mechanical and/or physical properties of the base material itself. Moreover, strong bonding is obtained at the boundary surface between the base material and the reinforcing layer, and pores (fine holes) are not liable to form at the boundary surface between the base material and the reinforcing layer or in the reinforcing layer on sintering, and so the strength of the composite material is not reduced by the presence of the reinforcing layer.

Next, a composite material of the second aspect has the dispersion material dispersed discontinuously in the aforementioned reinforcing layer and said dispersion material is dispersed discontinuously in the form of a three-dimensional network in the aforementioned base material.

The dispersion material is dispersed discontinuously in the reinforcing layer and so, even if the dispersion material is difficult to be densified, because of the presence of the material which resembles the base material in the reinforcing layer, there are few fine pores (which become points of origin for failure) at the boundary surface between the reinforcing layer and the dispersion material, and not only is it possible to suppress the reduction of strength as a result of this, but the dispersion material can be strongly retained in the reinforcing layer.

Furthermore, in those cases where the thermal expansion coefficient of the dispersion material is greatly different from that of the base material, internal stresses are generated as a result of the difference in the thermal expansion coefficient of the dispersion material and the mechanical properties are adversely affected in a state in which the dispersion material is dispersed continuously, but the internal stresses can be alleviated by the discontinuities which are formed by the dispersion material in this invention. It is possible in this way to suppress the adverse effect on the mechanical properties, such as the fracture strength and the impact resistance and fatigue resistance.

Next, since the dispersion material is dispersed discontinuously in the form of a three-dimensional network in the base material, a high density dispersion phase is formed in the form of three-dimensional network in the whole of the base material and so paths can be formed so that the mechanical properties and/or physical properties of the dispersion material can be exhibited strongly and the various properties can be exhibited via these paths.

Furthermore, even if cracks occur at the boundary surface between the base material and the reinforcing layer, cracks are unlikely to extend because of crack detours or/and absorption effects due to the so-called composition and so there is no degradation of the strength of the composite material due to the presence of the aforementioned reinforcing layer.

That is to say, since the dispersion material is dispersed discontinuously in the form of a three-dimensional network in the base material, it can be conjectured that a synergistic effect between the strengthening effect of the dispersion material (dispersed phase) itself such as of particles, whiskers or fibers, for example, as described below and the strengthening effect due to the skeletal structure of the dispersion material will be obtained.

At room temperature, when a high stress is imposed on the base material which has a higher strength than the dispersion material, the movement of dislocations is prevented within the network mesh by the dispersion material which has been dispersed in the form of a three-dimensional network, and the extension of cracks can be suppressed. Furthermore, at high temperatures grain boundary sliding and the movement of dislocations is prevented (pinning effects due to the dispersion material) by the skeletal part of the three-dimensional network structure of the dispersion medium, and the fracture strength and the fatigue strength and creep properties can be improved by suppressing the softening deformation of the composite material. In particular, since the dispersion material is dispersed discontinuously, when compared with a case where it is dispersed continuously in the form of a three-dimensional network, even if cracks occur in the dispersion material or along the boundary surface between the dispersion material and the base material, crack propagation is difficult and thermal and mechanical shocks can also be relieved easily. Moreover, since pores which act as origins of failure in the composite material are not liable to form as a result of the increased density, a fall in strength due to pore formation is not liable to occur. In this way, effective reinforcement is possible at room temperature and at high temperatures.

That is to say, in those cases where a dispersion material is used with a view to reinforcement, said dispersion material forms a skeletal structure where it is dispersed discontinuously in the form of a three-dimensional network in the base material, as well as providing particle reinforcement by means of the dispersion material such as particles, whiskers, or the like. Moreover, pores etc. which are the main cause of a degradation of strength are not formed by the formation of said structure. A skeletal structure of this type can resist high stress and the dispersion material itself can prevent the movement of dislocations and crack extension between adjoining network meshes when high stresses are imposed. The strength and toughness can be improved by this means. Furthermore, in those cases where a highly heat resistant dispersion material is used, the movement of dislocations and grain boundary sliding due to softening of the crystal grain boundaries can be suppressed by the dispersion material itself and so the fracture strength, creep resistance and fatigue strength at high temperature can be improved. In particular, even if cracks extend in the dispersion material or along the boundary surface between the base material and the dispersion material, there are no paths through which the cracks can extend seriously as in the case of continuous phase because the dispersion material is dispersed discontinuously, and they are not liable to propagate.

Furthermore, in those cases where a dispersion material which imparts functionality is used for the dispersion material, higher density than with a continuous network can be devised, pores which become origins of failure are less liable to be formed, and functionality can be imparted without decreasing the strength. Furthermore, since the dispersion material is discontinuous, the physical and chemical properties of the base material itself is also easily exhibited.

Furthermore, since the dispersion material is arranged in the form of a network mesh, the properties of the dispersion material can be exhibited more strongly than with a uniform dispersion system. Moreover, the amount of dispersion material added can be reduced when compared with that in a continuous network structure.

It is thought that, by the means indicated above, a composite material of this invention can be a composite material with which the properties of the dispersion material are exhibited satisfactorily without adversely affecting the mechanical properties of the base material.

The Base Material

The base material (matrix) is the basic material of the composite material, and materials such as ceramics, metals, resins and intermetallic compounds, for example, can be used, and it may be crystalline or amorphous.

The Reinforcing Layer

The reinforcing layer comprises material which resembles the aforementioned base material (including the same material) and it is dispersed continuously in the form of a three-dimensional network in the base material. Furthermore, the dispersion material is dispersed discontinuously in said reinforcing layer. Moreover, the state of dispersion of said dispersion material may be random, uniform or in a network form, provided that it is discontinuous.

That is to say, the reinforcing layer is comprised of a substance which resembles the aforementioned base material, and a material which also fulfills the role of a bonding phase for the adjoining base material phases which sandwich said reinforcing layer is preferred.

Here, the term "resembles" the base material signifies, for example, (1) the base material itself, (2) the amorphous material of a crystalline base material, (3) a material of which the fusion point is similar to, or lower than, that of the base material, and which has good wetting properties on the base material or/and the dispersion material, (4) a material (phase) which has a higher density than the base material, (5) an amorphous material (phase) or a single crystal material (phase) of the same properties as the base material, (6) a phase which has a smaller elastic modulus than the base material, (7) a phase which has a smaller thermal expansion coefficient than the base material and the dispersion material, (8) a phase comprising the same type of element as the dispersion material, (9) a mixed phase of base material and its sintering aid, (10) sintering aid for the base material and/or dispersion material and (11) plasticizer.

Examples of actual materials include, in those cases where the matrix is $Si_3N_4$; $Si_3N_4$, $CeO_2$, $BeO$, $Al_2O_3$, $Y_2O_3$, $MgSiO_3$, $La_2O_3$, $ZrO_2$, $AlN$, $SiO_2$, $MgO$, $Nd_2O_3$, $Sm_2O_3$, $Dy_2O_3$, $Yb_2O_3$, $BeSiO_4$, $Mg_3N_2$—$Be_3N_2$, $MgSiN_2$, $YN$, $Sc_2O_3$ and $TiN$.

In those cases where the matrix is $Al_2O_3$, actual examples include $AlN$, $Al_2O_3$, $SiO_2$, $MgO$ and $ZrO_2$.

In those cases where the matrix is SiC, actual examples include SiC, B, C and $Al_2O_3$.

In those cases where the matrix is stainless steel, actual examples include Al, $ThO_2$, Mn, Cr, Fe, Ti, Mo, Cu, $Y_2O_3$ and B.

In those cases where the matrix is Fe, actual examples include Cr, Ni and B.

In those cases where the matrix is a thermoplastic resin, actual examples include thermoplastic resins and thermoset resins.

The reinforcing layer of a composite material of this second aspect comprises material of the same nature as the base material, and it preferably comprises crystal grains of which grain diameter is finer and/or of which the aspect ratio is larger than that of the base material. By this means, a tough reinforcing phase with high strength can be formed, and the retention performance of the dispersed material can be greatly improved.

Furthermore, a reinforcing layer comprising the amorphous material of a crystalline base material is preferred. By this means it is possible to form a reinforcing phase which readily conforms with the base material.

A reinforcing layer preferably comprises material of which the fusion point is of the same order as, or lower than, that of the base material, and which readily wets the base material and/or the dispersion material. Then, the density is higher than that of the matrix phase and there are very few pores at the boundary surface with the base material or the dispersion material, and a reinforcing layer which has a high crystallinity can be obtained. Hence, it is possible to achieve strong matrix/matrix and matrix/dispersion material bonding.

A reinforcing layer preferably comprises material which has a higher density than that of the base material. Then, the failure does not arise in the reinforcing layer and it is possible to retain the dispersion material strongly.

A reinforcing layer preferably comprises amorphous material or single crystal material of the same nature as the base material. Then, the reinforcing layer and the matrix conform well, and it is possible to realize a high matrix/matrix bonding strength via the reinforcing layer.

A reinforcing layer preferably comprises material which has lower elastic modulus than the base material. Then, the thermal and mechanical shock resistance can be relieved by the reinforcing layer and it is possible to realize a high shock resistance.

A reinforcing layer preferably comprises material which has a smaller thermal expansion coefficient than the base material and the dispersion material. Then, it is possible to relieve the internal stresses which are generated by the difference in thermal expansion between the base material and the dispersion material.

A reinforcing layer preferably comprises the same type of element as the dispersion material. By this means, conformation of the reinforcing layer and the dispersion material is facilitated and the dispersion material can be retained strongly in the reinforcing layer. Furthermore, it is possible to produce the dispersion material in-situ using part of the structural element in the reinforcing layer, and a strong retaining force is obtained by this means.

A reinforcing layer preferably comprises a mixed phase of base material and sintering aid. By this means it is possible for the dispersion material to be strongly retained within the composite material.

A reinforcing layer preferably comprises sintered material of the base material and/or the dispersion material. By this means the dispersion material can be strongly retained within the reinforcing layer.

A reinforcing layer preferably comprises plasticizer so that the wetability of the dispersion material and the reinforcing layer is increased and the retaining strength of the dispersion material in the reinforcing layer can be increased.

A reinforcing layer which has compatibility with the base material is preferable. By this means it is possible to raise the retaining capacity of the dispersion material in the base material.

Here, the state of existence of the reinforcing layer in the base material is a continuous dispersion in the form of a three-dimensional network in the base material.

Figure 15:
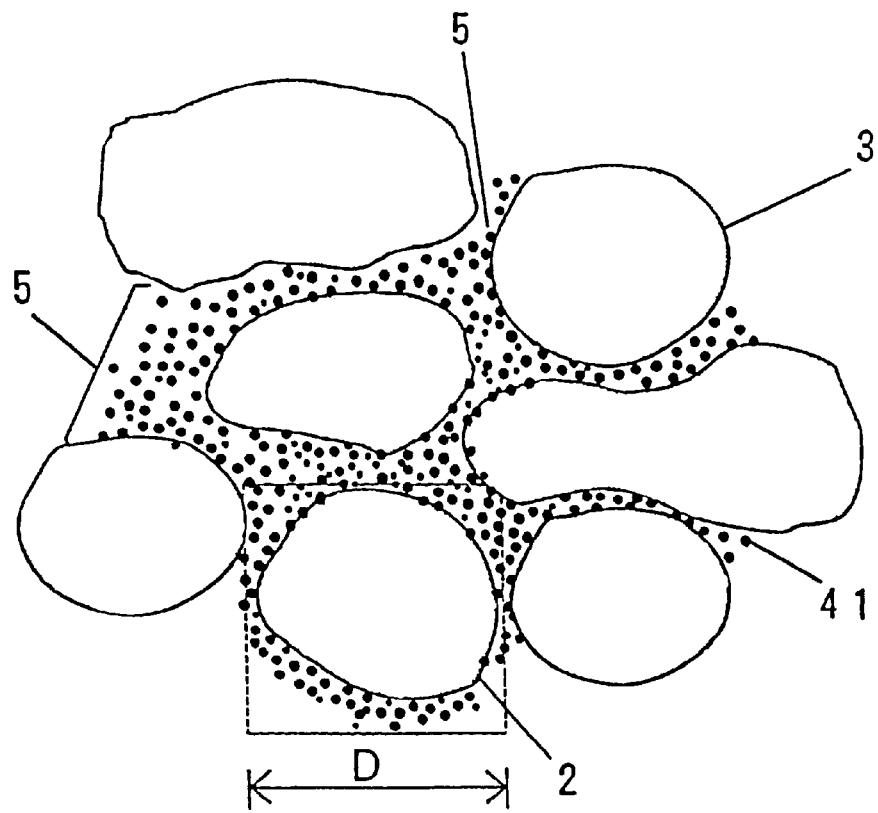

In practical terms, in one example, the cell-like unit 2 in which the base material 3 is separated by the reinforcing layer 5, as shown in FIG. 15, is taken as a single unit, and just the reinforcing layer 5 is dispersed continuously in the form of a three-dimensional network. In this case there is an advantage in that the base material can be strongly bound together by the reinforcing layer which is dispersed in a three-dimensional network.

Figure 16:
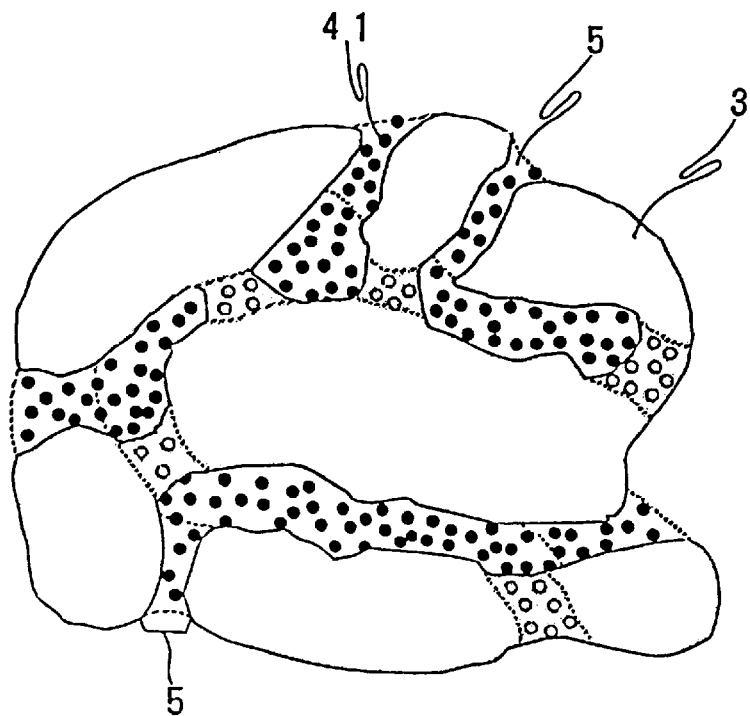

In another example, the base material 3 and the reinforcing layer 5 are both formed in the form of a continuous three-dimensional network, as shown in FIG. 16. In this case there is an advantage in that not only the properties of the reinforcing layer 5 but also the properties of the base material 3 can be exhibited more strongly.

Figure 17:
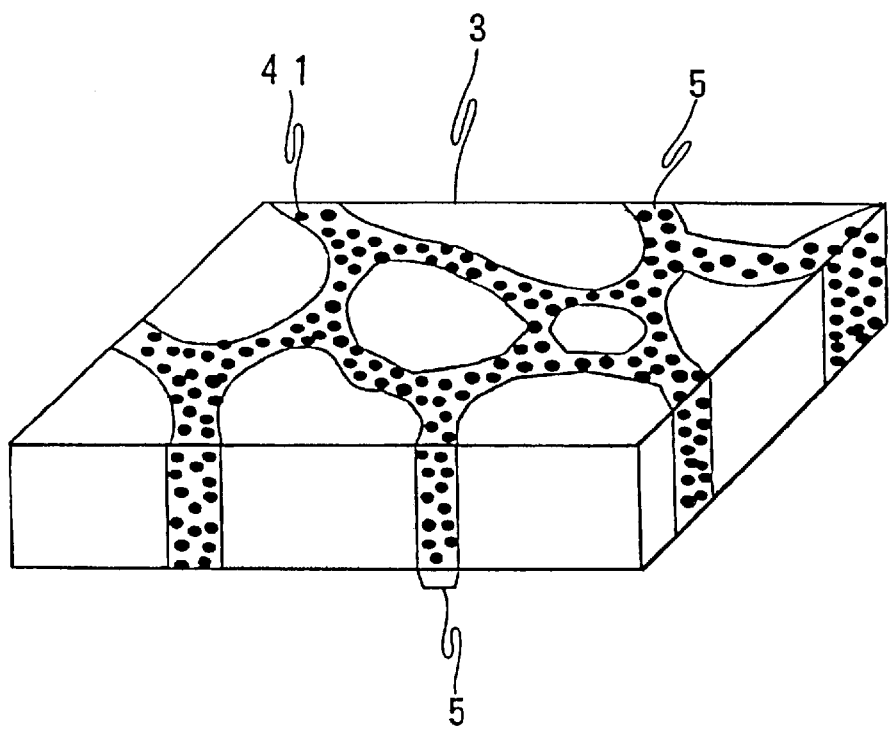

In a further example, the reinforcing layers 5 each dispersed as a two-dimensional network are laminated, as shown in FIG. 17. In this case it is possible to bring about anisotropy such that strong properties can be exhibited in two-dimensional directions (the surface directions). There is an advantage in that this is especially effective in the case of thin sheets.

Moreover, a preferred reinforcing layer comprises a material which resembles the aforementioned base material is dispersed continuously in the form of a three-dimensional network in the base material, and has a structure such that the size of one network mesh of a part which is formed by said reinforcing layer and dispersion material (for example D in FIG. 15) is within the range $1\ \mu m \leq D \leq 1000\ \mu m$, said parts forming paths in the form of a three-dimensional network. In the case of this structure, the material resembling the base material which is mixed in the reinforcing layer and the dispersion material can be strongly bound by means of a grain boundary phase, and a unique effect can be obtained such that the effect of a reinforcing layer of a three-dimensional network structure which is formed by these can be realized strongly.

The Dispersion Material

The dispersion material is dispersed in the reinforcing layer (and therefore in the matrix) with a view to improving the mechanical properties and physical and chemical properties of the matrix, and it may be any material among those having mechanical properties such as heat resistance, fusion resistance, oxidation resistance, resistance to chemical attack, high hardness, high elasticity, free-cutting properties, electric discharge machining and the like, or those having physical and chemical properties, such as thermal conductivity, thermal insulating properties, electrical conductivity, magnetic properties, piezoelectric properties, optical properties and the like. The dispersion materials may be materials such as ceramics, metals, resins and intermetallic compounds, and they may be crystalline or amorphous materials. They may be in form of particles, whiskers, fibers or the like.

The dispersion material may be of one type, or of a plurality of types with different properties (physical and chemical properties and/or mechanical properties) to be imparted.

The state of dispersion of the dispersion material in the reinforcing layer may be, for example, (1) a state in which the dispersion material is dispersed uniformly or at random in the reinforcing layer, (2) a state in which the dispersion material is dispersed unevenly in the reinforcing layer or (3) a state in which the dispersion material is dispersed regularly in a specified state such as a network or layerlike state in the reinforcing layer.

Furthermore, the units of dispersion material which are dispersed in the reinforcing layer may be (a) individual units such as single particles or whiskers, (b) individual parts (parts comprising the smallest structural units) and parts in which said individual parts are connected or aggregated are mixed to form discontinuities, or (c) aggregate blocks in which the aforementioned individual parts are connected or aggregated to form discontinuities, or they may be combinations of any of these forms. In this case, the dispersion material to be formed into a larger body may be of one type, or of a plurality of types with different properties (mechanical properties and/or physical and chemical properties) to be imparted.

Figure 18:
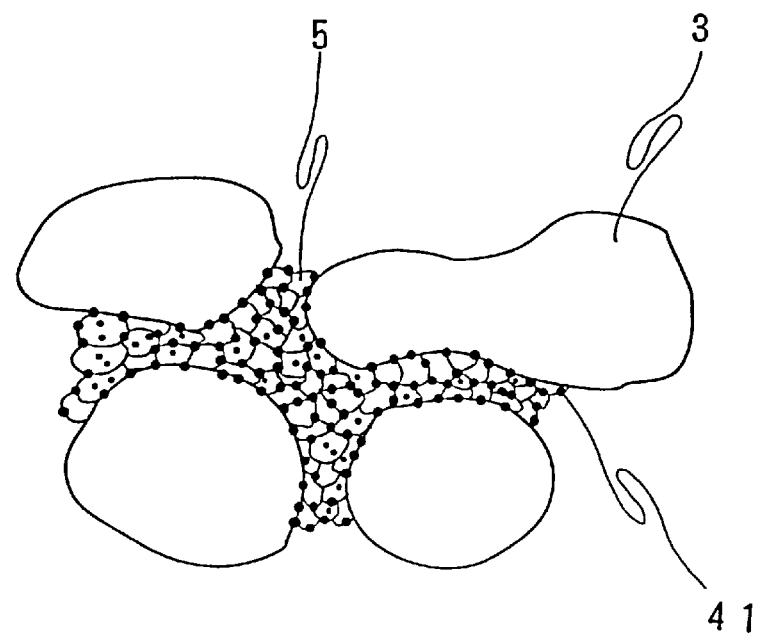

The state of dispersion of the dispersion material in the reinforcing layer is, concretely, a state in which the dispersion material 41 is dispersed at random in the whole of the reinforcing layer 5, as shown in FIG. 18. In this case, the dispersion material 41 can be retained individually (smallest units) in the reinforcing layer 5 comprising a material which resembles the base material (residual stress distribution is uniform) and so it is possible to exhibit a high fracture strength, and there is also an advantage in that high impact resistance and fatigue strength are obtained.

Figure 19:
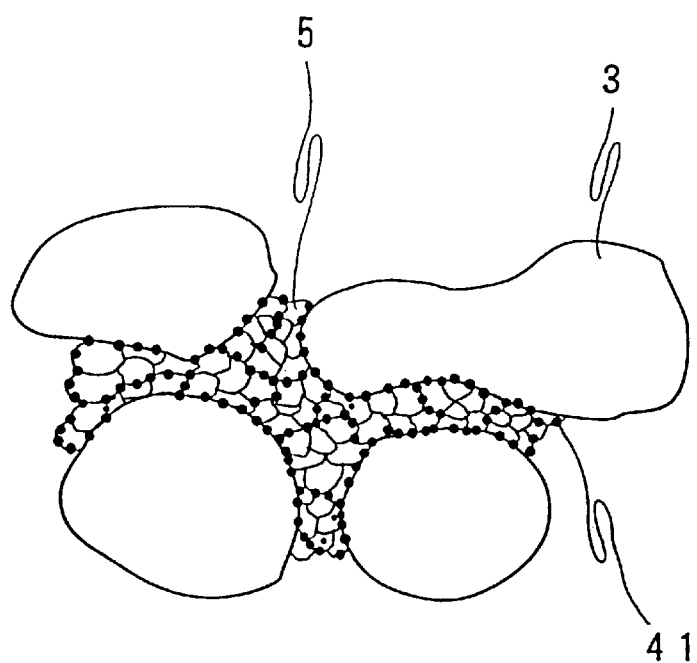

Another actual state of dispersion of the dispersion material is that in which the dispersion material 41 forms a discontinuous network structure (including partially discontinuous network structures) in the reinforcing layer 5, as shown in FIG. 19.

In this case, the strength is somewhat lower than in the case where the dispersion material 41 is dispersed at random, but there is an advantage in that the functional nature, such as the electrical properties or thermal properties, of the dispersion material 41 can be exhibited strongly.

Figure 20:
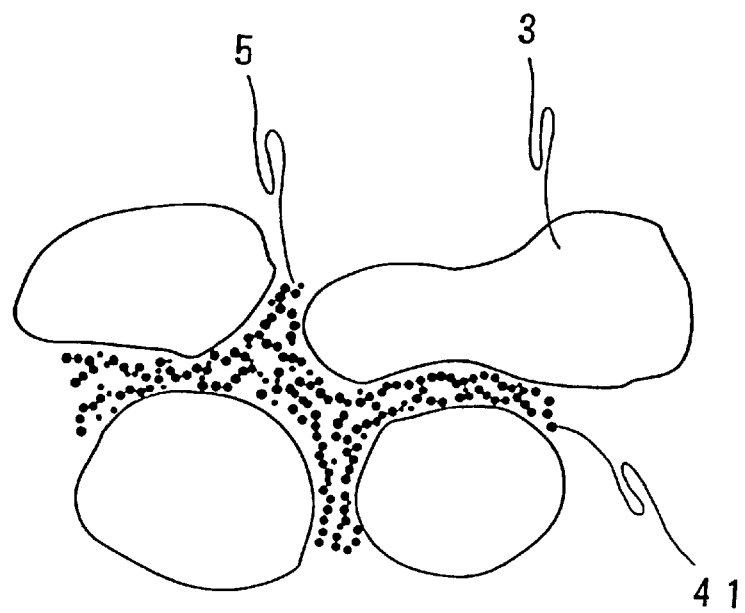

Another actual state of dispersion of the dispersion material is that in which the dispersion material 41 is dispersed adjoining within the range where it does not impede the sintering of the base material 3 and the reinforcing layer 5, as shown in FIG. 20.

In this case, the strength is somewhat lower than in the case where the dispersion material is dispersed at random, but there is an advantage in that the mechanical properties such as the electrical properties and thermal properties of the dispersion material 41 can be exhibited strongly.

Figure 21:
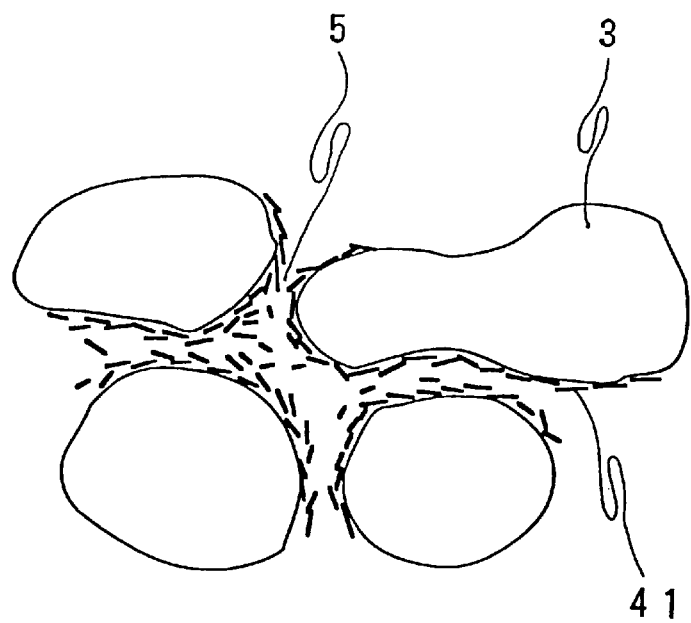

Another actual state of dispersion of the dispersion material is that in which dispersion material 41 which is partially continuous in the circumferential direction of the base material 3 is dispersed in the form of a layer, as shown in FIG. 21.

In this case the strength is somewhat lower than in the case where the dispersion material is dispersed at random, but there is an advantage in that the physical and chemical properties such as the electrical properties and thermal properties of the dispersion material 41 can be exhibited strongly (more strongly than in the aforementioned actual example shown in FIG. 20).

Figure 22:
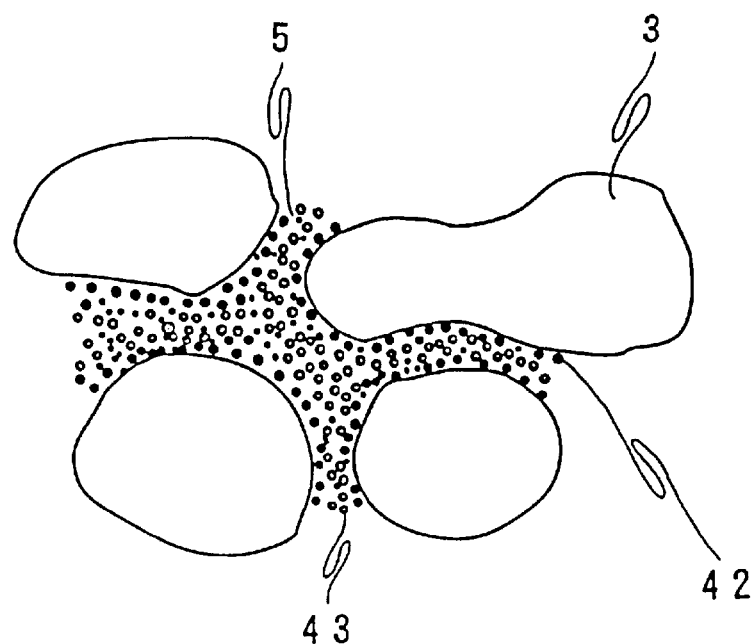

Another actual state of dispersion of the dispersion material is that in which dispersion materials which have different properties are dispersed in two or more layers in the circumferential direction of the base materials particles, for example in a state constructed with a double layer of the first dispersion material 42 and the second dispersion material 43, as shown in FIG. 22.

In this case there is an advantage in that the properties of a plurality of dispersion materials can be imparted.

Figure 23:
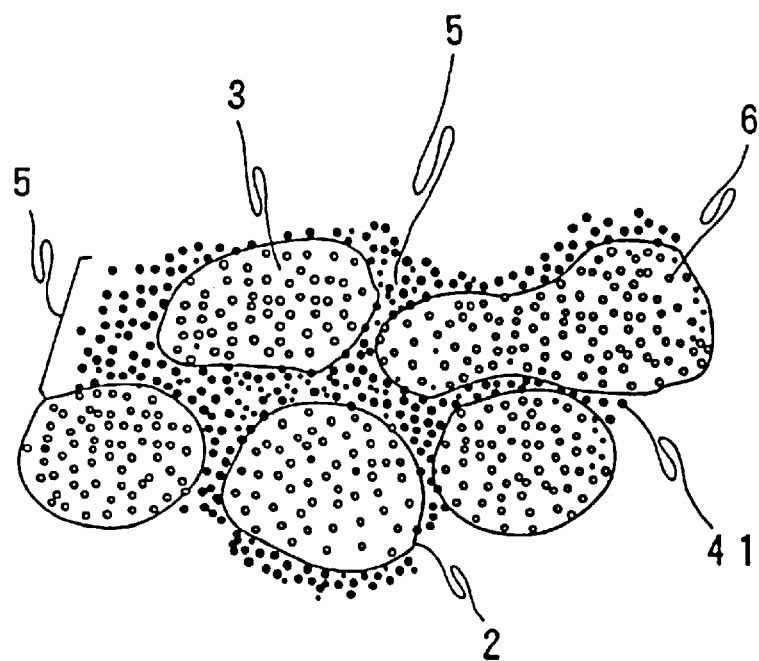

Another actual state of dispersion of the dispersion material is that in which it is dispersed in both the reinforcing layer 5 and in the base material, as shown in FIG. 23.

In this case, the dispersion material 6 (as an additive) which is dispersed in the base material 3 may have properties the same as, or different from, the properties of the dispersion material 41 in the reinforcing layer 5 and, moreover, a plurality of additives which have various properties may be dispersed.

Figure 24:
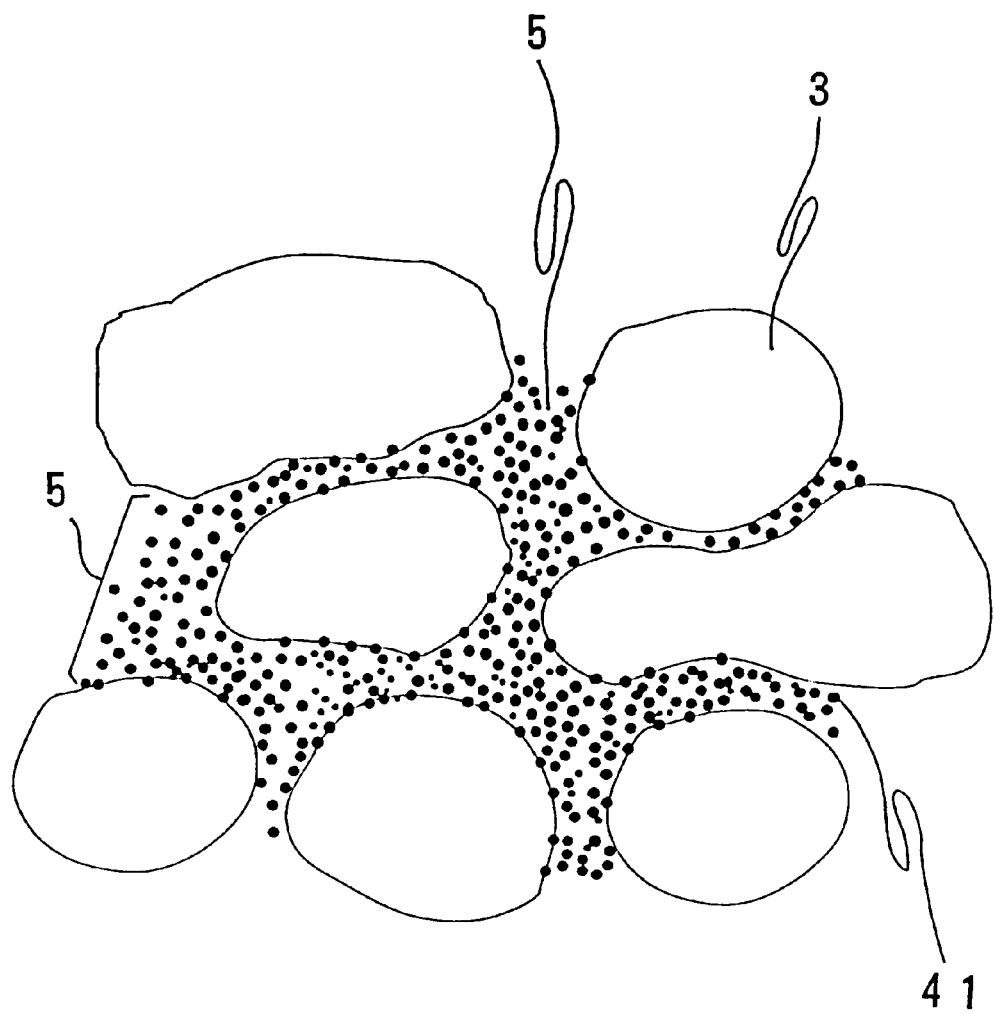

In this invention, the dispersion material is dispersed discontinuously in the aforementioned reinforcing layer and it is dispersed discontinuously in the form of a three-dimensional network in the aforementioned base material. Here, the expression "dispersed discontinuously in the form of a three-dimensional network" signifies a state in which the dispersion material 41 is arranged in the form of a three-dimensional network in the base material 3 in a separated or partially connected (contacted) state, as shown in the examples in FIG. 29 and FIG. 24.

Figure 25:
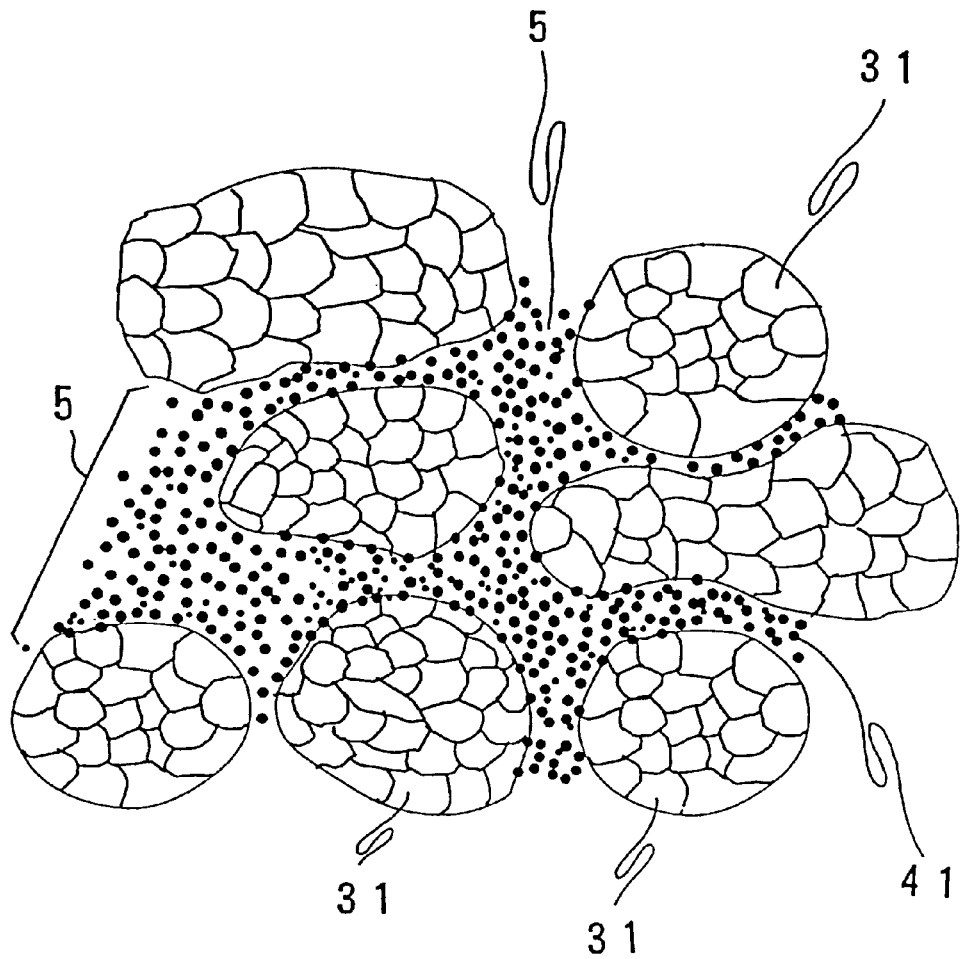

In those cases where the base material comprises crystal grains, taking a unit comprising a plurality of base material crystal grains 31, as shown in FIG. 25, or a unit comprising said base material crystal grains and part of the reinforcing layer which is formed surrounding said crystal grains, as a basic unit, the dispersion material forms the skeleton of the single network mesh which surrounds this unit. Preferably, there are few particles which are connected continuously and the discontinuous phase is dispersed with very fine spacing. More preferably, the dispersed grains are connected via a grain boundary phase of from the sub-micron level (a few tenths of a $\mu$m) to a few $\mu$m.

Moreover, the state of dispersion of the dispersion material which forms the network structure should form a network mesh structure in an essentially discontinuous state, as described above, and the form of a single network mesh may be spherical or polyhedral, and the cross-sectional form may be triangular, circular, elliptical, polygonal, star-shaped or irregular. Furthermore, with the dispersion material, some of the particles may be dispersed continuously, or form a continuous body, within the range where the action and effect of the invention are not lost.

In the case of particles, the preferred size of the dispersion material is an average diameter of from 0.001 μm to 1 mm. In those cases where said diameter is less than 0.001 μm, the number concentration of the dispersion material in the reinforcing layer increases and the discontinuities become small, and there is a danger that failure will occur readily as a result of this and the mechanical properties are liable to be adversely affected. Furthermore, if said diameter exceeds 1 mm then the dispersion of the dispersion material within the reinforcing layer becomes coarse and so there is a danger that it will become difficult to realize the effect of the network form and/or the effect of the dispersion material. In this case, preferably, the size of the dispersion material is from 0.01 μm to 100 μm so that the spacing of the discontinuities of the dispersion material is readily made suitable, and it is then possible to exhibit satisfactorily the properties of the reinforcing layer and/or the dispersion material without lowering the strength or impact resistance of the matrix.

Furthermore, in the case of whiskers and fibers as the dispersion material, the size of the dispersion material is preferably such that the average short diameter is not more than 300 μm. In this case, the formation of a discontinuous network structure is facilitated by grading the size of the short diameter of the dispersion material to not more than 180 μm. If this range is exceeded then the dispersion density of the dispersion material falls and so there is a danger that it will become difficult to realize the effect of the network-like skeleton of dispersion material.

The proportion of dispersion material which is present in the reinforcing layer is preferably within the range from 0.01 percent by volume to 80 percent by volume. In those cases where said proportion is less than 0.01 percent by volume, the dispersion material becomes widely spaced and there is a danger that it will become difficult to realize the effect of the skeletal structure and the functional properties. Furthermore, if it exceeds 80 percent by volume then the density of the dispersion material in the reinforcing material and the network-like dispersion phase increases and so the sinterability is reduced and there is a danger that the strength will be decreased. Moreover, the effects of the invention can be realized most easily when said proportion is within the range from 1% to 30%, and so this range is preferred.

Moreover, the proportion of the reinforcing layer is preferably from 2% to 80% by volume ratio with respect to 100 for the base material. If the reinforcing layer is too thin, then its action as a reinforcing layer is slight and there is a danger that its effect will be weak. Furthermore, in those cases where the proportion exceeds 80%, the amount of dispersion material which is dispersed in the reinforcing layer is increased and so there is a danger that the strength and toughness will be reduced because of inadequate fineness. Furthermore, it becomes more difficult to exhibit the properties of the base material itself. Moreover, said proportion is more preferable from 5% to 60% by volume ratio with respect to 100 for the base material.

The maximum size for a single network mesh is preferably in the range from 1 μm to 5 mm. In those cases where the maximum size for a single network mesh is less than 1 μm, the volume density of the network meshes which are formed in the base material increases and the sinterability is reduced, and there is a danger that, as a result, adequate strength will not be obtained. Furthermore, if it exceeds 5 mm then it becomes difficult to realize the effect due to the dispersion material as a skeletal structure. Moreover, said size is preferably such that the size of the dispersion material is not more than one quarter of the size of a single network mesh. By this means, a skeletal structure and paths are readily formed by the dispersion material (or the dispersion material and reinforcing layer) and the properties of the dispersion material and/or the reinforcing layer can be realized satisfactorily.

Combinations of various materials, such as ceramics, metals and polymers, for example, can be used as reinforcing layer/dispersion material combinations.

For example, in those cases where the reinforcing layer is a ceramic material, reinforcing layer-dispersion material combination can be any of silicon nitride-silicon carbide, silicon nitride-silica, silicon nitride-zirconium oxide, silicon nitride-boron nitride, silicon nitride-titanium nitride, silicon nitride-titanium boride, silicon nitride-zirconium boride, silicon nitride-molybdenum disilicide, silicon nitride-yttria, silicon nitride-ytterbium oxide, silicon nitride-titanium carbide, silicon nitride-ferrite magnet, silicon carbide-alumina, silicon carbide-aluminum nitride, silicon carbide-titanium nitride, titanium carbide-silicon carbide, alumina-titanium carbide, alumina-zirconia, alumina-zircon, alumina-silicon nitride, alumina-molybdenum disilicide, alumina-diamond, alumina-aluminum nitride, mullite-alumina, zirconia-calcium oxide, zirconia-yttria, zirconia-magnesium oxide, mullite-zirconia, saiaron-silicon carbide, zirconia-alumina, glass-silicon carbide, glass-alumina, borosilicate glass-alumina, lead titanate zirconate-silicon carbide, lead titanate zirconate-barium titanate, lead titanate-strontium titanate, cordierite-mullite, cordierite-quartz, cordierite-ferrite magnet, zirconia-a nickel-chromium alloy, and the like. Moreover, the above-mentioned combinations of reinforcing layer and dispersion materials may be reversed in those cases where the dispersion material comprises a ceramic.

When a ceramic is used for the reinforcing layer, it is possible to impart electrical conductivity or thermal conductivity to the ceramic as a reinforcing layer by adding, as a dispersion material, a material having a low electrical resistance, such as silicon carbide, titanium carbide or titanium oxide, or a nickel-chromium alloy by dispersing the material in such a way that the spacing of these dispersion material becomes close while ensuring discontinuity to an extent where sinterability is not impeded, or by increasing the density of the partially connected parts. By this means electric discharge machining of the ceramics becomes possible. In particular, with a material which has a high thermal conductivity, such as metal systems, nitrides, borides, carbides and silicon carbide, it is possible to impart high thermal conductivity while maintaining electrical insulating properties by adjusting the spacing of the dispersion material, and this is highly suitable for substrate materials, thermoelectric materials and the like. Furthermore, by adding a free-cutting material as a dispersion material or as one type of dispersion material, it is possible to improve workability without reducing strength.

In those cases where the reinforcing layer is a metallic material, a combination of reinforcing layer and dispersion material can be any of nickel-thoria, nickel-aluminum, nickel-titanium, nickel-chromium alloy-thoria, nickel-chromium alloy-yttria, iron-chromium alloy-yttria, iron-chromium alloy-zirconia, iron-chromium alloy-alumina, iron-chromium alloy-copper, iron-chromium alloy-thoria, iron-chromium alloy-titanium, chromium-magnesia, aluminum-tungsten, aluminum-stainless steel, aluminum-carbon, aluminum-boron, aluminum-alumina, aluminum-silicon carbide, aluminum yttria, magnesium-iron aluminide, aluminum-aluminum nitride, magnesium (or magnesium alloy)-alumina, aluminum alloy-alumina, nickel (or nickel alloy)-alumina, molybdenum (or molybdenum alloy)-alumina, magnesium-silicon carbide, copper-alumina, copper-silica, copper-beryllia, copper-tungsten, copper-yttria, iron-copper, nickel-chromium alloy-yttria, nickel-chromium alloy-zirconia, nickel-chromium alloy-calcia, nickel-chromium alloy-silica, titanium-titanium boride, stainless steel-alumina, lead-lead oxide, silver-silver oxide, silver-tungsten, cobalt-thoria, and the like. Moreover, the above-mentioned combinations of reinforcing layer and dispersion materials may be reversed in those cases where the dispersion material comprises a metallic material.

In those cases where a metallic material is used for the reinforcing layer, metallic materials which have excellent thermal insulating properties and electrical insulating properties can be obtained without adversely affecting the mechanical properties by adding a ceramic such as zirconia which has low thermal conductivity and controlling the spacing of the metal dispersion material, for example.

In those cases where the reinforcing layer is formed with a polymeric material, a combination of the reinforcing layer and the dispersion material can be any of polyvinyl chloride-lead (or lead alloy), polyvinyl chloride-manganese dioxide, polypropylene-talc, polypropylene-calcium carbonate, polypropylene-magnesium carbonate, polystyrene-alumina, polystyrene-polymethyl methacrylate, epoxy resin-silicon carbide, epoxy resin-silica, epoxy resin-glass, silicon resin-silicon carbide, polyethylene-carbon, thermoset resin-silica, rubber-carbon black, resin-graphite, resin-nickel, carbon-silicon carbide, ABS-SiC, acrylic-silica, nylon-poly(methyl methacrylate), nylon-titanium nitride, carbon black-copolymer latex, nylon-titanium dioxide, polystyrene-titanium dioxide, cellophane-titanium dioxide, nylon-SiC and nylon-silica, and the like.

The composite materials of this second aspect enable the properties of the dispersion material to be exhibited satisfactorily so as to improve mechanical and physical properties of the base material without adversely affecting the mechanical properties and/or the physical properties of the base material.

Furthermore, dispersion materials which have excellent physical properties, such as electrical conductivity, thermal conductivity or magnetic properties, can be dispersed with very short spacing in the form of a network and so it is possible to exhibit not only properties-resembling those in the case where said dispersion material forms a continuous phase but also further improved mechanical properties, by optimizing the spacing of the dispersion material.

Furthermore, in those cases where the dispersion material is of a high rigidity, it is possible to achieve an increase in the rigidity of the base material by forming a composite without causing adverse effects on the strength, toughness, impact resistance, durability, or the like, due to the dispersion material by dispersing the dispersion material discontinuously.

Furthermore, if a two-dimensional network is formed in a plane perpendicular to the orientation direction of the whiskers, not only does a whisker-like dispersion material improve the strength in the orientation direction by a pinning (anchoring) effect and a bridging effect but it can also provide reinforcement in three dimensions.

A composite material of this second aspect comprises: a base material; a reinforcing layer comprising a substance which resembles the aforementioned base material and which is dispersed continuously in the form of a three-dimensional network in said base material; a dispersion material which is dispersed discontinuously in said reinforcing layer, said dispersion material being dispersed discontinuously in the form of a three-dimensional network in the aforementioned base material; and an additive for improving mechanical and physical properties which is preferably dispersed uniformly (or in the form of a network, in the form of a layer, or the like) in the reinforcing layer or/and in the base material in the form of a three-dimensional network defined by said reinforcing layer (or dispersion material). By this means it is possible to suppress sliding of the crystal grains and the movement of dislocations within the network meshes, to increase hardness and increase elasticity, and to improve mechanical properties such as high rigidity, strength, wear resistance, oxidation resistance and heat resistance, and to improve functional properties such as thermal conductivity and the like.

Such additives may be materials which have heat resistance, corrosion resistance, resistance to chemical attack, mechanical properties such as high rigidity, high hardness, free-cutting properties or impact resistance, or functional properties such as low expansion properties, high thermal expansion, optical properties, low dielectric constant, high dielectric constant, high-resistance, thermo-electric properties, thermal conductivity, thermal insulating properties, electrical conductivity, magnetic properties (magnetic permeability), piezoelectric properties, or the like. The dispersion material may be materials such as ceramics, metals, resins and intermetallic compounds, and these may be crystalline or amorphous. They may be in form of particles, whiskers, fibers or the like. Moreover, when materials with mechanical properties are used as additives and materials with physical properties are used as dispersion material which forms the network meshes, it is possible to form functional composite materials which have as well mechanical properties such as electric discharge machining properties, free-cutting properties, high hardness, resistance to chemical attack, fusion resistance, heat resistance, and the like.

In those cases where the base material is amorphous, the uniform dispersion of the abovementioned additives within the reinforcing layer or/and within the three-dimensional network mesh which is defined by said reinforcing layer (or dispersion material) is preferable.

When the base material is crystalline the reinforcing particles as additives are preferably dispersed uniformly in the reinforcing layer or/and within the three-dimensional network mesh which is defined by said reinforcing layer (or dispersed material), or when it comprises crystalline grains, within said crystal grains or/and at the crystal grain boundaries. In this case, the dispersion material may be present within the grains and/or at the grain boundaries when improving the mechanical properties, but it is preferably dispersed at the grain boundaries when imparting physical properties.

A Preferred Method for the Manufacture of a Composite Material of the Second Aspect A preferred method for the manufacture of a composite material of the second aspect comprises the steps of: fabricating matrix granules which become a base material of the composite material; fabricating dispersion powder which becomes a raw material of a reinforcing layer by mixing a powder which contains a material which resembles the base material and a dispersion material; fabricating a composite powder in such a way that the dispersion powder forms a coating around the matrix granules; molding the composite powder to obtain a molding in a prescribed form; and forming a composite material by heating said molding, said composite material comprising the base material, the reinforcing layer comprising the material which resembles the base material, the reinforcing layer being dispersed continuously in the form of a three-dimensional network in said base material, and the dispersion material which is dispersed discontinuously in said reinforcing layer.

It is possible by means of this method for the manufacture of a composite material to manufacture easily composite materials with which the properties of the dispersion material can be exhibited satisfactorily without adversely affecting the mechanical properties of the base material.

The mechanism by which this method of manufacture realizes its excellent effect is certainly not as yet clear, but it is thought to be as indicated below.

In this method of manufacture, the granules which become the base material of the composite material are fabricated first of all. Moreover, the granules can have other additives admixed appropriately within the range where there is no interference with the effects of the invention.

Next, powders which contain a substance which resembles the aforementioned base material and the dispersion material are mixed in the dispersion powder fabricating process and a dispersion powder which becomes the reinforcing layer raw material is prepared. The dispersion powder may have other additives admixed appropriately within the range where there is no interference with the effects of the invention. Primary particles of the base material may be used instead of the granules.

Next, a composite powder is fabricated in the composite powder fabricating process in such a way that the aforementioned dispersion powder forms a covering around the aforementioned matrix granules.

Next, the composite powder obtained in the aforementioned composite powder fabricating process is molded into the prescribed form in the molding process and a molding is formed. By this means, the dispersion powder can be introduced into the gaps between the granules which become the main material of the base material and on the surface of the adjoining granules in the molding prior to sintering, and the dispersion material can be introduced in a state where it is dispersed discontinuously through the whole of the molding.

Next, on heating the molding obtained in the aforementioned molding process in the composite material forming process, the adjoining granules themselves and the dispersion powder itself and/or the granules and the dispersion powder are sintered or melted, and the whole of the sintered becomes denser. This process provides a composite material comprising the base material, the reinforcing layer comprising material which resembles the aforementioned base material which is dispersed continuously in the form of a three-dimensional network in said base material, and dispersion material which is dispersed discontinuously in said reinforcing layer.

In this process, the material which resembles the base material in the dispersion powder forms a liquid phase or a state similar to the liquid phase. As a result, the diffusion of atoms occurs and the gaps between the particles of material which resemble the base materials are filled and so refinement of the reinforcing layer proceeds and, at the same time, refinement occurs at the boundary surface between the reinforcing layer and the base material particles. It is thought that by this means the sintering properties of the molding as a whole are improved in this invention, and a very dense sintered body is obtained.

Furthermore, when a dispersion material is used with a view to reinforcement, pores etc. which are the main cause of a reduction in strength are not formed in the composite material forming process, and the dispersion material forms the skeletal structure of a discontinuous three-dimensional network construction which is particle-reinforced by the dispersion material, such as particles or whiskers for example, in the base material. The skeletal structure can resist a high stress and the dispersion material itself can suppress the movement of dislocations and crack development between adjoining network meshes. Thus, it is possible to increase strength and toughness.

Furthermore, in those cases where a dispersion material which has a high heat resistance is used, it is possible to form a skeletal structure which has a high heat resistance, and it is possible to suppress softening and deformation of the base material by means of the skeletal part. Moreover, the movement of dislocations and grain boundary sliding due to softening of the crystal grain boundaries can also be prevented by the dispersion material itself and so it is possible to improve the fracture strength and creep resistance. In particular, since the dispersion material is dispersed discontinuously, even if cracks extend in the dispersion material or along the boundary surface between the dispersion material and the base material there are no paths through which the cracks can extend easily like those in a continuous phase, and propagation is difficult.

Furthermore, in those cases where a dispersion material which imparts functionality is used as a dispersion material, higher density is attainable than with a continuous network form and pores which become fracture origins are not liable to form, and it is possible to impart functionality without reducing the strength.

As has been described above, it is thought that composite materials in which the properties of the dispersion material can be exhibited satisfactorily without adversely affecting the mechanical properties of the base material can be manufactured easily by means of this method of manufacture.

(The Matrix Granule Fabricating Process)

Matrix granules which become the base material of the composite material are fabricated in the matrix granule fabricating process. Here, all of the materials which can be used for the base material described for the aforementioned composite material can be used for the matrix powder from which the matrix granules are fabricated.

The diameter of the matrix granules (dm) is set to not more than 5.0 mm, and the average primary particle diameter of the particle or whisker (short diameter) dispersion material (dp) is set to not more than 500 $\mu$m, and the ratio dp/dm is most preferably within the range of from 0.50 to $1 \times 10^{-8}$. Within this range it is possible to form a three-dimensional network with the dispersion material for exhibiting satisfactorily the properties of the dispersion material. The dp/dm is preferably set to 0.5 to $10^{-6}$ to facilitate the formation of the discontinuous network structure. In this case, the formation of a discontinuous three-dimensional network is facilitated by controlling the size of the dispersion material to not more than 300 $\mu$m.

Furthermore, the formation of a discontinuous network structure is facilitated by granulating the matrix powder from which the matrix granules are constructed into granules of a diameter within the range of from about 2 $\mu$m to about 5 mm. Most preferably the grain diameter is within the range from 20 $\mu$m to 5 mm.

(The Dispersion Powder Fabricating Process)

Next, powders which contain material which resembles the aforementioned base material and dispersion material are mixed and a dispersion powder (including simple mixtures of powders which contain material which resembles the base material and dispersion material) which becomes the reinforcing layer raw material is prepared in the dispersion powder fabricating process. Here, all of those mentioned in connection with the aforementioned composite materials can be used for the material which resembles the base material and the dispersion material.

The form of the substance which resembles the base material may be granular, angular, prismatic, fibrous (including fibers and whiskers) or irregular, for example. The granular, prismatic and irregular forms are preferred.

The particle diameter of the material which resembles the base material is preferably fine to facilitate sintering, and a diameter of from 0.001 µm to 300 µm is preferred, while adjustment to a diameter of from about 0.01 µm to about 100 µm is most desirable. Optimally, the diameter is from 0.01 µm to 80 µm, and it is possible then to form preferred continuous networks.

The form of the dispersion material may also be granular, angular, prismatic, fibrous (including fibers and whiskers) or irregular, for example. It is preferably spherical or irregular. The grain diameter is preferably from 0.001 µm to 500 µm, being a size of not more than half that of the base material powder, and preferably it is in the range from about 0.005 µm to about 100 µm, and most preferably desirably in the range from about 0.01 µm to about 80 µm.

The mixing of the material which resembles the base material and the dispersion material can be carried out using the general mixing means used for mixing materials of the type and size used in the invention, and the mixing can be carried out using, for example, a ball mill, an attriter, a Henshall mixer, a pearl mill or an agitator mill. It is preferably carried out either wet or dry in a ball mill, a pearl mill or an attriter.

The state of the dispersion powder obtained may be granular, angular, prismatic, fibrous (including fibers and whiskers), irregular, or the like. Those which are granular, angular or irregular are advantageous to increase density (molding properties and green compact forming properties).

The size of the dispersion powder is not more than one half of that of the matrix granules, and it is preferably not more than 1 mm. More preferably, it is not more than one third of that of the matrix granules and a powder diameter of not more than 500 µm, and most preferably it is not more than one fifth that of the matrix granules and has a powder diameter of not more than 80 µm.

The usual methods of granulation, such as agitation granulation, rotation granulation, fluid granulation, spray granulation, extrusion granulation, pulverization granulation and the like, can be used in those cases where granulation is carried out in the matrix granule fabricating process and the dispersion powder fabricating process.

Moreover, an appropriate sintering aid or plasticizer can be admixed with the matrix granules or the dispersion powder in consideration of the sintering properties and corrosion properties of the base material. Furthermore, the sintering aid can also be added in the composite powder fabricating process which is described hereinafter and not mixed with the matrix granules or dispersion powder.

Moreover, the same material as the base material, or those materials generally used as sintering aids for the base material and/or the dispersion material, can be used for the aforementioned sintering aid. As for sintering aids in a silicon nitride-silicon carbide system, silicon nitride, yttrium oxide which is used as a sintering aid for said silicon nitride, or carbon, boron, alumina, AlN and the like which are used as sintering aids for silicon carbide can be used. Examples of other sintering aids include $Yb_2O_3$, alumina, magnesium oxide, boron oxide, BN, aluminum, aluminum carbide, aluminum boride, chromium boride, zirconium boride, $B_4C$, boron carbide, beryllium oxide, spinel, silica, lanthanum oxide, zirconia, hafnia, $Nd_2O_3$, $Er_2O_3$, $Sm_2O_3$, nickel, copper, and the like. Furthermore, sinterability can be improved further by using particles for the sintering aid which particles are denser than the dispersion material or base material.

(The Composite Powder Fabricating Process)

Next, the composite powder is fabricated in such a way that the aforementioned dispersion powder forms a coating around the aforementioned matrix granules in the composite powder fabricating process. Here, "coating" indicates a state in which the dispersion powder forms a coating around the matrix granules (to provide a state in which all or part of the surface of the matrix granules is covered). Coating in a state such that dispersion powder is closest-packed continuously around the matrix granule surface is preferred. Preferably, a dispersion powder which has no coarse grains which is not more than one sixth of the grain diameter of the matrix granules forms a continuous coating layer, and the thickness of the coating layer is not more than one third of the diameter of the matrix particles.

Concretely, the following methods may be employed: (1) the method in which the matrix granules and the dispersion powder which has a smaller particle diameter are introduced into a container and rotated, (2) the method in which the matrix granules and the dispersion powder are treated in a rotating air current, (3) the sol-gel method, (4) the shaking method, (5) the PVD and CVD methods, (6) the emulsion method, (7) the surface polymerization method, (8) the in-air suspension covering method, (9) the spray-drying method, (10) the surface precipitation method, (11) the dipping method, (12) the inorganic-organic-metal wall encapsulation method and (13) the phase separation method from an organic solvent, and the like.

(The Molding Process)

Next, the composite powder obtained in the aforementioned composite powder fabricating process is molded into the prescribed form in the molding process and a molding is formed. All of the various methods of molding generally used for molding can be used. The composite powder obtained in the composite powder fabricating process is introduced into a mold of the required shape and molded uniaxially, or molding can be carried out by means of a CIP treatment (cold isostatic pressing). Alternatively, the above-mentioned powder may be mixed with a resin, for example, and injection molded. Moreover, it can be molded by slip casting.

Examples of molding methods include press molding methods such as uniaxial compression, hydrostatic pressure compression, hot pressing and hot isostatic pressing, cast molding methods such as slurry casting, solid casting and lost wax casting, and plastic molding methods such as extrusion molding, injection molding, transfer molding and compression molding, and the like.

By this process, the molding prior to sintering has the dispersion powder present in the gaps between the granules which form the main material of the base material and on the surfaces of the adjoining granules, and the dispersion material can be present in a state that it is dispersed discontinuously in the whole of the molding.

(The Composite Material Forming Process)

Next, the molding obtained in the aforementioned molding process is heated in the composite material forming process. In those cases where the base material is a resin, this process may be carried out at the same time as the aforementioned molding process with just injection molding. This process may also be carried out at the same time as the aforementioned molding process even in cases where the base material is a material other than a resin.

The usual sintering method can be used as the method of forming the composite material. In practical terms, the molding is sintered in air or in a vacuum, in an atmosphere of $N_2$, Ar or $H_2$ for example, at normal pressure or under a pressure of gas. The process may be carried out using hot pressing or HIP in those cases where the material is difficult to sinter. There is no need for sintering, but only hot molding is carried out when the base material is a resin.

By this process, a composite material comprising a base material, a reinforcing layer comprising material which resembles the aforementioned base material which is dispersed continuously in the form of a three-dimensional network in said base material, and dispersion material which is dispersed discontinuously in said reinforcing layer is formed.

Figure 26:
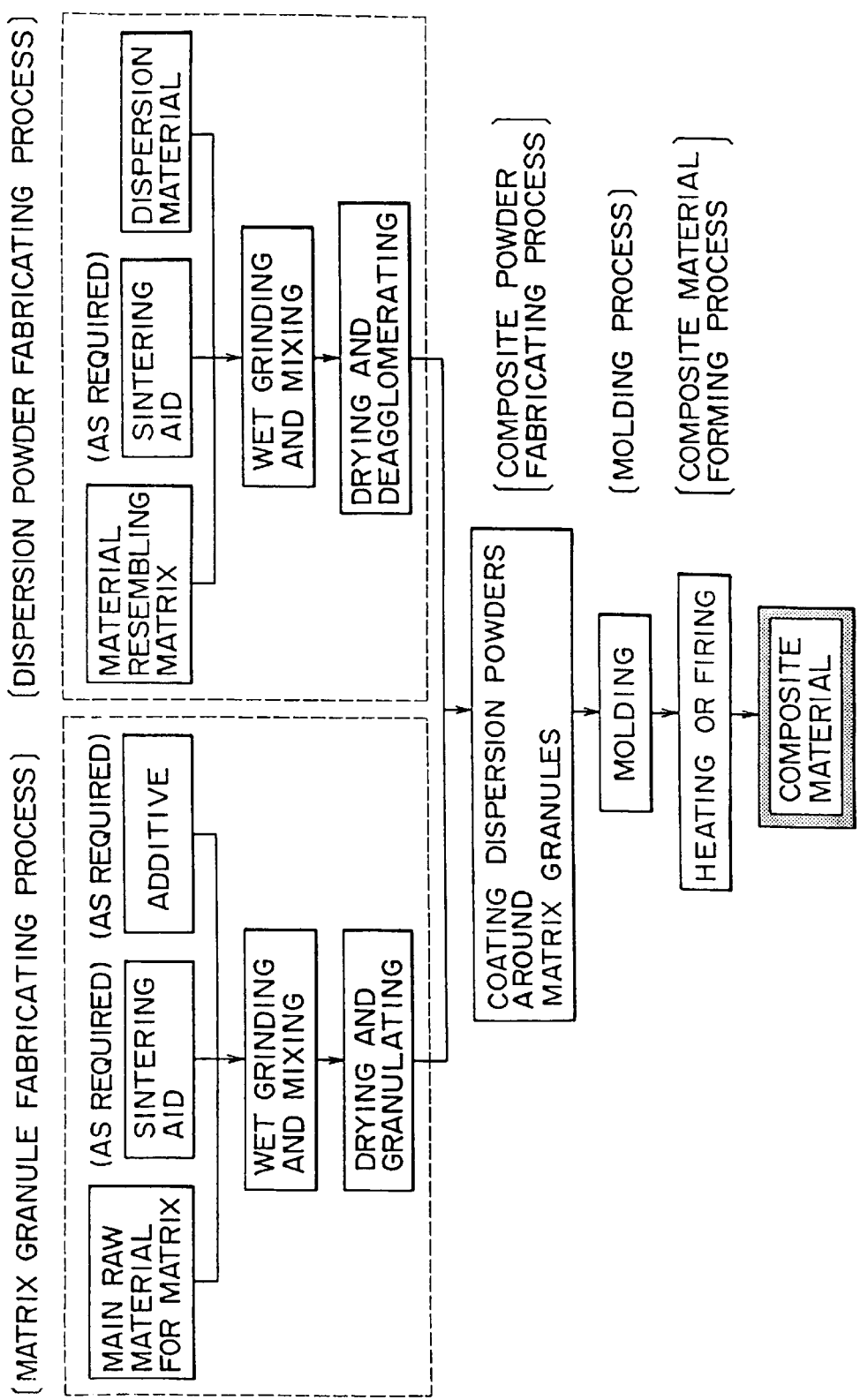

An actual example of the preferred method of manufacture of a composite material of the second aspect, as shown in FIG. 26, involves: first fabricating the matrix granules for which a base material powder is granulated in such a way as to be at least the prescribed size; and fabricating the dispersion powder (mixed or composite powder) by mixing and pulverizing in such a way as not to exceed the prescribed size the dispersion material and a powder of a material which resembles said matrix; and then fabricating the composite powder in such a way the dispersion powder forms a coating around the matrix granules. That is to say, the dispersion powder is made to cover said matrix granules in a state where it is present discontinuously and/or continuously, or a film of the dispersion powder is formed on part or all of the surface of the matrix granules using the following method: the CVD method, the PVD method, the sol-gel method, the boundary surface reaction method, the surface sedimentation method, the dipping method, the suspension method (W/O emulsion method), the composite emulsion method, the spray solidification granulation method, the powder method, the in-air suspension covering method, the friction charging method, the colloid method, the sedimentation reaction method, the spray granulation method, the electrostatic combination method, the boundary surface precipitation method, the liquid droplet method, the gel droplet method, the spray-drying method or the sol-gel method, or the like. Subsequently, said composite powder is molded into the prescribed form. Moreover, CIP (cold isostatic pressing) may be carried out, as required. Subsequently, by carrying out sintering or reactive hardening, the reinforcing layer can be dispersed continuously in the form of a three-dimensional network in said base material and the dispersion material can be dispersed discontinuously in the form of a three-dimensional network in the base material.

Moreover, the methods of manufacture are described below for the different base materials.

In those cases where the base material is a ceramic, first of all the base material main raw material comprising ceramic and the sintering aid are either wet or dry ground and mixed and then granules are fabricated by adjusting to a fixed particle size by pulverization or the spray-drying method. Next, a material powder which resembles the base material and the dispersion material are wet or dry ground and mixed using a ball mill or an attriter or a Henshall mixer for example, or they are mixed in an air current, and a dispersion powder is fabricated. Next, the dispersion powder is formed into a continuous covering or a covering which is scattered discontinuously or continuously, on the surface of the fabricated matrix granules. At this time, the composite powder may form a covering on the surface of the matrix granules together with a resin. A composite material of this second aspect can then be formed by molding the powder by die pressing, CIP, slip casting, injection molding, or the like and then sintering by pressureless sintering, hot pressing, hot isostatic pressing (HIP) or the like.

Furthermore, in those cases where the base material is a metallic material, first of all a dispersion powder which contains the dispersion material and a material powder which resembles the raw base material is formed as a covering or as a partial film in a state where it is scattered discontinuously and/or continuously on the surface of a raw base material powder which has been pulverized or atomized to a fixed particle size. Subsequently, a composite material of this present invention can be formed by molding and sintering this powder. It is possible to increase the sintering density by firing provisionally at a low temperature and then recompressing and carrying out the main sintering operation. Further, only main sintering followed by swaging or HIP can also elevate density.

Furthermore, in those cases where the base material is a polymer material, first of all the matrix material is mixed with additives, such as plasticizer and surface treatment material, for example, and granular or columnar pellets are fabricated. Then, a material powder which resembles the matrix material and dispersion material are mixed in a varistor mixer, an inter-mixer or a kneader, and a dispersion powder is fabricated. Next, the dispersion powder is formed as a covering on the prepared pellets. A composite material of the second aspect can then be formed by packing the material into a mold and heating.

As has been indicated above, the addition of the dispersion material is carried out in a single process when manufacturing a composite material of the second aspect, and so the productivity is also good.

Another Preferred Method for the Manufacture of Composite Materials of the Second Aspect Another preferred method for the manufacture of composite materials of the second aspect is characterized by comprising: a matrix granule fabricating process wherein granules which become the base material of the composite material are prepared; a composite powder fabricating process wherein the aforementioned matrix granules and a reinforcing layer raw material powder which contains dispersion material and material which resembles the aforementioned base material and which has an average grain diameter of not more than one quarter of the average grain diameter of said matrix granules are mixed and a composite powder is fabricated; a molding process wherein said composite powder is molded into the prescribed form and a molding is obtained; and a composite material forming process wherein said molding is heated and a composite material comprising a base material, a reinforcing layer comprising material which resembles the aforementioned base material which is dispersed continuously in the form of a three-dimensional network in said base material, and a dispersion material which is dispersed discontinuously in said reinforcing layer is formed.

It is possible by means of this method of manufacture to manufacture easily composite materials with which the properties of the dispersion material can be exhibited satisfactorily without adversely affecting the mechanical properties of the base material.

The mechanism by which this method of manufacture realizes its excellent effect is certainly not clear as yet, but it is thought to be as indicated below.

In this method of manufacture, the granules which become the base material of the composite material are fabricated first of all in the matrix granule fabricating process. Moreover, the granules can have other additives admixed appropriately within the range where there is no interference with the effects of the invention.

Next, a composite powder is fabricated by mixing the aforementioned matrix granules with a reinforcing layer raw material powder which contains material which resembles the aforementioned base material and dispersion material (one type or two or more types). Moreover, the reinforcing layer raw material powder can have other additives admixed appropriately within the range where there is no interference with the effects of the invention. Moreover, the fabrication of the composite powder is preferably carried out in such a way that the reinforcing layer raw material powder forms a covering around the matrix granules without breaking them down.

The average grain diameter of the reinforcing layer raw material powder which contains the material which resembles the base material and the dispersion material at this time is not more than one quarter of the average grain diameter of the matrix granules. This is because there is a problem in that it becomes difficult to form a continuous reinforcing layer in those cases where said grain diameter as an average grain diameter exceeds one quarter of the average grain diameter of the matrix granules.

Next, the aforementioned composite powder is molded into the prescribed form in the molding process and a molding is obtained. In the molding, the reinforcing layer raw material which contains the material resembling the base material and the dispersion material is present in the gaps between the granules and on the surfaces of adjoining granules which are the main material of the base material and as result, the dispersion material is dispersed discontinuously in the whole of the molding.

Next, on heating the molding obtained in the aforementioned molding process in the composite material forming process, the sinterd body as a whole is made denser by sintering or/and melting together the composite powders in the granules, the reinforcing layers raw material powder (which contains the material which resembles the base material and the dispersion material) and/or the granules and the reinforcing layer raw material powder. This process provides a composite material comprising a base material, a reinforcing layer comprising material which resembles the aforementioned base material, which is dispersed continuously in the form of a three-dimensional network in said base material, and dispersion material which has been dispersed discontinuously in said reinforcing layer.

At this time, the gaps between the grains of material which resemble the base material are filled by the diffusion or liquid phase sintering of the material which resembles the base material which is contained in the reinforcing layer raw material powder and the reinforcing layer proceeds to become denser, and the boundary surface between the reinforcing layer and the matrix granule also proceeds to become denser. It is thought that the sinterability of the molding as a whole is improved by this means in this invention, and that a denser sintered body is obtained.

Furthermore, in those cases where a dispersion material is used with a view to reinforcing the composite material, pores and the like, which are the main cause of a fall in strength are not formed, and it is possible to form a skeletal structure with a discontinuous three-dimensional network structure which is particle-reinforced by a dispersion material, such as particles, whiskers, fibers or plates, for example, in the base material in the composite material forming process. Said skeletal structure is such that the movement of dislocations and crack extension between adjoining network meshes can be prevented by the dispersion material itself when high stresses are imposed. The strength and toughness can be improved by this means.

Furthermore, in those cases where a dispersion material which has a high heat resistance is used, it is possible to form a skeletal structure which has high heat resistance, and it is possible to suppress softening and deformation of the base material by means of the skeletal part. Moreover, the movement of dislocations and grain boundary sliding due to softening of the crystal grain boundaries can also be prevented by the dispersion material itself and so it is possible to improve the fracture strength and the creep resistance. In particular, since the dispersion material is dispersed discontinuously, even if cracks extend in the dispersion material or along the boundary surface between the dispersion material and the base material, there are no paths through which the cracks can extend easily like those in a continuous phase, and propagation is difficult.

Furthermore, in those cases where a dispersion material which imparts functionality is used as a dispersion material, higher density is possible than with a continuous network form, and pores which become fracture origins are not liable to form, and it is possible to impart functionality without reducing the strength. Moreover, the functional properties of the base material itself are also easily realized.

As has been described above, it is thought that composite materials in which the properties of the dispersion material can be exhibited satisfactorily without adversely affecting the mechanical properties of the base material can be manufactured easily by means of this method of manufacture.

(The Matrix Granule Fabricating Process)

The matrix granule fabricating process of this method of manufacture is the same as the matrix granule fabricating process described earlier (in "Preferred Method for the Fabrication of Composite Materials of the Second Aspect").

(Composite Powder Fabricating Process)

Next, the composite powder is fabricated in the composite powder fabricating process by mixing the aforementioned matrix granules with reinforcing layer raw material powder which contains dispersion material and aforementioned material which resembles the base material and which has an average particle diameter of not more than one quarter of the average diameter of said matrix granules.

All of the materials which resemble the base material and dispersion materials mentioned in connection with the aforementioned composite materials of the second aspect and in "Preferred Method for the Fabrication of Composite Materials of the Second Aspect" can be used here.

The following methods can be adopted for preparing the composite powder: (1) the method in which the aforementioned matrix granules and the material which resembles the base material and the dispersion material are introduced into a container and rotated for at least a few minutes; (2) the method in which the powders are mixed and treated in a mixer or rotating air current; (3) the method in which the three powders are introduced into a solvent of which the pH value of water glass, water or an organic solvent such as alcohol, xylene or toluene, for example, has been adjusted in such a way that the base material, material which resembles the base material and dispersion material have (+) (−) reversed potential and a sedimentation treatment (surface attachment) is carried out; (4) the method in which the surface of the material which resembles the base material is partially modified by means of a high temperature treatment in an atmosphere such that the surface of the material which resembles the base material becomes the prescribed dispersoid; and the like.

(The Molding Process)

The molding process is the same as the molding process described earlier in "A Preferred Method for the Manufacture of a Composite Material of the Second Aspect".

(The Composite Material Forming Process)

The composite material forming process is the same as the composite material forming process described earlier in "A Preferred Method for the Manufacture of a Composite Material of the Second Aspect".

Another Preferred Method for the Manufacture of a Composite Material, of the Second Aspect Another preferred method for the manufacture of a composite material of the second aspect is that in which a composite powder is fabricated in a state where a mixed powder of the prescribed form comprising dispersion material and a material powder which resembles the main raw material powder is present continuously or discontinuously on the surface of granules of the prescribed form fabricated by mixing the aforementioned main raw material powder as the main material of the base material, additive which reinforces the base material or imparts functionality and sintering aid, which is added as required, and in which said composite powder is then molded into the prescribed form and heated. This is a method in which a composite material comprising base material, a reinforcing layer which is dispersed continuously in the form of a three-dimensional network in said base material and dispersion material which is dispersed discontinuously in said reinforcing layer, and in which additive is dispersed uniformly in the base material within the network meshes which are formed in three dimensions and defined by the reinforcing layer is formed. By means of this procedure a composite material in which the reinforcing layer is dispersed continuously in the form of a three-dimensional network in the base material and in which the dispersion material is dispersed discontinuously in the form of a network, and in which additive is dispersed uniformly within the network meshes is obtained.

Figure 27:
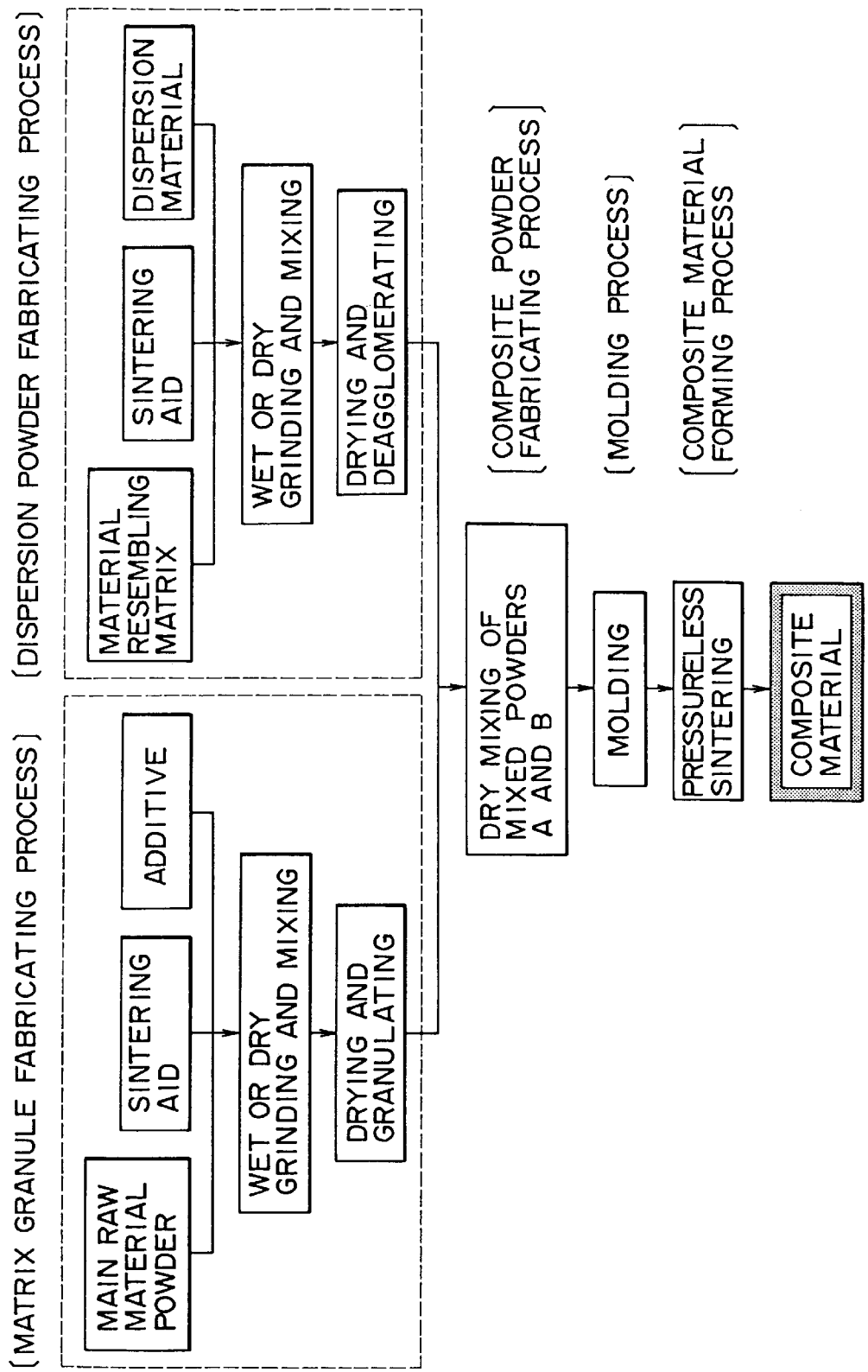

In this method of manufacture, the main raw material powder as the main material of the matrix, sintering aid and additive which reinforces the base material or imparts functionality are dry or wet ground and mixed to fabricate a mixed granule powder A first of all as shown in FIG. 27. Then, with the aforementioned mixed granules A is dry ground mixed a pre-obtained mixed powder B which has been fabricated by dry or wet grinding and mixing a material powder which resembles the base material, sintering aid which is added as required and dispersion material, and has a particle diameter of not more than one quarter of the particle diameter of the aforementioned mixed granules, to obtain a composite mixed powder. Next, this composite mixed powder is molded into the prescribed form and a composite material is obtained by heating. By this means it is possible to form a composite raw material comprising base material, reinforcing layer which is dispersed continuously in the form of a three-dimensional network in the base material and dispersion material which is dispersed discontinuously in said reinforcing layer, and in which additive is dispersed uniformly within the base material in the network meshes which are formed in three dimensions defined by the reinforcing layer.

The Third Aspect

Aim of the Third Aspect

The third aspect applies the composite materials of the aforementioned first aspect and the method for their manufacture, and the composite materials of the aforementioned second aspect and the method for their manufacture to thermistor materials, and it is intended to provide thermistor materials of which the change in resistance with temperature has excellent linearity over a wide temperature measuring range, and methods for their manufacture.

Constitution of the Third Aspect

The thermistor materials of the third aspect are characterized in that they are thermistor materials comprising a matrix comprising material which has insulating properties, and dispersion material comprising material which has a different thermal expansion coefficient from the aforementioned matrix and which is dispersed discontinuously in said matrix, in that the aforementioned dispersion material comprises semiconductor material or material which has electrical conductivity, and in that the dispersion material which is dispersed discontinuously in said matrix forms a network-like electrical path structure in the thermistor material.

Effect of the Third Aspect

The thermistor materials of this third aspect are such that the change in resistance value with temperature has excellent linearity over a wide measuring temperature range.

Function of the Third Aspect

The mechanism by which a thermistor material of which the change in the resistance value with temperature has excellent linearity over a wide temperature measuring range is obtained with a thermistor material of the third aspect is certainly not clear as yet, but it is thought to be as indicated below.

A thermistor material of this third aspect is characterized in that it has a dispersion material comprising material which has a different thermal expansion coefficient from the matrix and dispersed discontinuously in a matrix comprising material which has insulating properties. Furthermore, it is characterized in that the aforementioned dispersion material comprises semiconductor material or material which has electrical conductivity, and in that the dispersion material which is dispersed discontinuously in the aforementioned matrix forms a network-like path structure in the thermistor material.

This thermistor material has a dispersion material which has a different thermal expansion coefficient from the matrix and dispersed discontinuously in the form of a three-dimensional network and so when the thermistor material is heated the spacing between adjacent dispersion materials decreases or increases uniformly in accordance with the difference in the thermal expansions between the matrix and the dispersion material.

At this time, the thermal expansion on heating increases or decreases in proportion with the temperature irrespective of the temperature range and so it is thought that the change in the spacing of the dispersion material due to the difference in thermal expansion is linear and not dependent on the temperature range. The electrical resistance value decreases or increases in proportion with the spacing of the adjoining dispersion material and it is thought that linear temperature-resistance characteristics can be obtained over a wide temperature range without much dependence on the temperature-resistance characteristics of the dispersion material as was the case in the past.

It is thought that the thermistor materials of this third aspect are such that the change in resistance with temperature has excellent linearity over a wide temperature measuring range for the reasons outlined above.

The Matrix

The matrix comprises material which has insulating properties. Examples of the material include mullite, silica, saiaron, silicon nitride, alumina, zircon, cordierite, boron nitride, chromium oxide, titanium oxide, boron oxide, molybdenum oxide, hafnium oxide, yttria, ytterbium oxide niobium oxide, tungsten oxide, lanthanum oxide, magnesia, steatite, felsterite, silimanite, spinel, aluminum titanate, aluminum zirconate, NiO, $V_2O_5$, $MoO_3$, $WO_3$, ZnO, zirconium oxide, $SiO_2$, MgO, $Sm_2O_3$ and the like.

The Dispersion Material

The dispersion material comprises semiconductor material or material which has electrical conductivity which has a different thermal expansion coefficient from the aforementioned matrix. Concretely, it may be $TiB_2$, TiB, $Ti_2B_{51}$ $ZrB_2$, $ZrB_{12}$, $V_3B_2$, VB, $V_5B_6$, $V_2B_3$, $VB_2$, $Nb_3B_2$, NbB, $Nb_3B_4$, $Nb_6B_2$, $Ta_2B$, $Ta_3B_2$, TaB, $Ta_3B_4$, $TaB_2$, $Cr_2B$, $Cr_5B_3$, CrB, $Cr_3B_4$, $CrB_2$, MOB, $Mo_2B$, $MoB_2$, $Mo_2B_5$, $MoB_{12}$, $W_2B$, WB, $W_2B_5$, $WB_2$, HfB, $LaB_6$, TiC, ZrC, VC, NbC, TaC, $Cr_3C_2$, $Mo_2C$, $W_2C$, WC, TiN, ZrN, VN, NbN, TaN, $Cr_2N$, SiC, $TiSi_2$, $ZrSi_2$, $TaSi_2$, $CrSi_2$, $Mo_5Si_3$, $MoSi_2$1 $Mo_5Si_3C$, $WSi_2$, $Cr_2O_3$, $ZrO_2$, $ReO_3$, $RaO_2$, $LaTiO_3$, $CaMnO_3$, $LaMnO_3$, $CaCrO_3$, $NiFeO_3$, $SrCrO_3$, $Ca_2O$, ZnO, CaO and MnO, for example.

Here, at least one type of ceramic selected from among the oxides, nitrides and silicides is preferred for the matrix in a thermistor material of this third aspect. By this means it is possible not only to exhibit linear temperature-resistance characteristics by adjusting the spacing of the dispersion material but also to control the fractional change in the resistance due to a change in temperature.

Furthermore, at least one type of ceramic selected among the carbides, silicides, nitrides, borides and oxides is preferred for the dispersion material in a thermistor material of this third aspect. By this means it is possible to form electrically conducting pathways which are highly heat resistant and so it is possible to make thermistor materials which are highly reliable over a wide temperature range extending from room temperature (or below) to high temperatures of 1000° C. and above. Furthermore, since various materials can be combined, it is also possible to make materials which are superior in resistance to the environment, such as heat resistance, corrosion resistance, oxidation resistance or the like.

State of Dispersion of the Dispersion Material

The dispersion material is dispersed discontinuously in the aforementioned matrix and forms a network-like electrical path structure in the matrix.

Here, the aforementioned dispersion material in a thermistor material of this third aspect preferably forms a network structure in such a way as to surround a plurality of crystal grains of the material which forms the matrix. It is possible by this means to realize the characteristics of the dispersion material satisfactorily with the addition of just a small amount.

Furthermore, in a thermistor material of this third aspect, the aforementioned dispersion material is preferably dispersed discontinuously in the form of a three-dimensional network in the thermistor material. By this means it is possible to control the resistance with both the electrical resistance of the dispersion material itself and the resistance which is proportional to the inter-particle spacing, and it is possible to realize the intrinsic electrical resistance of the composite body which is a combination of these resistances.

A Preferred Thermistor Material of the Third Aspect

A preferred thermistor material of this third aspect is a thermistor material, characterized in that thermistor material cells comprising a first phase which forms the matrix comprising material which has insulating properties and a second phase as a dispersion material comprising a semi- conductor material or a material which has electrical conductivity of which the thermal expansion coefficient is different from that of the aforementioned first phase, form the structural units, in that the-aforementioned dispersion material is dispersed discontinuously in the form of a three-dimensional network in the thermistor material and in that, moreover, said dispersion material forms a network-like electrical path structure in the thermistor material.

Explanatory drawings which illustrate conceptually actual examples of the structure of the aforementioned thermistor material cells are shown in FIGS. 2 to 5.

FIG. 2 and FIG. 3 are outline explanatory drawings of the transverse cross sections of actual examples of thermistor material cells, and FIG. 2 is a construction in which the first phase 3 is a polycrystalline material and the thermistor material cell 2 is constructed with a plurality of crystal grain 31 as a single block forming the first phase 3, and the second phase 4 is formed with the dispersion material 41 surrounding this discontinuously.

FIG. 3 is an example of a material in which the first phase 3 comprises amorphous material or single crystal material such as a resin and a lump of this in the form of a disk or deformed disk of the prescribed size forms a single block, and the structure is such that the dispersion material 41 forms the second phase 4 which surrounds this discontinuously.

FIG. 4 and FIG. 5 are explanatory drawings which illustrate conceptually actual examples of thermistor material cells, and FIG. 4 is constructed in such a way that the dispersion material 41 forms the second phase surrounding discontinuously all around the block of the first phase 3 which is of spherical or elliptical form.

FIG. 5 is a construction such that the second phase 4 is formed in such a way that the dispersion material 41 is dispersed discontinuously all around the first phase 3 which is of a columnar or oblong form.

Furthermore, a "dispersed discontinuously in the form of a three-dimensional network" state is a state, as shown in the example in FIG. 6, in which the dispersion material is arranged in the form of a three-dimensional network in the thermistor material in the state of individual units and/or aggregates of individual units (including partially connected states and touching states). Furthermore, in those cases where the matrix is comprised of crystal grains, it signifies that at least a plurality of matrix crystal grains is taken as a single unit and a single network mesh is formed surrounding this unit. Preferably, it is a state in which there are few continuously connected particles and in which the discontinuous phase comprising the dispersion material is dispersed with very fine spacing. Most desirably, it is a state such that the dispersed particles are arranged with a spacing of from about 0.005 $\mu$m to about a few $\mu$m.

Moreover, the dispersed state of the aforementioned dispersion material should form a network structure in an essentially discontinuous state, as indicated above, and, furthermore, the form of a single network mesh may be spherical or polyhedral or the like, and the cross-sectional form may be polygonal, circular, elliptical or irregular. Furthermore, with the dispersion material, some of the particles may be dispersed continuously, or continuous bodies may be formed, within the range where the action and effect of a thermistor material of the third aspect are not lost.

The spacing of the aforementioned dispersion material in a thermistor material of this third aspect is preferably not more than 10 $\mu$m. By this means it is possible to exhibit electrical conductivity with the prescribed resistance value even though the dispersion material is discontinuous.

Moreover, the aforementioned spacing of dispersing agent is preferably from 0.001 µm to 0.5 µm.

Furthermore, the size of the aforementioned dispersion material in a thermistor material of this third aspect is preferably from 0.01 µm to 100 µm. By this means the particle diameter of the matrix powder does not become large and the formation of a three-dimensional network structure of the dispersion material (electrically conducting paths) in the thermistor material composite body is facilitated. Furthermore, it is possible to ensure good sinterability since the powder diameter of the matrix powder is small. Furthermore, if the particle diameter is too small the dispersion material does not form a perfect continuous network. Moreover, the size of the aforementioned dispersion material is most desirably from 0.01 µm to 1 µm.

Furthermore, in a thermistor material of this third aspect the size of a single network structure (for example, the size of the aforementioned cell) which is formed by the discontinuous dispersion of the aforementioned dispersion material is preferably from 0.1 µm to 500 µm. By this means a lowering of strength due to peeling, for example, on the outer circumferential part of the thermistor material cells is unlikely to occur, and it is possible to exhibit satisfactorily the properties of the second phase with a small amount of dispersion material. Moreover, the size of one of the aforementioned network structures is most preferably from 0.5 µm to 50 µm. Furthermore, this is preferable since it is possible to vary the change in resistance considerably by varying the width and size of the cells.

Furthermore, in a thermistor material of this present invention the size of a single network structure which is formed by dispersing the aforementioned dispersion material discontinuously is preferably from 5 times to $5 \times 10^4$ times that of the aforementioned dispersion material. By this means it is possible to disperse the prescribed amount of dispersion material around the plurality of matrix crystal grains and to realize electrical conductivity. Moreover, the size of one of the aforementioned network structures is most preferably from 10 times to 1000 times that of the aforementioned dispersion material.

Furthermore, in a thermistor material of this third aspect the dispersion medium preferably has a size of not more than one third of the size of the crystal grains of the material from which the matrix is constructed, and it is preferably dispersed discontinuously in the form of a three-dimensional network. By this means it is possible to reinforce the particles or fibers, for example, of the matrix with the dispersion material. Moreover, the size of the dispersion material is most preferably from one thousandth to one quarter of the size of the crystal grains of the material from which the matrix is constructed.

Furthermore, in a thermistor material of this third aspect the proportion in which the dispersion material is present is preferably in the range from 2 percent by weight to 50 percent by weight. In those cases where said proportion is less than 2 percent by weight the spacing of the dispersion material is widened and there is a danger that realization of the effect and functionality of the skeletal structure will become difficult. Furthermore, if it exceeds 50 percent by weight then the density of the dispersion material in the network-like dispersion phase and reinforcing layer is increased and so sinterability is reduced, and there is a danger that the strength will be reduced. Moreover, those cases in which said proportion is within the range from 10 percent by weight to 40 percent by weight are most desirable since it is then possible to realize the effects of the invention more effectively.

A Preferred Thermistor Material of the Third Aspect

Furthermore, a thermistor material of this third aspect preferably has a third phase which relieves the internal stress produced by the thermal expansion difference and which is dispersed discontinuously and in the form of a network in the aforementioned matrix along with the aforementioned dispersion material. By this means it is possible to suppress the formation of fine cracks and the occurrence of fatigue failure due to the internal stresses which are produced when measuring temperature.

A material which has a low Young's modulus, or which can be deformed easily, so that it can relieve the internal stresses which are produced by differences in thermal expansion, or a material which has high strength so that fine cracks are not produced by the internal stresses is preferred as the material from which this third phase is constructed. In practice, (1) materials which have small elastic modulus, (2) materials in which crystal phase transformations occur readily, (3) materials in which fine pores are present, and (4) materials of which the thermal expansion coefficient is such that base material≦third phase<dispersion material, for example, can be used. Moreover, materials which have good conformability with the base material, and which have good insulating properties or at least of which the electrical resistance is low when compared with that of the dispersion material are preferred.

Another Preferred Thermistor Material of this Third Aspect

Another preferred thermistor material of this third aspect is a thermistor material which is characterized in that: it is a thermistor material comprising a matrix comprising a material which has insulating properties, a third phase as a reinforcing layer (a reinforcing layer or a layer which suppresses the fall in strength which is produced by the addition of the dispersion material of the thermistor material) which has insulating properties comprising the same material as the aforementioned matrix or a material which resembles the aforementioned matrix and which is dispersed continuously in the form of a three-dimensional network in said matrix, and a dispersion material comprising semiconductor material or material which has electrical conductivity having a thermal expansion coefficient different from that of the aforementioned matrix and which is dispersed discontinuously in said reinforcing layer; the aforementioned dispersion material is dispersed discontinuously in the form of a three-dimensional network in the aforementioned thermistor material; and said dispersion material forms a network-like electrical path structure in the thermistor material.

In this preferred thermistor material, the third phase (reinforcing layer) is present in the matrix as a continuous dispersion in the form of a three-dimensional network in the matrix (that is to say, the third phase is dispersed continuously in the form of a three-dimensional network in the thermistor material). In an actual example, the thermistor material cell (cell-like unit) 2 in which the matrix 3 is separated by the third phase 5, as shown in FIG. 15, is taken as a single unit, and the third phase 5 is dispersed continuously in the form of a three-dimensional network in the matrix, so that the dispersion material is dispersed discontinuously in said third phase. In this case the matrix parts can be strongly bonded together by the third phase which is dispersed in the form of a three-dimensional network. Moreover, it is possible to control the electrical resistance between the dispersion material.

Another actual state of existence in this preferred thermistor material is that in which the matrix 3 and the third phase 5 are both formed in the form of continuous three-dimensional networks, as shown in FIG. 16. In this case there is an advantage in that not only the properties of the third phase 5 but also the properties of the matrix 3 itself can be realized more strongly.

Another actual state of existence in this preferred thermistor material is that in which the third phase 5 which has been dispersed as a two-dimensional network is laminated, as shown in FIG. 17. In this case it is possible to bring about anisotropy such that strong properties can be exhibited in two-dimensional directions (the surface directions). There is an advantage in that this is especially effective in the case of thin sheets.

A preferred third phase in this thermistor material comprises the same material as the matrix or a material which resembles the matrix which is dispersed continuously in the form of a three-dimensional network in the thermistor material, and has a structure in which the size D of a single network mesh of the part which is formed by said third phase and the dispersion material is within the range $1 \mu m \leq D \leq 1000 \mu m$ and said part forms a path in the form of a three-dimensional network. With this structure, the material which is the same as the matrix or the material which resembles the matrix and the dispersion material which are mixed in the third phase can be strongly bonded by a grain boundary phase, and also a unique effect can be achieved such that the remarkable effects of the third phase are brought due to the three-dimensional network structure thus constructed.

The state of dispersion of the dispersion material in the third phase (reinforcing layer) in this preferred thermistor material is, for example, (1) a state wherein the dispersion material is dispersed uniformly or at random in the reinforcing layer, (2) a state wherein the dispersion material is dispersed unevenly in the reinforcing layer, (3) a state wherein the dispersion material is dispersed regularly in a specified state, such as a network mesh or in layers, for example, in the reinforcing layer, or (4) a state wherein the dispersion material is dispersed discontinuously in the form of a three-dimensional network in the reinforcing layer. A dispersion structure in which the formation of electrical paths is facilitated can be achieved in cases (2), (3) and (4) among these states, which are preferable. In particular, case (4) is more preferable since the dispersion structure of the dispersion material itself facilitates even more the formation of electrical paths.

Furthermore, the units of the dispersion material which is dispersed in the third phase may be (a) individual units such as single particles or whiskers, (b) individual parts (parts comprising the smallest structural units) and parts in which said individual parts are connected or aggregated are mixed to form discontinuities, or (c) aggregated blocks in which the aforementioned individual units are connected or aggregated to form discontinuities, or they may be combinations of these forms. In this case, the dispersion material which forms the collective units may be of a single type or it may comprise a plurality of types which have different electrical resistance properties to be imparted.

The state of dispersion of the dispersion material in the third phase in this preferred thermistor material is, in practical terms, a state in which the dispersion material 41 is dispersed at random in the whole of the third phase 5, as shown in FIG. 18. In this case the dispersion material 41 can be retained in isolation (as the smallest units) in the third phase 5 comprising the same material as the matrix 3 or a material which resembles the matrix (the residual stress distribution is uniform), and so it is possible to realize a high fracture strength, and there is also an advantage in that high impact resistance and thermal fatigue resistance can be obtained.

Another actual state of dispersion of the dispersion material in this preferred thermistor material is that in which the dispersion material 41 forms a discontinuous network structure (including those which are partially discontinuous) in the third phase 5, as shown in FIG. 19. In this state the strength is somewhat lower than in the case where the dispersion material 41 is dispersed at random, but there is an advantage in that the functional nature of the dispersion material 41, such as its electrical properties and thermal properties for example, can be exhibited strongly.

Another actual state of dispersion of the dispersion material in this preferred thermistor material is that in which the dispersion material 41 is dispersed in proximity within the range where it does not impede the sintering of the matrix 3 and the third phase 5, as shown in FIG. 20. In this state the strength is somewhat lower than that when the dispersion material is dispersed at random, but there is an advantage in that a high electrical conductivity (low resistance) can be realized. Furthermore, it is also possible to realize with a dispersion material of low thermal expansion a PTC effect such that the electrical resistance increases linearly as the temperature increases.

Another actual state of dispersion of the dispersion material in this preferred thermistor material is that in which dispersion material 41 which is partially connected in the circumferential direction is dispersed in the form of a layer, as shown in FIG. 21. In this state the strength is somewhat lower than in the case where the dispersion material is dispersed at random, but there is an advantage in that a high electrical conductivity (greater than in the actual example shown in FIG. 20) can be realized with a smaller amount of the dispersion material.

Another actual state of dispersion of the dispersion material in this preferred thermistor material is that in which dispersion materials which have different properties are dispersed in two or more layers in the circumferential direction of the matrix particles and, for example, it is constructed as a double layer of the first dispersion material 42 and the second dispersion material 43, as shown in FIG. 22. In this case there is an advantage in that it is possible to impart the properties of a plurality of dispersion materials.

Another actual state of dispersion of the dispersion material in this preferred thermistor material is that in which it is dispersed in both the third phase 5 and in the matrix, as shown in FIG. 23. In this state, the dispersion material 6 (which is an additive) which is dispersed in the matrix 3 may have the same properties as, or different properties from, the dispersion material 41 in the third phase 5 and, moreover, a plurality of additives which have various properties may be dispersed.

In this preferred thermistor material, the dispersion material is dispersed discontinuously in the aforementioned third phase and it is dispersed discontinuously in the form of a three-dimensional network in the aforementioned thermistor material. Here, the expression "dispersed discontinuously in the form of a three-dimensional network" signifies a state in which the dispersion material 41 is arranged in the form of a three-dimensional network in the thermistor material in a separated or partially connected (contact) state, as shown in the example in FIG. 24.

In those cases where the matrix in this preferred thermistor material comprises crystal grains, taking a unit comprising a plurality of base matrix crystal grains 31, as shown in FIG. 25, or a unit comprising said matrix crystal grains and part of the third phase which is formed surrounding said matrix crystal grains, as a basic unit, the dispersion material forms the skeleton of the network mesh which surrounds this unit. Preferably, there are few particles which are connected continuously, and the discontinuous phase is dispersed with a very fine spacing. Most desirably, it is a state in which the dispersed particles are connected via a grain boundary phase of from about 0.001 $\mu$m to a few $\mu$m.

In this preferred thermistor material, instead of the third phase being "a third phase as a reinforcing phase which has insulating properties comprising the same material as the matrix or a material which resembles the matrix", it is possible to employ "a third phase as a relieving layer comprising material which has a thermal expansion coefficient closer to that of the matrix than that of the dispersion material and which relieves the internal stress which is generated by the difference in thermal expansions", with the same states of dispersion, states of existence and structures as described above. At this time, the third phase, as said relieving layer, is constructed, for example, with (1) material which has a low elastic modulus, (2) material with which crystal phase transformations occur easily, or (3) material in which very small pores are present. Furthermore, in this preferred thermistor material, when some other suitable third phase is employed instead of "a third phase as a reinforcing layer which has insulating properties comprising the same material as the matrix or a material which resembles the matrix", it is also possible to adopt the same states of dispersion, states of existence and structures as described above.

A Preferred Thermistor Material of this Third Aspect

This preferred thermistor material of the third aspect is characterized in that: it is a thermistor material comprising a matrix comprising a material which has insulating properties, a third phase comprising material which has a thermal expansion coefficient different from that of the aforementioned matrix and which relieves internal stresses when they are generated by differences in thermal expansion and which is dispersed continuously in the form of a three-dimensional network in said matrix, and dispersion material comprising material which has a thermal expansion coefficient different from that of the aforementioned matrix and which is dispersed discontinuously in the form of a three-dimensional network in said third phase; and the aforementioned dispersion material comprises semiconductor material or material which has electrical conductivity, and the dispersion material which is dispersed discontinuously in the form of a three-dimensional network in the aforementioned third phase is dispersed discontinuously in the form of a three-dimensional network in the thermistor material and forms a network-like electrical path structure.

This thermistor material is such that the change in resistance with temperature has excellent linearity over a wide temperature measuring range. Furthermore, this thermistor material has excellent mechanical properties.

That is to say, this thermistor material is characterized in that: it is a thermistor material comprising a matrix comprising material which has insulating properties, a third phase comprising material which has a thermal expansion coefficient different from that of the aforementioned matrix and which relaxes internal stresses when they are generated by differences in thermal expansion and which is dispersed continuously in the form of a three-dimensional network in said matrix, and dispersion material comprising material which has a thermal expansion coefficient different from that of the aforementioned matrix and which is dispersed discontinuously in the form of a three-dimensional network in said third phase; and the aforementioned dispersion material comprises semiconductor material or material which has electrical conductivity, and the dispersion material which is dispersed discontinuously in the form of a three-dimensional network in the aforementioned third phase is dispersed discontinuously in the form of a three-dimensional network in the thermistor material and forms a network-like electrical path structure.

In this thermistor material, a dispersion material which has a different thermal expansion coefficient from the matrix is dispersed discontinuously in the form of a three-dimensional network in the thermistor material and so, when the thermistor material is heated, the spacing of the adjoining dispersion material decreases or increases uniformly according to the difference in the thermal expansion of the matrix and the dispersion material.

At this time, the thermal expansion on heating is proportional to the temperature irrespective of the temperature range and there is an increase or a decrease and so the change in the spacing of the dispersion material due to the difference in thermal expansion is thought to be linear and not dependant on the temperature range. The electrical resistance value decreases or increases in proportion to the spacing of the adjoining dispersion material and so it is thought that linear temperature-resistance characteristics can be obtained over a wide temperature range without much dependence on the temperature-resistance characteristics of the dispersion material itself as was the case in the past.

Furthermore, in a thermistor material of this invention, a third phase comprising material which has a different thermal expansion coefficient from the aforementioned matrix and which relieves internal stresses when they are generated by the difference in thermal expansion is dispersed continuously in the form of a three-dimensional network in the matrix comprising material which has insulating properties. By this means it is possible to relieve the internal stresses (thermal stresses) which are generated by the difference in thermal expansion and to suppress the formation and propagation of cracks and failure.

As indicated above, the thermistor materials of this present invention are thought to have a resistance change with temperature which has excellent linearity over a wide temperature measuring range, and excellent mechanical properties.

Another Preferred Thermistor Material of the Third Aspect

Another preferred thermistor material of this third aspect is characterized in that: it is a thermistor material comprising a matrix comprising material which has insulating properties, a third phase comprising material which has a thermal expansion coefficient different from that of the aforementioned matrix and a low elastic modulus and which is dispersed continuously in the form of a three-dimensional network in said matrix, and dispersion material comprising material which has a thermal expansion coefficient different from that of the aforementioned matrix and which is dispersed discontinuously in said third phase; and the aforementioned dispersion material comprises semiconductor material or material which has electrical conductivity and has a thermal expansion coefficient which is close to the expansion coefficient of the matrix than to that of the dispersion material, and in that the dispersion material which is dispersed discontinuously in the aforementioned third phase is dispersed discontinuously in the form of a three-dimensional network in the thermistor material and forms a network-like electrical path structure.

An Preferred Method for the Manufacture of Thermistor Materials of the Third Aspect A preferred method for the manufacture of thermistor material of this third aspect is characterized by comprising: a composite powder fabricating process wherein a matrix raw material powder comprising a material which has insulating properties and a dispersion material raw material powder of which the thermal expansion coefficient is larger than that of said matrix raw material powder and of which the size is not more than one quarter of the matrix raw material powder are mixed; a molding process wherein said composite powder is molded into the prescribed form and a molding is obtained; and a composite material forming process wherein said molding is heated, whereby a composite material comprising a matrix comprising material which has insulating properties and dispersion material comprising material which has a larger thermal expansion coefficient than aforementioned matrix and which is dispersed discontinuously in the form of a three-dimensional network in said matrix is formed.

In this preferred method of manufacture, the matrix raw material powder comprising material which has insulating properties and the dispersion material raw material powder which has a larger thermal expansion coefficient than said matrix and of which the size is not more than one quarter of the matrix raw material powder are mixed first of all in the composite powder fabricating process. The proportions of the sizes are also as indicated above in those cases where, at this time, the composite powders are granules. Next, the composite powder obtained in the aforementioned composite powder fabricating process is molded into the prescribed form in the molding process and a molding is formed.

Next, on heating the molding obtained in the aforementioned molding process in the composite material forming process, the dispersion material moves (or is discharged) with the crystal precipitation and growth of the matrix above a prescribed temperatures, and it is rearranged into the form of a network. By this means it is possible to form a composite material comprising a matrix comprising material which has insulating properties and dispersion material which has a larger thermal expansion coefficient than the aforementioned matrix and which is dispersed discontinuously in the form of a three-dimensional network in said matrix.

By this means it is possible to form a structure such that the spacing of the dispersion material which has been dispersed discontinuously in the form of a three-dimensional network becomes narrower (or wider) in proportion to the increase in temperature.

Hence, it is thought that a thermistor material of which the change in resistance with temperature has excellent linearity over a wide temperature measuring range can be obtained easily.

Here, the composite powder is preferably fabricated in the composite powder fabricating process of this method for the manufacture of a thermistor material in such a way that the dispersion material which has a larger thermal expansion coefficient than the matrix is present discontinuously on the surface of granules of a prescribed form as the main material of the matrix. By this means, a discontinuous three-dimensional network structure can be formed around a plurality of matrix crystal grains in the sintered body. Moreover, in this case the size of the dispersion material is preferably such that it does not produce a marked reduction in strength.

Another Preferred Method for the Manufacture of a Thermistor Material of the Third Aspect Another preferred method for the manufacture of thermistor materials of this third aspect is characterized by comprising: a composite powder fabricating process wherein a dispersion material powder comprising semiconductor material or material which has electrical conductivity which has a thermal expansion coefficient different from that of the matrix raw material powder and which has a size not more than one quarter of the matrix raw material powder and a third phase raw material powder comprising material which has a thermal expansion coefficient closer to that of the matrix raw material powder than that of the aforementioned dispersion material raw material powder and which relieves the internal stresses which are produced at the time of temperature measurement by the difference in thermal expansion of the dispersion material which is formed with the aforementioned dispersion raw material powder and of which the size is not more than one quarter of the aforementioned matrix raw material powder are mixed in such a way as to cover the surface of a matrix raw material powder comprising material which has insulating properties; a molding process wherein said composite powder is molded into the prescribed form and a molding is obtained; and a composite material forming process wherein said molding is heated, thereby forming a composite material comprising a matrix comprising material which has insulating properties, a third phase comprising material which has different thermal expansion coefficient from the aforementioned matrix and which, when internal stress is produced by the difference in thermal expansion, relieves this stress and which is dispersed continuously in the form of a three-dimensional network in said matrix, and dispersion material comprising material which has a different thermal expansion coefficient from the aforementioned matrix and which is dispersed discontinuously in said third phase.

By means of this method for the manufacture of a thermistor material it is possible to obtain easily a thermistor material of which the change in the resistance value with temperature has excellent linearity over a wide temperature measuring range without adversely affecting the mechanical properties of the matrix.

The mechanism by which a thermistor material of which the change in the resistance value with temperature has excellent linearity over a wide temperature measuring range is obtained by this method of manufacture is not yet clear, but it is thought to be as indicated below.

In this method of manufacture, first of all, in the composite powder fabricating process, a dispersion material raw material powder comprising semiconductor material or material which has electrical conductivity of which the thermal expansion coefficient is different from that of the matrix raw material powder, and of which the size is not more than one quarter of the matrix raw material powder, and a third phase raw material powder comprising material which has a thermal expansion coefficient closer to that of the matrix raw material powder than that of the raw material powder of the aforementioned dispersion material and which relieves the internal stresses produced at the time of temperature measurement by the difference in thermal expansion of the dispersion material which is formed with the aforementioned dispersion raw material powder, and of which the size is not more than one quarter of the aforementioned matrix raw material powder are mixed in such a way as to cover the surface of a matrix raw material powder (including granules) comprising material which has insulating properties. The amount of the third phase raw material is equivalent to or less than that of the dispersion material raw material powder. Then, the composite powder fabricated in the aforementioned composite powder fabricating process is molded into the prescribed form and a molding is obtained in the molding process.

Here, the size of the dispersion material raw material powder and the third phase raw material powder (including the sizes of the respective granules and mixed powders) used in the composite powder fabricating process is not more than one quarter of the size of the matrix raw material powder. By using powders of a size in this range it is possible to form a continuous three-dimensional network structure which surrounds a plurality of matrix crystal grains in the composite material after sintering by mixing the third phase raw material in such a way as to surround the outside of the matrix raw material powder.

Furthermore, the raw material powder of the dispersion material can be dispersed discontinuously in the form of a three-dimensional network in the third phase which is dispersed in a continuous three-dimensional network in the composite material after sintering by mixing in such a way as to surround the outside of the matrix raw material powder discontinuously in the form of a three-dimensional network.

When the size is greater than one quarter of the matrix raw material powder, the third phase raw material is surrounded by the dispersion material and mixed at random with the matrix raw material powder, and upon sintering, a fine structure in which the third phase is dispersed randomly in the matrix and the dispersion material is dispersed in the form of a three-dimensional network around this is formed. On the other hand, the dispersion raw material powder is covered with the third phase raw material and is mixed in a random state with the matrix raw material powder, and, upon sintering, a fine structure in which the matrix and the dispersion material are dispersed at random is formed. In both cases, it is not possible to form the intended thermistor material.

Next, when the molding obtained in the aforementioned molding process is heated in the composite material forming process, the dispersion material moves (or is discharged) as the third phase forms a liquid phase and crystal grains are precipitated out and grow above a prescribed temperature, and said dispersion material is rearranged into a network form in the third phase. By this means it is possible to form a composite material comprising a matrix comprising material which has insulating properties, a third phase comprising material which has a thermal expansion coefficient closer to that of the aforementioned matrix than that of the aforementioned dispersion material and which relieves the internal stress when such a stress is generated by the difference in thermal expansion and which is dispersed continuously in the form of a three-dimensional network in said matrix, and dispersion material comprising material which has a different thermal expansion coefficient from the aforementioned matrix and which is dispersed discontinuously in said third phase.

Moreover, the size of the aforementioned dispersion material raw material powder is preferably not more than one quarter, and most preferably not more than one seventh, of the size of the aforementioned third phase raw material powder. By this means it becomes easy to obtain a thermistor material of the invention.

It is thought that by this means thermistor materials of which the change in resistance value with temperature has excellent linearity over a wide temperature measuring range can be obtained without adversely affecting the mechanical strength properties of the matrix.

Furthermore, it is possible to easily fabricate a thermistor material comprising: a matrix comprising material which has insulating properties; a third phase comprising material which has a thermal expansion coefficient closer to that of the aforementioned matrix than that of the aforementioned dispersion material and which relieves the internal stress when such a stress is generated by the difference in thermal expansion and which is dispersed continuously in the form of a three-dimensional network in said matrix; and dispersion material comprising material which has a different thermal expansion coefficient from the aforementioned matrix and which is dispersed discontinuously in said third phase, and comprising semiconductor material or material which has electrical conductivity, whereby the dispersion material which is dispersed discontinuously in the aforementioned third phase is dispersed discontinuously in the form of a three-dimensional network in the thermistor material and forms a network-like electrical path structure.

At this time, pre-mixing or granulation of the raw material powder of the dispersion material and the third phase raw material to form an additive raw material powder followed by mixing of said additive raw material powder in the composite powder fabricating process in such a way as to cover the surface of the matrix raw material powder is preferable. By this means the prescribed mixing can be carried out easily. Furthermore, the third phase raw material comprises, for example, (1) material which has a low elastic modulus, (2) material which readily undergoes crystal phase transformation or (3) material in which fine pores are present.

Another Preferred Method for the Manufacture of a Thermistor Material of the Third Aspect Another preferred method for the manufacture of a thermistor material of this third aspect is characterized by comprising: a composite powder fabricating process wherein a dispersion material raw material powder comprising semiconductor material or material which has electrical conductivity and which has a different thermal expansion coefficient from that of the matrix raw material powder and of which the size is not more than one quarter of the matrix raw material powder, and a third phase raw material comprising material which is the same as, or resembles, the aforementioned matrix raw material powder and of which the size is not more than one quarter of the aforementioned matrix raw material powder are mixed in such a way as to cover the surface of a matrix raw material powder comprising material which has insulating properties; a molding process wherein said raw material powder is molded into the prescribed form and a molding is obtained; and a composite material forming process wherein said molding is heated, thereby forming a composite material comprising a matrix comprising material which has insulating properties, a third phase as a reinforcing layer which has insulating properties comprising material which is the same as, or which resembles, the aforementioned matrix and which is dispersed continuously in the form of a three-dimensional network in said matrix, and dispersion material comprising semiconductor material or material which has electrical conductivity which has a different thermal expansion coefficient from that of the aforementioned matrix and which is dispersed discontinuously in said third phase.

By this means, it is possible to manufacture easily a thermistor material comprising a matrix phase comprising material which has insulating properties, a third phase as a reinforcing layer which has insulating properties comprising material which is the same as, or which resembles, the aforementioned matrix and which is dispersed continuously in the form of a three-dimensional network in said matrix, and a dispersion material, comprising semiconductor material or a material which has electrical conductivity which has a different thermal expansion coefficient from that of the aforementioned matrix and which is dispersed discontinuously in said reinforcing layer, and in which the aforementioned dispersion material is dispersed discontinuously in the form of a three-dimensional network in the aforementioned thermistor material and, moreover, in which said dispersion material forms a network-like electrical path structure in the thermistor material.

At this time, pre-mixing or granulation of the dispersion material raw material powder and the third phase raw material to form an additive raw material powder followed by mixing of said additive raw material powder in the composite powder fabricating process in such a way as to cover the surface of the matrix raw material powder is desirable. By this means the prescribed mixing can be carried out easily. Furthermore, the third phase raw material comprises, for example, (1) material which has a low elastic modulus, (2) material which readily undergoes crystal phase transformation or (3) material in which fine pores are present.

Moreover, the size of the raw material powder of the aforementioned dispersion material in the above-mentioned preferred method for the manufacture of a thermistor material and the other two preferred methods for the manufacture of a thermistor material above-mentioned is preferably not more than one quarter, and most desirably not more than one seventh, of the size of the aforementioned third phase raw-material powder. By this means a thermistor material of the invention is obtained easily.

Another Preferred Method for the Manufacture of a Thermistor Material of the Third Aspect.

Another preferred method for the manufacture of thermistor materials of this third aspect is characterized by comprising: a composite powder fabricating process wherein a matrix raw material powder comprising material which has insulating properties, and a raw material powder of a dispersion material comprising semiconductor material or material which has electrical conductivity which has a different thermal expansion coefficient from that of said matrix raw material powder and of which the size is not more than one quarter of the matrix raw material powder are mixed; a molding process wherein said composite powder is molded into the prescribed form and a molding is obtained; and a composite material forming process wherein said molding is heated, thereby forming a composite material comprising a matrix comprising material which has insulating properties and dispersion material comprising material which has a different thermal expansion coefficient from that of the aforementioned matrix and which is dispersed discontinuously in the form of a three-dimensional network in said matrix.

It is possible, by means of this method for the manufacture of a thermistor material, to obtain easily a thermistor material of which the change in resistance with temperature has excellent linearity over a wide temperature measuring range.

Thus, this method for the manufacture of a thermistor material involves first of all mixing a matrix raw material powder comprising material which has insulating properties and a dispersion raw material powder comprising semiconductor material or material which has electrical conductivity which has a different thermal expansion coefficient from that of said matrix material powder and of which the size (the size of the granules in the case of granules) is not more than one quarter of the matrix raw material powder (the size of the granules in the case of granules) in the composite powder fabricating process. Then, the composite powder fabricated in the aforementioned composite powder fabricating process is molded into the prescribed form in the molding process and a molding is obtained.

Here, the size of the dispersion material raw material powder which is used in the composite powder fabricating process is not more than one quarter of the size of the matrix raw material powder. When granules are used, it is not more than one quarter of the size of the granules. By using a dispersion raw material powder of a size within this range there is an advantage in that the dispersion material easily forms a three-dimensional network structure surrounding the outside of a plurality of matrix granules. In those cases where the size of the dispersion material raw material powder exceeds one quarter of the size of the matrix raw material powder, the dispersion material is dispersed at random in the matrix.

Next, when the molding obtained in the aforementioned molding process is heated in the composite material forming process, the dispersion material moves (or is discharged) as the matrix forms a liquid phase and crystal grains are precipitated out and grow above a prescribed temperature, and said dispersion material is rearranged into the form of a network. By this means it is possible to form a composite material comprising a matrix comprising material which has insulating properties and dispersion material comprising material which has a different (larger or smaller) thermal expansion coefficient from that of the aforementioned matrix and which is dispersed discontinuously in the form of a three-dimensional network in said matrix.

It is thought that by this means a thermistor material of which the change in resistance with temperature has excellent linearity over a wide temperature measuring range can be obtained easily.

The Fourth Aspect

A composite material of this fourth aspect is an extension of the application of the invention to a composite material in which a composite material of the present invention has a composite structure.

A composite material of this fourth aspect is characterized in that it is a composite material constructed with first crystal grains of small aspect ratio and second crystal grains of large aspect ratio comprising the same material, in which either the aforementioned first crystal grains or the aforementioned second crystal grains form a matrix and in which the other crystals are dispersed in the aforementioned base material as accumulated island-like or net-like dispersed bodies, and in that the aforementioned base material or dispersed bodies is/are dispersed discontinuously in the form of a three-dimensional network in the aforementioned composite material.

By this means, a composite material of this fourth aspect can be a composite material which is furnished with both properties such as superplasticity and high instantaneous breaking strength and properties such as excellent toughness, high temperature strength, creep resistance and fatigue resisting strength.

That is to say, a composite material of this fourth aspect is a composite material wherein either first crystal grains which have a small aspect ratio or second crystal grains which have a large aspect ratio form the base material and the other type of crystal grains are dispersed in the aforementioned base material as accumulated island-like or net-like dispersed bodies. Consequently, a composite material of this fourth aspect can have both the properties of the first crystal grains which have a small aspect ratio, such as superplasticity and high instantaneous breaking strength, and the properties of the second crystal grains which have a large aspect ratio, such as excellent toughness, high temperature strength, creep resistance and fatigue resistance strength.

Furthermore, the aforementioned base material or dispersed bodies is/are dispersed discontinuously in the form of a three-dimensional network in the aforementioned composite material and so it is possible to form a composite material which has excellent mechanical strength properties.

A Preferred Composite Material of the Fourth Aspect

A preferred composite material of the fourth aspect is a material in which the average aspect ratio of the aforementioned second crystal grains is preferably from 2 to 50 times the average aspect ratio of the aforementioned first crystal grains. By this means it is possible to exhibit more effectively both the different types of mechanical properties aforementioned.

Furthermore, the aforementioned second crystal grains are preferably rodlike or in the form of flakes. By this means it is possible to exhibit the properties of the second crystal grains more effectively.

Moreover, the average thickness of the aforementioned dispersed bodies is preferably from 1 $\mu$m to 100 $\mu$m, and the average spacing between adjoining dispersed bodies is preferably from 5 $\mu$m to 500 $\mu$m. By this means it is possible to obtain a composite material which has both of the aforementioned types of properties.

Furthermore, the aforementioned first crystal grains are preferably a material with which high strength or/and superplasticity is realized and the aforementioned, second crystal grains are preferably a material with which high toughness or/and high creep resistance is realized.

Furthermore, the surroundings of the crystal grains of high aspect ratio with which high toughness is obtained are preferably formed in such a way as to be surrounded discontinuously in the form of a three-dimensional network with the crystal grains which have a small aspect ratio and small grain diameter with which superplasticity is realized. By this means it is possible to provide composite materials with which high superplasticity and high toughness can be realized at the same time, which is difficult to be obtained with a single structure. Moreover, the crystal grains which have a small particle diameter can also realize a high fracture strength and so it is possible to form composite materials which also have excellent fracture strength.

Furthermore, it is desirable that both the plurality of crystal grains which have a small grain size and a small aspect ratio and the crystal grains which have a large grain size and a large aspect ratio should form three-dimensional networks, and that one of them should be dispersed discontinuously. By this means it is possible to form composite materials which have excellent fracture strength, high temperature strength, creep resistance and fatigue strength.

The Fifth Aspect

A composite material of this fifth aspect is an extension of the application of the invention to composite materials of the invention which have pores.

A composite material of this fifth aspect is a material with pores, characterized in that it comprises a base material and pores which are dispersed discontinuously in the form of a three-dimensional network which has been formed in said base material.

This composite material enables the properties of the pores to be exhibited satisfactorily without having a marked adverse effect on the mechanical properties of the base material.

That is to say, a composite material of this fifth aspect has pores formed discontinuously in the base material in the form of a three-dimensional network. By this means parts with much base material and parts with many pores are present, and the parts with many pores are distributed discontinuously in the form of a three-dimensional network. Consequently, the properties of the pores are exhibited more strongly, and are more apparent, in the parts where there are many pores. Moreover, since they are in the form a three-dimensional network, the parts where there is much base material and parts where there are many pores are present repeatedly from one side of the material to the other. Now, the properties of the pores are more apparent in the parts where there are many pores and so the properties of the pores can be exhibited more strongly than expected with the proportion in which they are present in the material as a whole.

A Preferred Composite Material of the Fifth Aspect

A preferred composite material of the fifth aspect is preferably such that the aforementioned base material comprises large diameter particles of large diameter and groups of small diameter particles of small diameter which are embedded in the spaces among said adjoining large diameter particles, and the aforementioned pores are formed in the spaces among the groups of small diameter particles.

Furthermore, preferably, the aforementioned base material is a material in which large diameter particles of large diameter have been fused together and the aforementioned pores are formed among the aforementioned adjoining large diameter particles which have been fused together.

Furthermore, preferably, the aforementioned base material comprises large diameter particles of large diameter and groups of small diameter particles of small diameter which are embedded in the spaces among the aforementioned adjoining large diameter particles, and the pores are dispersed discontinuously in the matrix which is formed by the aforementioned small diameter particles.

Furthermore, the size of the aforementioned pores is preferably from 0.01 $\mu$m to 50 $\mu$m. By this means it is possible to form a composite material with which the properties of the pores can be exhibited satisfactorily and with which there is little loss of strength of the composite material and which have excellent mechanical properties.

Furthermore, the spacing of the aforementioned pores is preferably from 0.01 $\mu$m to 100 $\mu$m. By this means it is possible to form composite materials with which the properties of the pores can be realized efficiently and which have excellent mechanical properties.

EXAMPLES

Example 1

Atomized SUS304 powder of average primary particle diameter 4 $\mu$m was fabricated as the raw material for the base material and, after granulating using ethanol and heat-treating provisionally at 900° C., it was granulated using a sieve up to 500 $\mu$m in a powder diameter.

Next, $ZrO_2$ powder (TZP: 3 mol $Y_2O_3$ added) of average primary particle diameter about 0.1 $\mu$m was fabricated as dispersion material raw material and this was crushed so as to provide an average grain diameter of 60 $\mu$m or less using a ball mill and a mortar.

Then a composite powder was fabricated by scattering the aforementioned $ZrO_2$ granules in an amount of 10 percent by volume discontinuously as a covering on the surface of the aforementioned base material granules.

Next, the composite powder obtained was introduced into a mold and press-molded (5 t/cm$^2$) and sintered at 1280° C. for 4 hours (under vacuum) and the composite material of this example was obtained (Sample No.1).

The cross section of the composite material obtained was subjected to structure observation using a microscope. An optical microscope photograph (magnification: 100 times)

which shows the metal structure in the cross section of the composite material is shown in FIG. 1. As is clear from FIG. 1, composite material cells as the structural units comprising a first phase comprising the base material and a second phase comprising the dispersion material which was formed in such a way as to surround said first phase discontinuously and a plurality of said structural units were joined together, and the structure was such that the dispersion material constituting the second phase was dispersed discontinuously in the form of a three-dimensional network in the base material.

Comparative Example 1

Figure 28:
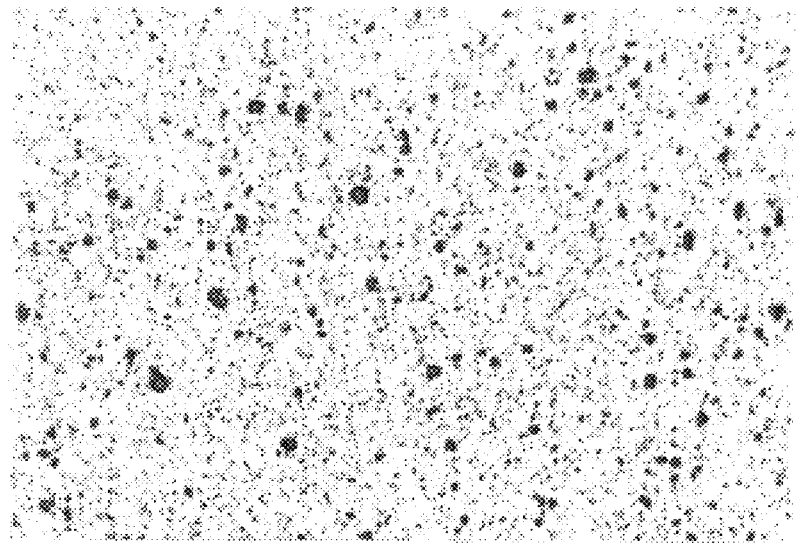

For comparison, a mixed powder wherein $ZrO_2$ powder (YZP: 3 mol $Y_2O_3$ added) of average particle diameter about 0.1 μm in an amount of 10 percent by volume had been added to, and mixed uniformly with, atomized SUS304 powder of average primary particle diameter 4 μm was introduced into a mold and press-molded (5 t/cm$^2$) and sintered at 1280° C. for 4 hours (under vacuum) to prepare a sintered body for comparative purposes (Sample No.C1). The cross section of the composite material obtained was subjected to structural observation using a microscope. An optical microscope photograph (magnification: 100 times) in FIG. 28 shows the metal structure of the cross section of the composite material. As is clear from FIG. 28, this had a structure in which the second phase was dispersed uniformly in the first phase of the base material.

Comparative Example 2

For comparison, a mixed powder obtained by covering the surface of an atomized SUS304 powder of average primary particle diameter 10 μm continuously with 10 percent by volume of $ZrO_2$ powder (YZP: 3 mol $Y_2O_3$ added) of average particle diameter about 0.1 μm was introduced into a mold and press-molded (5 t/cm$^2$) and sintered at 1280° C. for 4 hours (under vacuum) to prepare a sintered body for comparative purposes (Sample No.C2). Observation of the structure of the cross section of the composite material using a microscope revealed a structure such that the second phase surrounding continuously the first phase with almost as large a particle size as the primary particles of about 10 μM.

Performance Evaluation Tests

The composite material obtained in Example 1 and the sintered bodies for comparative purposes obtained in Comparative Example 1 and Comparative Example 2 were subjected to thermal insulation evaluation tests. That is to say; first of all the sintered bodies obtained were worked to φ20×3 mm and the surfaces were finished with #500–#1500 abrasive papers and then the thermal conduction (thermal insulation) properties were evaluated. The evaluation of the thermal conduction properties was carried out by applying a temperature difference of 200° C. at room temperature to the reverse side of the sample and measuring the time dependency of the temperature at the low temperature side. The results are shown in Table 1. Moreover, data for SUS alone is also shown in the table for reference.

TABLE 1

| Sample | Time Required for the Low Temperature Side to Reach 100° C. from Room Temperature |
| --- | --- |
|  | RT → 100° C. |
| Example 1 | 4.5 seconds |
| Comparative Example 1 | 3.8 seconds |
| Comparative Example 2 | 4.1 seconds |
| SUS Alone | 3.2 seconds |

As is clear from Table 1, the sintered body of this invention had much improved thermal insulation properties when compared with SUS alone, and it also exhibited thermal insulation properties better than those of Comparative Example 1 and Comparative Example 2.

Example 2

Base material raw material granules of average grain diameter of 500 μm or less were prepared by wet grinding and mixing 92 percent by weight $Si_3N_4$ powder of average primary particle diameter 0.1 μm, 5 percent by weight $Y_2O_3$ powder of average primary particle diameter 0.5 μm and 3 percent by weight $Al_2O_3$ of average primary particle diameter 0.1 μm in a ball mill.

Next, SiC particles of average primary particle diameter 0.4 μm were scattered in an amount of 10 percent by volume with respect to the total amount so as to cover discontinuously the surface of said base material raw material granules, and a composite powder was fabricated.

Next, this composite powder was introduced into a mold and press-molded and then it was pressure-sintered under conditions of 1850° C., 4 hours, 10 kg/cm$^2$ $N_2$ pressure, and the composite material of this invention of this example was obtained (Sample No.2).

A cross section of the composite material obtained was plasma etched and the particle structure of said cross section was observed using an SEM (scanning electron microscope). The results showed that structural units of composite material cells comprising both the $Si_3N_4$ matrix as a first phase and SiC particles as a second phase which devides the first phase and that a plurality of said composite cells were linked together to form the composite material, and that the dispersion material was dispersed discontinuously in the form of a three-dimensional network in the matrix. Furthermore, a plurality of $Si_3N_4$ crystal grains were present in the first phase.

Comparative Example 3

For comparison, SiC powder of average primary particle diameter 0.4 μm was applied to cover continuously the whole surface of granules (diameter not more than 500 μm) which had been fabricated by wet grinding and mixing 92 percent by weight $Si_3N_4$ powder (average primary particle diameter 0.1 μm), 5 percent by weight $Y_2O_3$ powder (average primary particle diameter 0.5 m) and 3 percent by weight $Al_2O_3$ of average primary particle diameter 0.1 μm in a ball mill. Subsequently, the granules were molded and pressure-sintered under the same conditions as described above (Sample No.C3). On observing a cross section of this sintered body for comparative purposes in the same way as in the aforementioned Example 2, the SiC particles were dispersed continuously in the form of a three-dimensional network in the $Si_3N_4$ matrix.

Comparative Example 4

For comparison, granules (diameter of 500 Lm or less) in which SiC particles were dispersed uniformly in the matrix were fabricated by wet grinding and mixing simultaneously in a ball mill 10 percent by weight SiC powder of average primary particle diameter 0.4 m with 82 percent by weight $Si_3N_4$ powder (average primary particle diameter 0.3 μm), 5 percent by weight $Y_2O_3$ powder (average primary particle diameter 1 μm) and 3 percent by weight $Al_2O_3$ of average primary particle diameter 0.1 μm, and then the granules were molded and pressure-sintered under the same conditions as in the aforementioned Example 2 (Sample No.C4). On observing the cross section of this sintered body for comparative purposes, the SiC particles were dispersed uniformly in the $Si_3N_4$ matrix.

Performance Evaluation Tests

The bending strength (measured at room temperature and 1400° C. in accordance with the JIS 4 point flexural strength test method), the electrical resistance (4 contact method), and the elastic modulus (resonance method) of the composite material obtained in Example 2 and the sintered bodies for comparative purposes obtained in Comparative Example 3 and Comparative Example 4 were measured. The results confirmed that the strength at room temperature and at high temperature of the sintered bodies of this example was higher than that of any of Sample Nos.C3 and C4 of the comparative examples, and that the electrical resistance value and the elastic modulus were better than those of the comparative example (Sample No.C4) in which the silicon carbide had been dispersed uniformly.

Example 3

Atomized SUS304 powder of average promary particle diameter 4 μm was fabricated as a raw base material and, after powdered with ethanol and provisionally heated at 900° C., it was granulated so as to have a diameter of 500 μm or less with a sieve.

Next, $ZrO_2$ powder (YZP: 12 mol $CeO_2$ added) of average primary particle diameter about 0.1 μm was prepared as a dispersion material raw material and pulverized using a ball mill and a mortar so as to provide an average grain diameter of 60 μm.

Then, 15 percent by volume of the aforementioned $ZrO_2$ granules was scattered discontinuously so as to cover the surface of the aforementioned base material granules in an SUS pot to prepare a composite powder.

Next, the composite powder fabricated was introduced into a mold and press-molded (5 t/cm$^2$) and sintered at 1280° C. for 4 hours (under vacuum) and the composite material of this example was obtained (Sample No.3).

A cross section of the composite material obtained was subjected to structural observation with a microscope in the same way as in Example 1. The results confirmed that it was constructed with a plurality of composite material cells each as the structural units comprising a first phase comprising the base material and a second phase comprising dispersion material which had been formed in such a way as to surround discontinuously said first phase, and that the dispersion material which formed the second phase was dispersed discontinuously in the form of a three-dimensional network in the base material.

Comparative Example 5

For comparison, a mixed powder wherein $ZrO_2$ powder (YZP: 12 mol $CeO_2$ added) of average particle diameter about 0.1 μm had been added in an amount of 15 percent by volume and mixed uniformly with atomized SUS304 powder of average primary particle diameter 4 μm was introduced into a mold and press-molded (5 t/cm$^2$) and sintered at 1280° C. for 4 hours (under vacuum) to prepare a sintered body for comparative purposes (Sample No.C5). The cross section of the composite material obtained was subjected to structural observation using a microscope in the same way as in the aforementioned Example 1. The result confirmed that it had a structure in which the second phase was dispersed uniformly in the first phase comprising the base material Performance Evaluation Tests The composite material obtained in Example 3 and the sintered body for comparative purposes obtained in Comparative Example 5 were subjected to thermal insulation evaluation tests using the laser flash method. The results are shown in Table 2. Moreover, data for SUS alone is also shown in the table for reference.

TABLE 2

| Thermal Diffusion Factor (Room Temperature) | |
|---|---|
| Sample | Thermal Diffusion Factor |
| Example 3 | 0.029 cm$^2$/s |
| Comparative Example 5 | 0.035 cm$^2$/s |
| SUS Alone | 0.040 cm$^2$/s |

As is clear from Table 2, the sintered body of this invention had much improved thermal insulation properties when compared with SUS alone, and it also exhibited thermal insulation properties better than Comparative Example 5.

Example 4

Matrix granules of grain diameter from a few im to 500 μm were fabricated by wet grinding and mixing 92 percent by weight $Si_3N_4$ powder (average primary particle diameter 0.1 μm), 5 percent by weight $Y_2O_3$ powder (average primary particle diameter 0.5 μm) and 3 percent by weight $Al_2O_3$ (average primary particle diameter 0.1 μm) in a ball mill and drying.

Then, 46 percent by weight $Si_3N_4$ powder (average primary particle diameter 0.1 μm), 8 percent by weight $Y_2O_3$ powder (average primary particle diameter 0.5 μm) and 46 percent by weight SiC powder (average primary particle diameter 0.4 μm) were wet ground and mixed in a ball mill and a dispersion powder adjusted to an average grain diameter of not more than 70 μm was fabricated.

Next, using the matrix granules and the dispersion powder fabricated in the aforementioned processes, the aforementioned dispersion powder was scattered over the whole surface of the aforementioned matrix granules in such a way that the added amount of SiC was 10 percent by weight with respect to all of the powder, and a composite powder was fabricated.

The composite powder fabricated was introduced into a mold and press-molded (pressure 20 MPa) and then, after a CIP treatment (3 t/cm$^2$), it was subjected to pressureless sintering under conditions of 1850° C. for 4 hours (under nitrogen) and the composite material of this example was obtained (Sample No.4).

A cross section of the obtained composite material was ECR plasma etched and the surface was observed wiht a metallurgical microscope. The result showed that the composite material of this example had a reinforcing layer with a three-dimensional network structure such that a mixed phase constructed with fine $Si_3N_4$ crystal grains and SiC particles surrounded continuously the outside of a plurality of $Si_3N_4$ (matrix) crystal grains. Furthermore, it was confirmed that in the composite material, the SiC particles as the dispersion material were dispersed discontinuously in the form of a three-dimensional network in the base material.

Comparative Example 6

For comparison, a comparative composite material in which the dispersion material was dispersed uniformly in the matrix was fabricated. Thus, 10 percent by weight of SiC powder (average primary particle diameter 0.4 μm) was wet ground and mixed with 82 percent by weight $Si_3N_4$ powder (average primary particle diameter 0.1 m), 5 percent by weight $Y_2O_3$ powder (average primary particle diameter 0.5 μm) and 3 percent by weight $Al_2O_3$ in a ball mill to fabricate a mixed powder of grain diameter from a few pm to 500 μm, and this powder was press-molded (pressure 20 MPa) and subjected to a CIP treatment (3 t/cm$^2$) and then it was subjected to pressureless sintering under conditions of 1850° C. for 4 hours (under nitrogen) and the comparative composite material, Comparative Example 6 was obtained (Sample No.C6).

The cross section of this comparative composite material underwent ECR plasma etching and was observed with an SEM in the same way as in Example 4. It was found from the observation that the SiC particles were dispersed uniformly in the $Si_3N_4$ crystal grains of the matrix.

Comparative Example 7

For comparison, a comparative omposite material in which the SiC particles formed a network in the matrix was fabricated. Thus, a mixed powder of grain diameter adjusted to not more than 500 μm was fabricated by wet grinding and mixing 92 percent by weight $Si_3N_4$ powder (average primary particle diameter 0.1 μm), 5 percent by weight $Y_2O_3$ powder (average primary particle diameter 0.5 μm) and 3 percent by weight $Al_2O_3$ (average primary particle diameter 0.1 μm) in a ball mill. Then, the whole surface of the mixed powder was coated with just SiC powder (average primary particle diameter 0.4 μm) to prepare a mixed powder, and this mixed powder was press-molded (pressure 20 MPa) and subjected to a CIP treatment (3 t/cm$^2$) and then it was subjected to pressureless sintering under conditions of 1850° C. for 4 hours (under nitrogen) and the comparative composite material, Comparative Example 7 was obtained (Sample No.C7).

The cross section of this comparative composite material underwent ECR plasma etching and was observed with an SEM in the same way as in Example 4. It was found from the observation that three-dimensional network continuous structure formed in such a way that the SiC particles surrounded continuously a plurality of $Si_3N_4$ crystal grains of the matrix with many pores in the vicinity of the SiC particles.

Performance Evaluation Tests

The composite material obtained in Example 4 above, and the comparative composite materials obtained in Comparative Example 6 and Comparative Example 7, were subjected to tests for the evaluation of mechanical properties in which density of the sintered body (g/cm$^3$) was measured, the room temperature strength was measured (in accordance with the JIS R 1601 strength testing method) and creep strain rate was measured (JIS R 1612 bending creep test method). The results obtained are shown in Table 3. Moreover, specimens measuring 3×4×40 mm were cut out from the respective composite materials, and the strength at room temperature and the creep properties under 20 hours x 150 MPa×1200° C. were evaluated.

TABLE 3

Comparison of the Mechanical Properties of $Si_3N_4$/SiC Composites

| Sample No. | Sintering Density (g/cm$^2$) | Room Temperature Strength (MPa) | Creep Strain Rate After 20 Hours (1/s) |
|---|---|---|---|
| Example 4 | 3.27 | 750 | 0.0056 |
| Comparative Example 6 | 3.26 | 786 | 0.016 |
| Comparative Example 7 | 3.19 | 410 | 0.0092 |
| Monolithic Material | 3.25 | 950 | 0.02 |

As is clear from Table 3, the composite material of Example 4 was such that the creep strain rate after 20 hours under 1200° C.×150 MPa was smaller by about 65% and about 40% respectively when compared with Comparative Example 6 and Comparative Example 7, and it was reduced by about 72% when compared with the monolithic material.

On the other hand, Comparative Example 5 was such that the creep strain rate after 20 hours was 0.016 reduced only by about 20% in comparison with the monolithic material. Furthermore, Comparative Example 7 was such that the creep strain rate after 20 hours was 0.0092 reduced by about 54% when compared with the monolithic material. The reduction degree of Comparative Example 6 and Comparative Example 7 with respect to the creep strain rate of the monolithic material were both lower than that of the aforementioned Example 4.

Example 5

First of all atomized SUS304 powder (matrix granules: primary particle diameter about 4 μm) which had been granulated to a diameter of 500 μm or less was fabricated.

Then, a dispersion powder wherein SUS304 powder (primary particle diameter about 4 μm) and $ZrO_2$ powder (primary particle diameter about 0.1 μm) had been mixed uniformly at a ratio by volume of 7:3 was fabricated.

Next, a raw material powder was fabricated from the matrix granules and the dispersion powder fabricated in the aforementioned processes, covering the surface of the aforementioned matrix granules with the aforementioned dispersion powder in such a way that the amount of $ZrO_2$ added was 10 percent by volume with respect to the whole amount of powder.

The composite powder thus fabricated was introduced into a mold and press-molded (pressure 5 t/cm$^2$) and sintered under conditions of 1300° C. for 4 hours (under vacuum) and the composite material of this example was obtained (Sample No.5).

Figure 29:
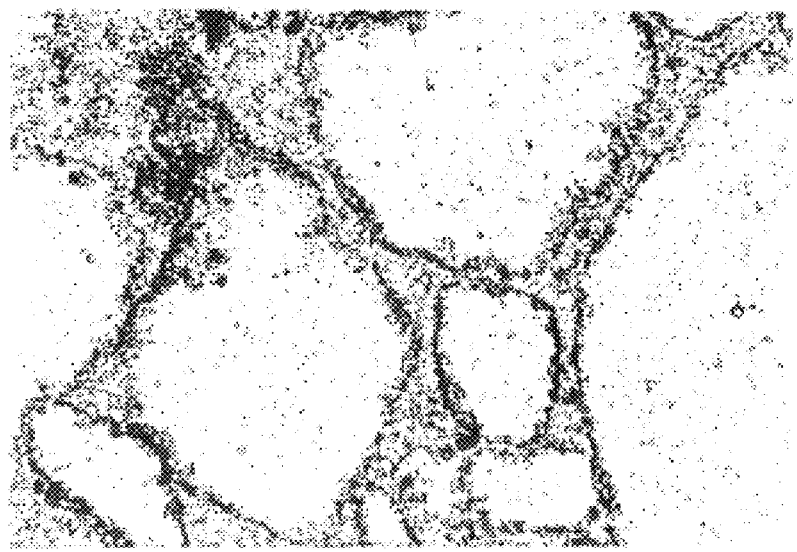

A cross section of the composite material obtained was observed using a metallurgical microscope. The result is shown in FIG. 29 as an SEM photograph (magnification 100 times) which shows the particle structure in the cross section of the composite material. As shown in this photograph, the composite material of this example was found to have a reinforcing layer of a three-dimensional network structure such that a mixed phase between base material and $ZrO_2$ surrounded continuously the base material crystal grains of diameter 500 μm or less. Furthermore, it was confirmed that in the composite material the $ZrO_2$ as the dispersion material was dispersed discontinuously in the form of a three-dimensional network in the base material.

Comparative Example 8

For comparison, a comparative composite material in which the reinforcing particles were dispersed uniformly in the base material was prepared. Thus, $ZrO_2$ powder and atomized SUS304 powder of average diameter about 3 μm were uniformly mixed and press-molded (pressure 4 t/cm$^2$) and then sintered under conditions of 1300° C. for 4 hours (under vacuum) and the comparative composite material, Comparative Example 8 was obtained (Sample No.C8).

The cross section of this comparative composite material was observed in the same way as in the aforementioned Comparative Example 5. It was found from the observation that the $ZrO_2$ particles were dispersed comparatively uniformly in the base material matrix.

Comparative Example 9

For comparison, a comparative composite material wherein the reinforcing layer was formed as a network in the matrix was prepared. Thus, the surface of atomized SUS304 powder (base particles, primary particle diameter about 4 μm) which had been granulated to a grain diameter of 500 μm or less was coated with 10 percent by volume of $ZrO_2$ powder (primary particle diameter about 0.1 μm) alone to obtain a composite powder. Next, this composite powder was sintered under conditions of 1300° C. for 4 hours (under vacuum) and the comparative composite material, Comparative Example 9 was obtained (Sample No.C9).

On observing a cross section of this comparative composite material with a metallurgical microscope in the same way as in the aforementioned Example 5, a three-dimensional network structure formed in such a way that the $ZrO_2$ surrounded continuously the matrix crystal grains of particle size 500 μm or less.

Performance Evaluation Tests

The composite material obtained in Example 5 and the comparative composite materials obtained in Comparative Example 8 and Comparative Example 9 were subjected to performance evaluation tests by carrying out oxidation resistance tests and thermal insulation property tests. That is to say, the surfaces of the samples obtained (φ20×3 mm) were finished with #500–1500 abrasive papers and then the oxidation resistance and thermal conduction (thermal insulation) properties were evaluated. The oxidation resistance test was carried out under conditions of 1200° C. for 100 hours. The thermal conductivity was evaluated in terms of the time required for the surface temperature to reach a prescribed temperature (150° C.) on heating the reverse side of the sample of composite material from room temperature to 200° C. The results are shown in Table 4.

TABLE 4

Comparison of the Anti-Oxidation Properties and Thermal Conduction Properties of SUS304/$ZrO_2$ Composites

| Sample Number | Oxidative Increase of Weight during 100 hours at 1200° C. (mg/cm$^2$) | RT → 150° C. Time to Reach (sec) |
|---|---|---|
| Example 5 | 0.3 | 8.9 |
| Comparative Example 8 | 1.2 | 6.9 |
| Comparative Example 9 | — | 7.2 |
| Monolithic SUS304 Material | 1.4 | 6.0 |

As is clear from Table 4, the time required to reach 150° C. from RT (room temperature) with the composite material of Example 5 was about 9 seconds, some 40–50% slower than that in the case of the monolithic material, and it is clear that a large thermal insulating effect is realized by dispersing $ZrO_2$ which has a low thermal conductivity in the form of a network in SUS304.

On the other hand, Comparative Example 8 required about 6.9 seconds to reach 150° C. from RT, some 13–18% slower than the monolithic material and the thermal insulation was about one third that of Example 5. Furthermore, Comparative Example 9 required about 7.2 seconds to reach 150° C. from RT, some 20–28% slower than the monolithic material, and the thermal insulation was about half that of Example 5.

Furthermore, the increase in weight on oxidation of Example 5 was 0.3 mg/cm$^2$, being reduced to about one quarter of that of the monolithic material, and it is clear that the oxidation resistance is greatly improved by the dispersion in the form of a three-dimensional network. On the other hand, the increase in weight on oxidation with Comparative Example 8 was about the same as that of the monolithic material and about 4 times that of Example 5.

Example 6

First of all, granules were fabricated by adding 15% by weight and 20 percent by weight of SiC at grain diameter ratio ($Si_3N_4$/SIC) from 6 to 7, to 79 percent by weight and 74 percent by weight of $Si_3N_4$ powder (average primary particle diameter 0.2 μm) and 6 percent by weight of $Y_2O_3$ powder (average primary particle diameter 0.5 μm), wet grinding and mixing in a ball mill, and drying and spray-drying the resultant mixtiure.

The granular powders fabricated were introduced into a mold and uniaxially press-molded (pressure 20 MPa) and then hot press sintered under conditions of 1850° C. for 1 hour (in $N_2$) and the composite materials of this invention were obtained (Sample No.6 [with 20 percent by weight SiC added] and Sample No.7 [with 15 percent by weight SiC added].

Cross sections of the composite materials obtained were subjected to ECR plasma etching and the surfaces were observed using an metallurgical microscope. The results confirmed that the composite materials of this example had the SiC particles dispersed discontinuously in the form of a three-dimensional network in the base material so that SiC particles surrounded a plurality of $Si_3N_4$ (matrix) crystal grains.

Example 7

$Si_3N_4$ powder (82 percent by weight) of average primary particle diameter 0.1 μm, 5 percent by weight $Y_2O_3$ powder of average primary particle diameter 0.5 μm and 3 percent by weight $Al_2O_3$ powder of average primary particle diameter 0.1 μm were wet ground and mixed in a ball mill to fabricate a base material raw material granules of grain diameter from a few tens of lm to 300 μm.

Next, SiC particles of average primary particle diameter 0.4 μm were scattered discontinuously in an amount of 10 percent by weight on the surface of said base material raw material granules and a composite powder was fabricated.

Next, the composite powder was introduced into a mold and press-molded and, after carrying out a CIP treatment (3 t/cm$^2$), it was pressure-sintered under conditions of 1850° C. for 4 hours, $N_2$ pressure 10 kg/cm$^2$, and the composite material of this example in this invention was obtained (Sample No.8).

A cross section of the composite material obtained was plasma etched and the particle structure of said cross structure was observed using an SEM (scanning electron microscope). The results confirmed that the dispersion material was dispersed discontinuously in the form of a three-dimensional network in the matrix.

Comparative Example 10

For comparison, SiC powder (10 percent by weight) of average primary particle diameter 0.4 μm was wet ground and mixed simultaneously in a ball mill with 82 percent by weight $Si_3N_4$ powder (average primary particle diameter 0.3 μm), 5 percent by weight $Y_2O_3$ powder (average primary particle diameter 1 μm) and 3 percent by weight $Al_2O_3$ powder of average primary particle diameter 0.1 μm and granules (average grain diameter 500 μm or less) wherein the SiC particles were dispersed uniformly in the matrix were fabricated, and then these were molded and pressure-sintered under the same conditions as in the abovementioned Example 7 (Sample No.C10). On observing the cross section of this sintered body for comparative purposes, the SiC particles were dispersed uniformly in the $Si_3N_4$ of the matrix.

Comparative Example 11

For comparison 70 percent by volume of $SiO_2$ powder (average primary particle diameter 1.2 μm) and 30 percent by volume of SiC particles in which the $SiO_2$/SiC particle diameter ratio was about 1/1.5 were wet ground and mixed in a ball mill and the granules fabricated were introduced into a mold and press-molded, after which the molding was hot press sintered under conditions of 1800° C. for 1 hour at 20 MPa, and a sintered body for comparative purposes was obtained (Sample No.C11). On observing the cross section of thus obtained sintered body for comparative purposes, it was seen that the SiC particles were dispersed at random in the $SiO_2$ of the matrix.

Comparative Example 12

For comparison, a sintered body comprising $Si_3N_4$ alone in which no SiC had been dispersed (Sample No.C12) was prepared.

Comparative Example 13

For comparison, a sintered body comprising SiC alone (Sample No.C13) was prepared.

Comparative Example 14

For comparison, a sintered body comprising a thermistor material based on commercial MgO—$Al_2O_3$—$Cr_2O_3$ was prepared (Sample No.C14).
Performance Evaluation Tests The abovementioned composite materials obtained in Example 6 and Example 7, and the sintered bodies for comparative purposes obtained in Comparative Examples 10 to 14, were subjected to electrical resistance measurements (4 contact point method) in the temperature range from room temperature to 1000° C. The results are shown in FIG. 30, FIG. 31 and Table 5.

Figure 30:
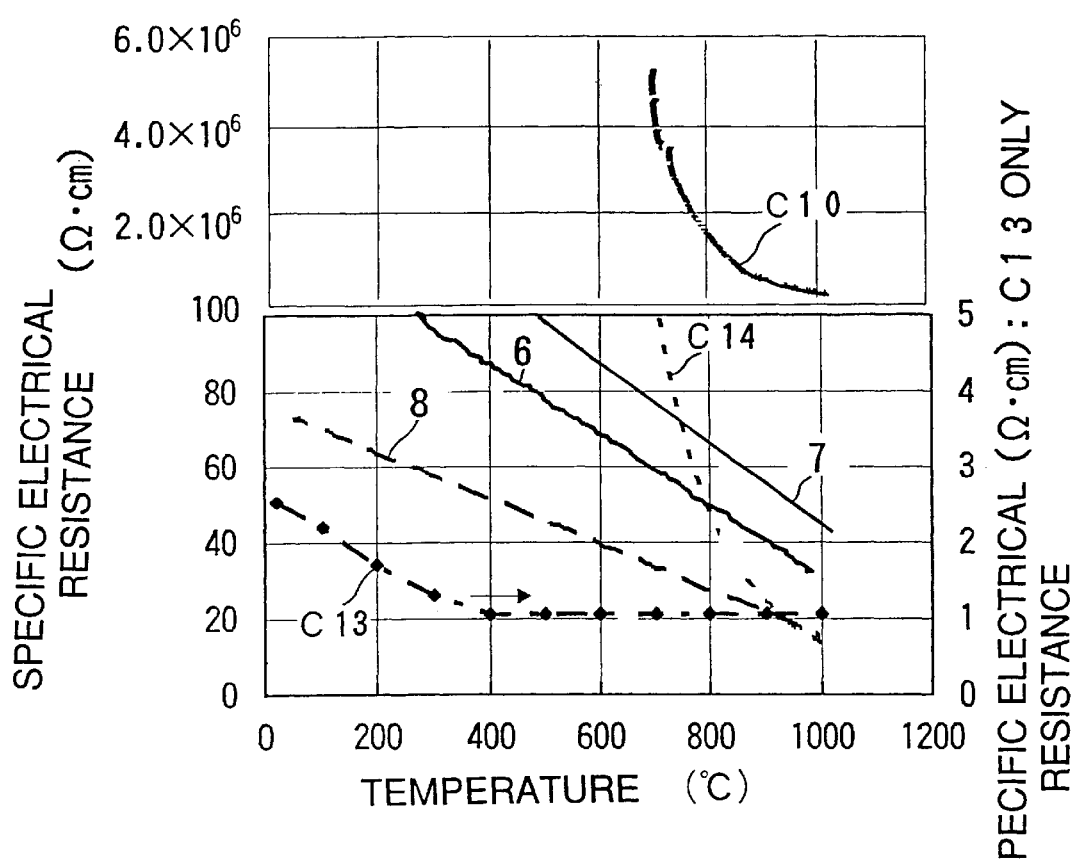
Figure 31:
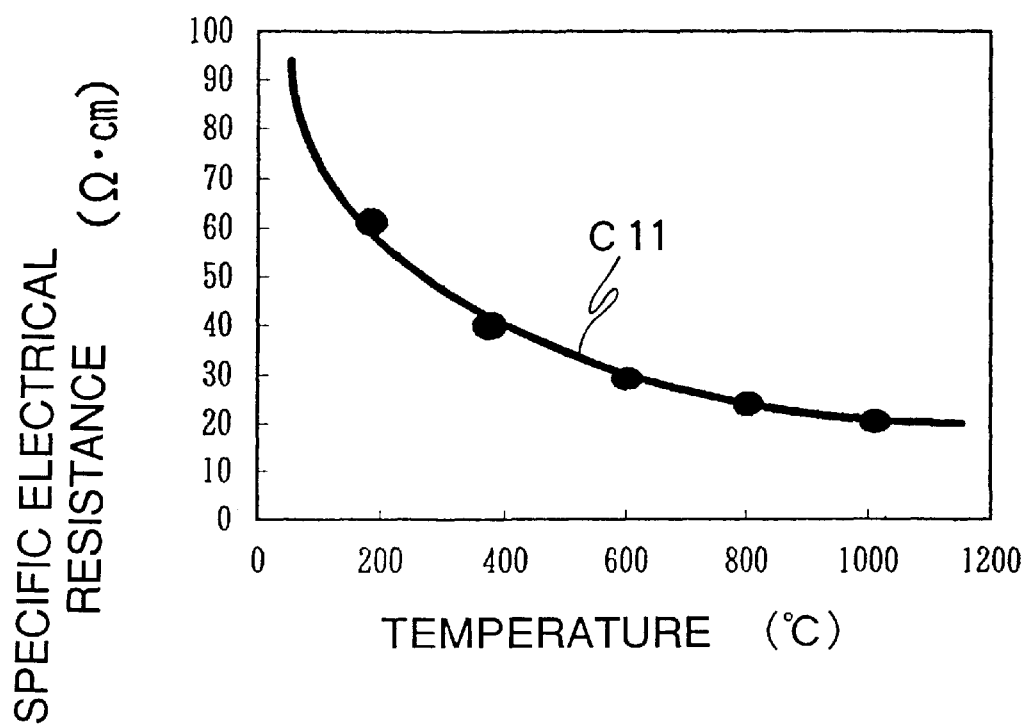

As is clear from FIG. 30, FIG. 31 and Table 5, the sintered bodies of Example 6 and Example 7 were such that the temperature-resistance characteristics exhibited a linear relationship in the temperature range from room temperature to 1000° C. Moreover, it was possible to control the fractional change in resistance with respect to the rise in temperature by adjusting the ratio of the particle diameter of the dispersion material and the particle diameter of the primary particles or granules of the matrix.

TABLE 5

| Sample Number | | Matrix | Dispersion Material | Electrical Conductivity (Ω · cm) | |
|---|---|---|---|---|---|
| | | | | Room Temperature | 1000° C. |
| Examples | 6 | Si3N4 | SiC | 120 | 30 |
| | 7 | Si3N4 | SiC | 149 | 43 |
| | 8 | Si3N4 | SiC | 75 | 18 |
| Comparative Example | C10 | Si3N4 | SiC | >$10^7$ | 2.8 × $10^6$ |
| | C11 | SiO2 | SiC | 240 | 30 |
| | C12 | Si3N4 | — | >$10^7$ | >$10^7$ |
| | C13 | SiC | — | 40 | 20 |
| | C14 | Al2O3 | Cr2O3 | 8 × $10^5$ | 12 |

On the other hand, the sinterded body for comparative purposes in which the SiC was dispersed uniformly (Sample No.C10), the $Si_3N_4$ sintered body (Sample No.C12) and the commercial MgO—$Al_2O_3$—$Cr_2O_3$ based sintered body were all such that the electrical resistance fell exponentially as the temperature increased, and the sintered body for comparative purposes in which the SiC was dispersed at random (Sample No.C11) gave a curved temperature-resistance characteristic and with the SiC sintered body (Sample No.C13) the electrical resistance value became constant from about 400° C. Hence, it is clearly difficult to obtain linear temperature-resistance characteristics with any of the sintered bodies for comparative purposes.

Example 8

Atomized stainless steel (SUS304) powder of grain diameter about 4 μm was granulated in the usual way to form large diameter particles of grain diameter 110–500 μm. Zirconia powder, which contained 3 percent by weight yttria powder, of particle diameter about 1 μm (sinterable at 1350° C.) was used as small diameter particles. The large diameter particles which occupy 80 percent by weightwere covered on the surface with 20 percent by weight of the small diameter particles. A composite powder was fabricated in this way.

The composite powder fabricated was introduced into a mold and press-molded at a pressure of 5 t/$cm^2$ and a green compact was obtained. Next, the green compact was heated to 1200° C. for 4 hours under vacuum and sintered. By this means a composite material which had pores of the fifth aspect of the invention was obtained (Sample No.9).

This material was cross sectioned and the cross section was observed with an SEM. The result showed that the composite material with pores of this example had a three-dimensional network structure such that zirconia surrounded continuously the base material crystal grains which had a diameter of 500 μm or less, and that the pores were dispersed discontinuously in this structure. That is to say, it was confirmed that the pores were dispersed discontinuously in the form of a three-dimensional network in the composite material.

Moreover, the thermal diffusion factor of the SUS/$ZrO_2$ composite material in which the pores had a controlled distribution in the form of a three-dimensional network (Sample No.9) was evaluated using the laser flash method, and compared with the thermal diffusion factor of an SUS/$ZrO_2$ composite material for comparative purposes in which the $ZrO_2$ particles had been dispersed uniformly (Sample No. C15). The results are shown in Table 6.

TABLE 6

| Sample Number | State of Dispersion | Heat Conduction Factor (Room Temperature) |
|---|---|---|
| 9 | Three-dimensional network dispersion | 0.0322 cm$^2$/S |
| C15 | Uniform dispersion | 0.0393 cm$^2$/S |

As is clear from Table 6, the thermal diffusion factor of the SUS/ZrO2 composite material in which the pores were dispersed discontinuously in the form of a three-dimensional network of Sample No.9 was some 18% lower than that of the composite material of Comparative Example C15 in which $ZrO_2$ particles had been dispersed uniformly for comparative purposes.

Potential Industrial Applications

The composite materials of the present invention activate satisfactorily the function of the dispersion material and so they can be used as structural materials and functional materials for example.

The ceramic composite materials can be used, for example, as heat generating materials, sensors, varistors, condensers, humidity sensors, solid electrolytes, thermistors, thermo-electric elements, fuel cells electrode materials, piezoelectric materials, thermo-electric conversion materials, pyroelectric materials, high thermal conductivity materials, thermal insulating materials, high resistance materials, memory element materials, magnetic materials (permeable materials) high and low dielectric material, electrical discharge machining materials, low expansion materials, high expansion materials, highly heat resistant materials, high strength materials, high toughness materials, wear resistant materials, corrosion resistant materials, oxidation resistant materials, optical material and damping materials.

Furthermore, with resins, they can be used, for example, as magnetic materials, heat resistant materials, high thermal conductivity material, thermal insulating materials, electrically conductive resins and rubbers, transparent conductor materials, photoconductive resins, piezoelectric resins and non-linear optical materials.

Furthermore, with metals, they can be used, for example, as electromagnetic materials, corrosion resistant materials, oxidation resistant materials, clad materials, wear resistant materials, magnetically permeable materials, magnetic shielding materials, low and high thermal conductivity materials, high elastic modulus materials, high rigidity materials, highly free cutting materials, damping materials and high tension materials.

What is claimed is:

1. A composite material consisting of:
   a homogeneous base material enclosing interstitial spaces, and
   a reinforcing layer consisting of
      a reinforcing layer material and
      particulates of a dispersion material dispersed discontinuously within said reinforcing layer material, wherein
   said reinforcing layer is dispersed continuously in the form of a three-dimensional network in the interstitial spaces enclosed by said base material,
   said reinforcing layer bonds said base material together strongly and retains said dispersion material strongly,
   said dispersion material is dispersed discontinuously in the form of a three-dimensional network in said composite material, and
   said reinforcing layer material is selected from a group consisting of an amorphous material of a crystalline base material; a material which has a higher density than the base material; an amorphous material or a single crystal material with properties identical to those of the base material; a material which has a smaller elastic modulus than the base material; a material which has a smaller thermal expansion coefficient than the base material and the dispersion material; a material comprising at least one element found in the dispersion material; a mixed material of the base material and its sintering aid; and a sintering aid for the base material and/or dispersion material.

2. The composite material according to claim 1, wherein the base material comprises a ceramic crystalline material.

3. A composite material according to claim 1, characterized in that said reinforcing layer comprises crystal grains having a finer grain diameter or/and a larger aspect ratio than those of said base material.

4. A composite material according to claim 1, characterized in that said reinforcing layer comprises an amorphous material of a crystalline base material.

5. A composite material according to claim 1, characterized in that said reinforcing layer comprises a material having a melting point temperature the same as, or below, that of said base material, and wetting properties on said base material or/and said dispersion material.

6. A composite material according to claim 1, characterized in that said reinforcing layer comprises a portion which has a density higher than the base material.

7. A composite material according to claim 1, characterized in that said reinforcing layer comprises an amorphous material or single crystal material which is the same material as said base material.

8. A composite material according to claim 1, characterized in that said reinforcing layer comprises a material which has a smaller elastic modulus than that of said base material.

9. A composite material according to claim 1, characterized in that said reinforcing layer comprises a material which has a smaller thermal expansion coefficient than those of said base material and said dispersion material.

10. A composite material according to claim 1, characterized in that said reinforcing layer comprises an element of the same type as said dispersion material.

11. A composite material according to claim 1, characterized in that said reinforcing layer comprises a mixed phase of said base material and a sintering aid therefor.

12. A composite material according to claim 1, characterized in that said reinforcing layer comprises a sintering aid for said base material and/or said dispersion material.

13. A composite material according to claim 1, characterized in that said reinforcing layer comprises a plasticizer.

14. A composite material according to claim 1, characterized in that said base material and said reinforcing layer both form a continuous three-dimensional network.

15. A composite material according to claim 1, characterized in that said reinforcing layer is a laminate of reinforcing layer units dispersed in the form of a planar network, and
   each of said reinforcing layer units comprises a portion of said base material encircled by a portion of said reinforcing layer.

16. A composite material according to claim 1, characterized in that a single network mesh unit cell which is defined by said base material, said reinforcing layer and said dispersion material has a size of from 1 $\mu$m to 1000 $\mu$m.

17. A composite material according to claim 1, characterized in that said dispersion material is dispersed discontinuously in a network form in said reinforcing layer.

18. A composite material according to claim 1, characterized in that said base material comprises a plurality of base material crystal grains, and said dispersion material is dispersed in the circumferential direction around said plurality of base material crystal grains, said dispersion material being partially continuously dispersed in form of a layer.

19. A composite material according to claim 1, characterized in that:

said base material comprises a plurality of base material crystal grains;

said dispersion material comprises at least two kinds of material which are different in properties; and said dispersion material is dispersed in a layer in a circumferential direction around said plurality of base material crystal grains.

20. A composite material according to claim 1, characterized in that said base material has an additive dispersed therein to reinforce said base material or to impart electrical properties or thermal properties thereto.

21. A composite material according to claim 20, characterized in that said dispersion material is a mechanical property enhancing material.

22. A composite material according to claim 1, characterized in that said dispersion material has a size of from 0.01 $\mu$m to 100 $\mu$m.

23. A composite material according to claim 1, characterized in that said dispersion material is included in the reinforcing layer in an amount of from 1 to 30 percent by volume.

24. A composite material according to claim 1, characterized in that said dispersion material has a size of not more than one quarter of that of a single network mesh unit cell.

25. A composite material according to claim 1, characterized in that said reinforcing layer is included in the composite material in an amount of from 5 to 60 percent by volume.

26. A method for manufacturing a composite material, the method comprising:

fabricating matrix granules which become a base material of the composite material;

fabricating a dispersion powder which becomes a raw material of a reinforcing layer by mixing a powder which contains a reinforcing layer material and a dispersion material;

fabricating a composite power so that the dispersion powder forms a coating around the matrix granule;

molding said composite powder to obtain a molding in prescribed form; and forming the composite material of claim 1 by heating said molding.

27. A method for manufacturing a composite materials according to claim 26, characterized in that a grain diameter (dm) of said matrix granule and an average primary particle diameter (dp) of said dispersion material prepared in said matrix granule fabricating step and said dispersion powder fabricating step are defined such that dp/dm is 0.5–6×10$^{-6}$.

28. A method for manufacturing a composite material according to claim 26, characterized in that said material which resembles the base material prepared in said dispersion powder fabricating step has a grain diameter of from 0.01 $\mu$m to 100 $\mu$m.

29. A method for manufacturing a composite material according to claim 26, characterized in that said dispersion material prepared in said dispersion powder fabricating step has a grain diameter of not exceeding half that of said matrix granule and from 0.005 $\mu$m to 100 $\mu$m.

30. A method for manufacturing a composite material according to claim 26, characterized in that said dispersion powder prepared in said dispersion powder fabricating step has a size of one third of said matrix granule or less and of 500 $\mu$m or less.

31. A method for manufacturing a composite material according to claim 26, characterized in that said dispersion powder prepared in said dispersion powder fabricating step has a size of one fifth of said matrix granule or less and of 80 $\mu$m or less.

32. A method for manufacturing a composite material according to claim 26, characterized in that, said composite powder has a size of one sixth of said matrix granule or less, and in said composite powder fabricating step, said dispersion powder covers a surface of said matrix granule in a continuous closest-packed manner, forming a coating layer of one third of the diameter of said matrix granule or less in thickness.

33. A method for manufacturing a composite material, the method comprising:

fabricating matrix granules which become a base material of the composite material;

fabricating a composite powder by mixing matrix granules and a raw material powder of a reinforcing layer which contains a dispersion material and a reinforcing layer material which has an average diameter of one quarter of that of said matrix granule or less;

molding said composite powder to obtain a molding in a prescribed form; and forming the composite material of claim 1 by heating said molding.

34. A method for manufacturing a composite material according to claim 33, characterized in that a diameter (dm) of said matrix granule and an average primary particle diameter (dp) of said dispersion material which are prepared in said matrix granule fabricating step and said composite powder fabricating step have such a correlation that dp/dm is from 0.5 to 6×10$^{-6}$.

35. A method for manufacturing a composite material according to claim 33, characterized in that said material which resembles the base material used in said composite powder fabricating step has a diameter of from 0.01 $\mu$m to 100 $\mu$m.

36. A method for manufacturing a composite material according to claim 33, characterized in that said material which resembles the base material used in said composite powder fabricating step has a size of one third of said matrix granule or less and a diameter of 100 $\mu$m or less.

37. A method for manufacturing a composite material according to claim 33, characterized in that said dispersion material used in said composite powder fabricating step has a size of half of said matrix granule or less, and from 0.005 $\mu$m to 100 $\mu$m inclusive.

38. A method for manufacturing a composite material according to claim 33, characterized in that said dispersion material used in said composite powder fabricating step has a size of one fifth of said matrix granule or less, and a diameter of 80 $\mu$m or less.

39. A method for manufacturing a composite material according to claim 33 characterized in that, in said composite powder fabricating step, said material resembling said base material being one sixth of said matrix granule or less, and/or said dispersion material covers the surface of said matrix granule in a continuous closest-packed manner, forming a coating layer of one third of the diameter of said matrix granule or less in thickness.

40. The composite material according to claim 1, wherein the base material comprises a ceramic crystalline material.

41. A method for manufacturing a composite material, the method comprising:

fabricating matrix granules which become a base material of the composite material;

fabricating a dispersion powder which becomes a raw material of a reinforcing layer by mixing a powder which contains a reinforcing layer material and a dispersion material;

fabricating a composite power so that the dispersion powder forms a coating around the matrix granule;

molding said composite powder to obtain a molding in a prescribed form; and forming the composite material of claim 1 by heating said molding.

42. A method for manufacturing a composite material, the method comprising:

fabricating matrix granules which become a base material of the composite material;

fabricating a composite powder by mixing matrix granules and a raw material powder of a reinforcing layer which contains a dispersion material and a reinforcing layer material which has an average diameter of one quarter of that of said matrix granule or less;

molding said composite powder to obtain a molding in a prescribed form; and forming the composite material of claim 1 by heating said molding.

43. Thermistor material consisting of:

as a first phase a homogeneous matrix enclosing interstitial spaces and comprising a material which has insulating properties; and a third phase consisting of
a third phase material and
a second phase material, which is a dispersion material consisting of particulates of a material dispersed discontinuously within said material of said third phase, wherein said third phase is dispersed continuously in the form of a three-dimensional network in the interstitial spaces enclosed by said matrix, and has a different thermal expansion coefficient from said matrix which relieves internal stress caused by a difference in thermal expansion; and the second phase has a thermal expansion coefficient different from said matrix; and said dispersion material consists of a semiconductor material or a material which has electrical conductivity, is dispersed discontinuously in the aforementioned third phase, is dispersed discontinuously in the form of a three-dimensional network in the thermistor material, and forms an electrical path structure.

44. The thermistor material according to claim 43, wherein the material of said third phase has a low elastic modulus; and said third phase has a thermal expansion coefficient which is closer to the thermal expansion coefficient of said matrix than to that of said dispersion material.

45. The thermistor material according to claim 43, wherein said material of said third phase is a reinforcing layer material that has insulating properties; and said reinforcing layer material is a material selected from a group consisting of an amorphous material of a crystalline base material; a material which has a higher density than the base material; an amorphous material or a single crystal material with properties identical to those of the base material; a material which has a smaller elastic modulus than the base material; a material which has a smaller thermal expansion coefficient than the base material and the dispersion material; a material comprising at least one element found in the dispersion material; a mixed material of the base material and its sintering aid; and a sintering aid for the base material and/or dispersion material.

46. Thermistor material, according to claim 43, characterized in that said dispersion material is dispersed discontinuously in the form of a three-dimensional network in said third phase.

47. A method for manufacturing a thermistor material, the method comprising:

fabricating a composite powder by mixing a raw material powder of, as a first phase, a matrix comprising a material which has insulating properties and a raw material powder of, as a second phase, a dispersion material comprising a semiconductor material or a material having electrical conductivity which has a thermal expansion coefficient different from the matrix raw material powder and has a size not more than one quarter of the matrix raw material powder, with a raw material of a third phase comprising a material which has a thermal expansion coefficient closer to that of the matrix raw material powder than to that of the dispersion material, relaxes an internal stress produced by a difference in thermal expansion of the raw material powder of the dispersion material which measuring temperatures and has a size of not exceeding one quarter of the matrix raw material powder, so as to cover the surface of the matrix raw material powder with the dispersion material raw material powder and the third phase raw material powder;

molding said composite powder to obtain a molding in a prescribed form; and forming the thermistor material of claim 43 by heating said molding.

48. A method for manufacturing a thermistor material, the method comprising:

fabricating a composite powder by mixing a raw material powder of, as a first phase, a matrix comprising a material which has insulating properties and a raw material powder of, as a second phase, a dispersion material comprising a semiconductor material or a material having electrical conductivity which has a different thermal expansion coefficient from the matrix raw material powder and has a size of one quarter of the matrix raw material powder or less, with a raw material of a third phase comprising a reinforcing layer material which has a size of one quarter of the matrix raw material powder or less so as to cover the surface of the matrix raw material powder with the dispersion material raw material powder and the third phase raw material powder;

molding said composite powder to obtain a molding in a prescribed form; and forming the thermistor material of claim 43 by heating said molding.

49. Method for the manufacture of thermistor materials, according to claim 47 or claim 48, characterized in that said raw material powder of said dispersion material has a size of one quarter of that of the third phase raw material or less.

50. A method for manufacturing a thermistor material according to claim 47 or claim 48, characterized in that said raw material powder of said dispersion material has a size of one seventh of that of the third phase raw material or less.

51. The thermistor material according to claim 43, wherein the material of said third phase has a low elastic modulus; and said third phase has a thermal expansion coefficient which is closer to the thermal expansion coefficient of said matrix than to that of said dispersion material.

52. The thermistor material according to claim 43, wherein said material of said third phase is a reinforcing layer material that has insulating properties; and said reinforcing layer material is a material selected from a group consisting of an amorphous material of a crystalline base material; a material which has a higher density than the base material; an amorphous material or a single crystal material with properties identical to those of the base material; a material which has a smaller elastic modulus than the base material; a material which has a smaller thermal expansion coefficient than the base material and the dispersion material; a material comprising at least one element found in the dispersion material; a mixed material of the base material and its sintering aid; and a sintering aid for the base material and/or dispersion material.

53. A method for manufacturing a thermistor material, the method comprising:

fabricating a composite powder by mixing a raw material powder of, as a first phase, a matrix comprising a material which has insulating properties and a raw material powder of, as a second phase, a dispersion material comprising a semiconductor material or a material having electrical conductivity which has a thermal expansion coefficient different from the matrix raw material powder and has a size not more than one quarter of the matrix raw material powder, with a raw material of a third phase comprising a material which has a thermal expansion coefficient closer to that of the matrix raw material powder than to that of the dispersion material, relaxes an internal stress produced by a difference in thermal expansion of the raw material powder of the dispersion material which measuring temperatures and has a size of not exceeding one quarter of the matrix raw material powder, so as to cover the surface of the matrix raw material powder with the dispersion material raw material powder and the third phase raw material powder;

molding said composite powder to obtain a molding in a prescribed form; and forming the thermistor material of claim 43 by heating said molding.

54. A method for manufacturing a thermistor material, the method comprising:

fabricating a composite powder by mixing a raw material powder of, as a first phase, a matrix comprising a material which has insulating properties and a raw material powder of, as a second phase, a dispersion material comprising a semiconductor material or a material having electrical conductivity which has a different thermal expansion coefficient from the matrix raw material powder and has a size of one quarter of the matrix raw material powder or less, with a raw material of a third phase comprising a reinforcing layer material which has a size of one quarter of the matrix raw material powder or less so as to cover the surface of the matrix raw material powder with the dispersion material raw material powder and the third phase raw material powder;

molding said composite powder to obtain a molding in a prescribed form; and forming the thermistor material of claim 52 by heating said molding.

55. A composite material comprising:

a ceramic base material comprising a crystalline material;

a ceramic reinforcing layer bonded to said ceramic base material; and particulates of a dispersion material dispersed discontinuously within said ceramic reinforcing layer, wherein said dispersion material is dispersed discontinuously in the form of a three-dimensional network in said composite material, and said crystalline material is selected from a group consisting of an amorphous material of a crystalline base material; a material which has a higher density than the base material; an amorphous material or a single crystal material with properties identical to those of the base material; a material which has a smaller elastic modulus than the base material; a material which has a smaller thermal expansion coefficient than the base material and the dispersion material; a material comprising at least one element found in the dispersion material; a mixed material of the base material and its sintering aid; and a sintering aid for the base material and/or dispersion material.

* * * * *

UNITED STATES PATENT AND TRADEMARK OFFICE
CERTIFICATE OF CORRECTION

PATENT NO.   : 6,245,439 B1
DATED        : June 12, 2001
INVENTOR(S)  : Yamada et al.

Page 1 of 1

It is certified that error appears in the above-identified patent and that said Letters Patent is hereby corrected as shown below:

<u>Title page,</u>
Item [73], the Assignee information should read :

-- [73]   Assignee:    Kabushiki Kaisha Toyota Chuo
                       Kenkyusho, Aichi-gun (JP) --

Signed and Sealed this

Nineteenth Day of February, 2002

Attest:

Attesting Officer

JAMES E. ROGAN
*Director of the United States Patent and Trademark Office*